June 16, 1931.  F. LJUNGSTRÖM  1,810,283
POWER TRANSMISSION
Filed April 28, 1930   15 Sheets-Sheet 6
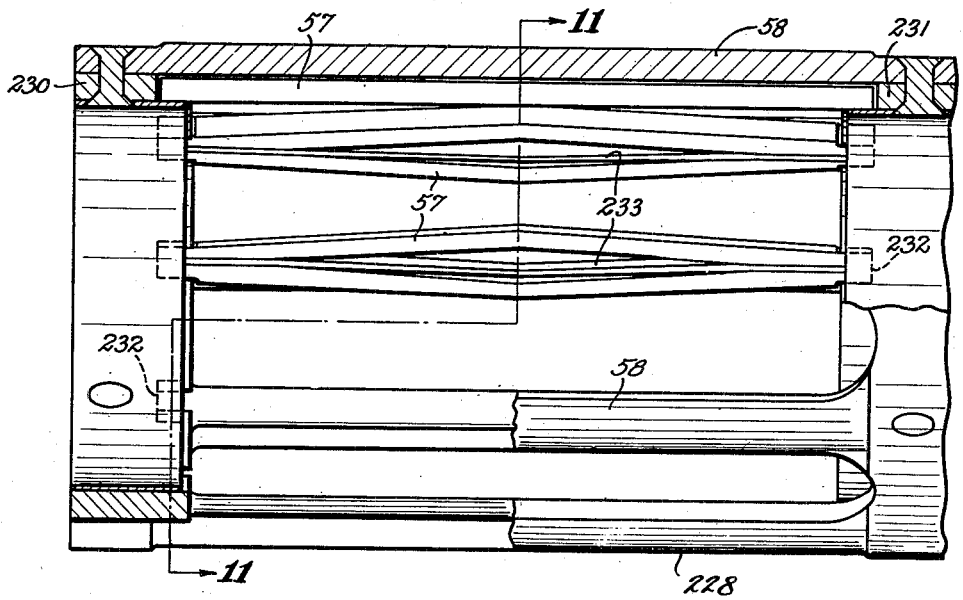
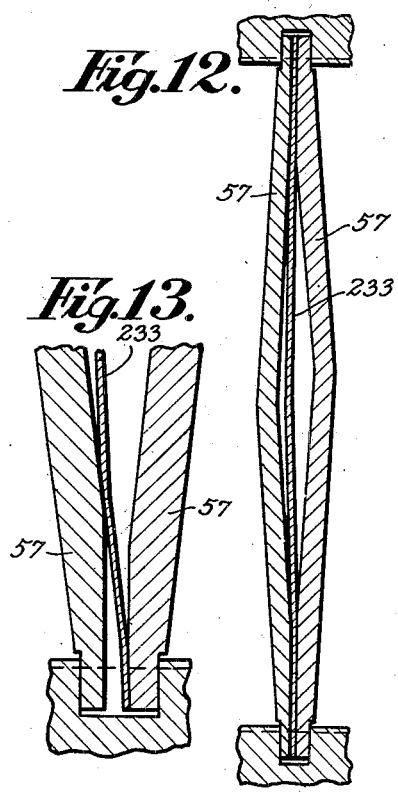
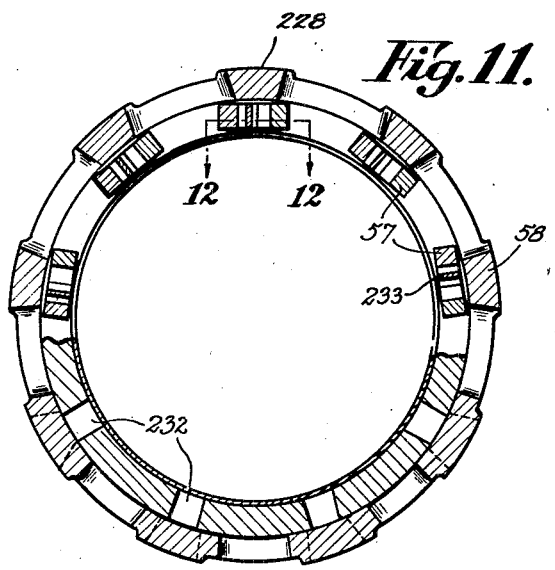
INVENTOR
Fredrik Ljungström
BY
his ATTORNEY

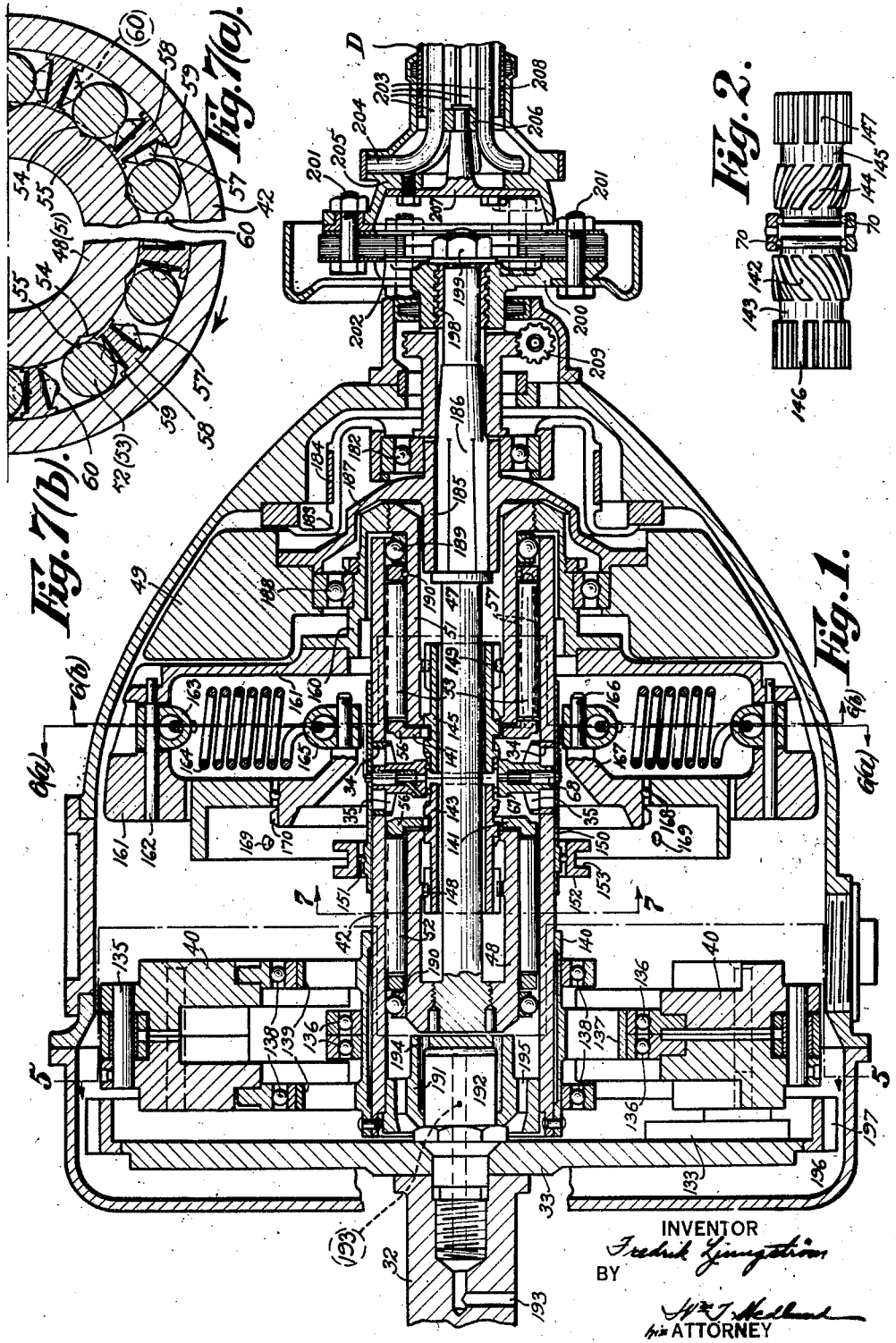

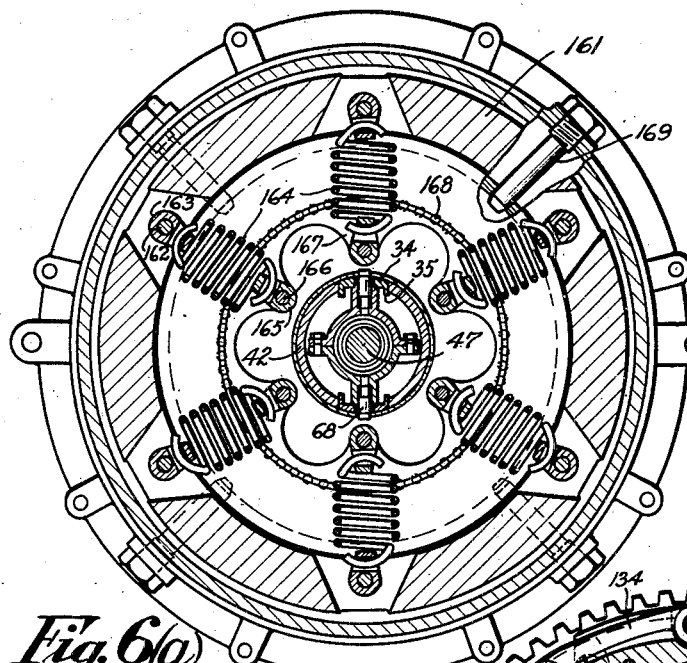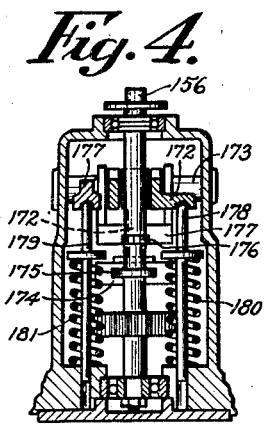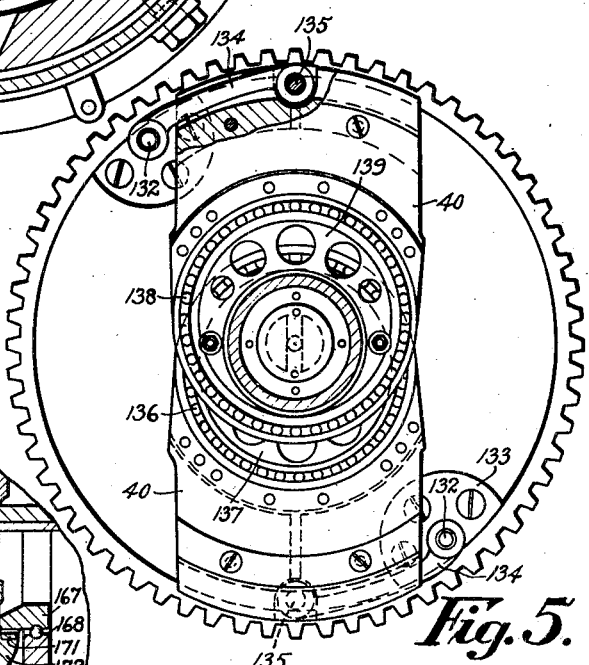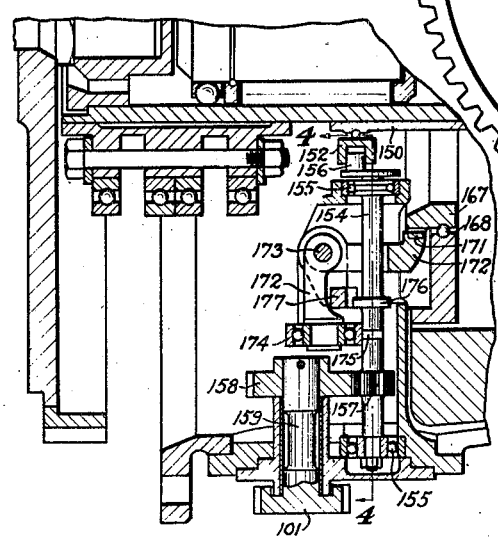

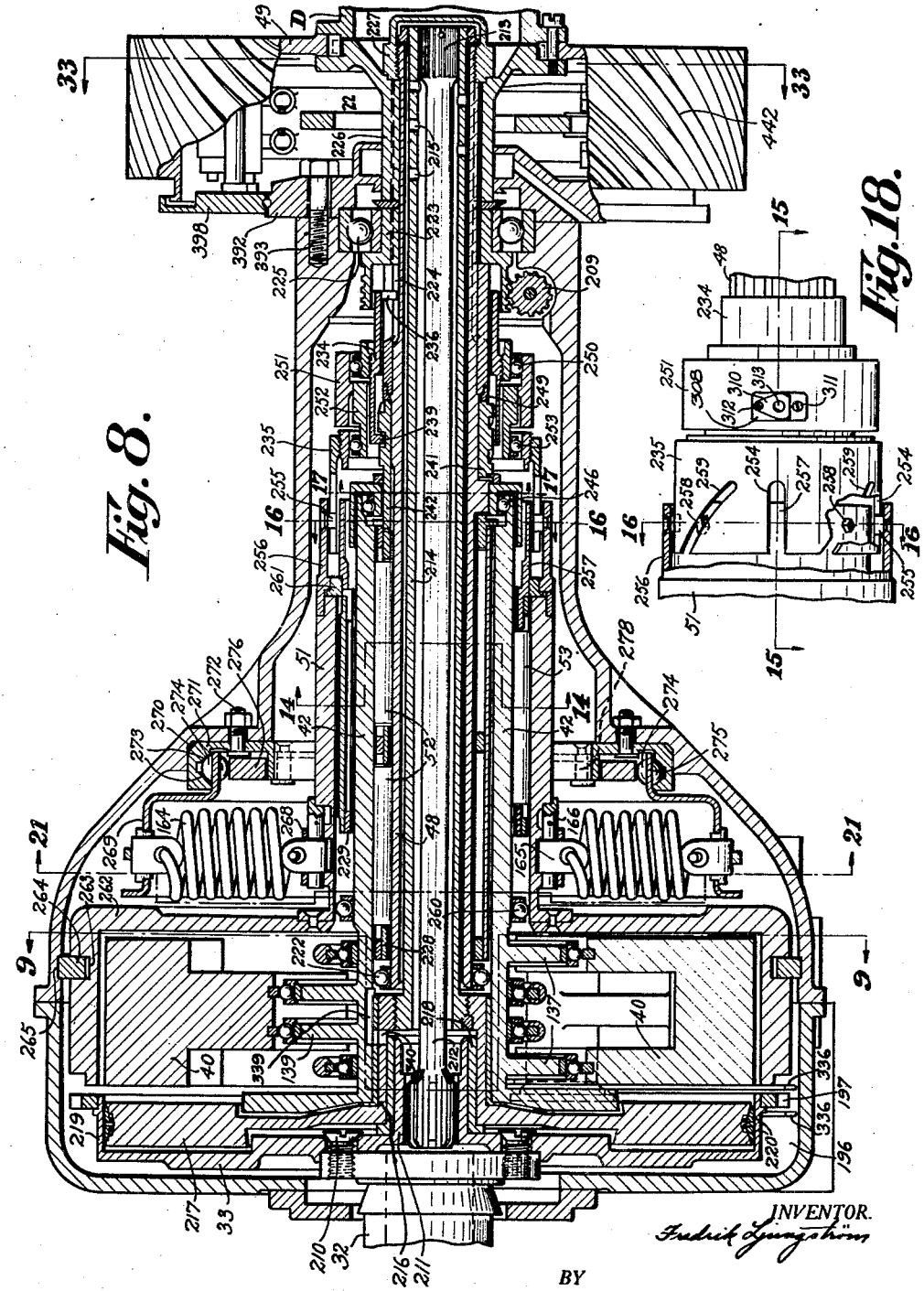

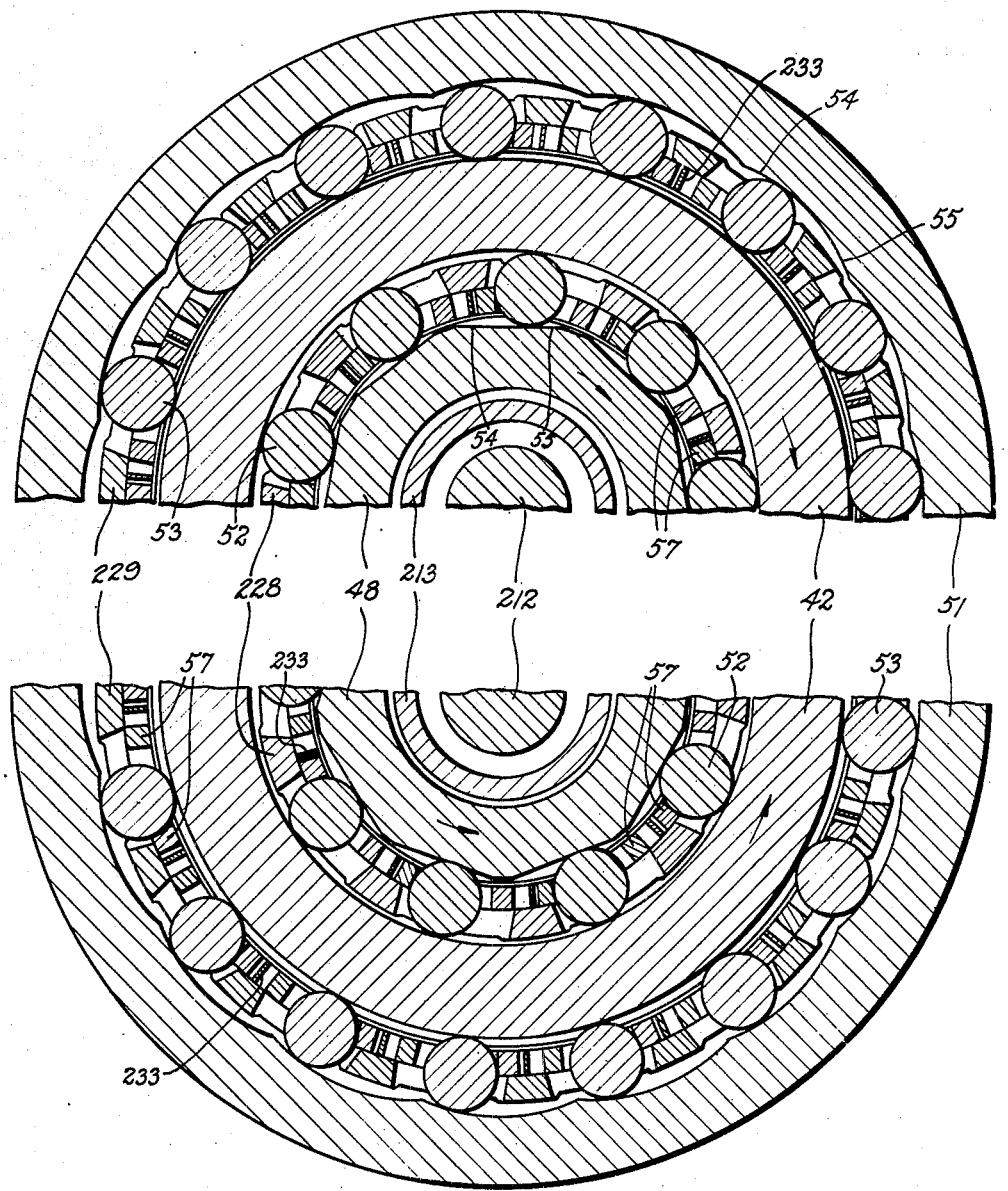

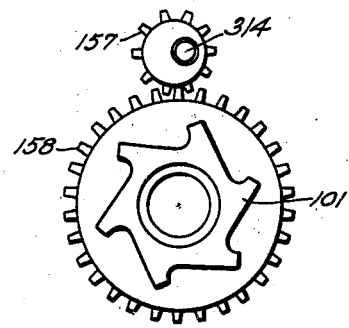
Fig. 26.
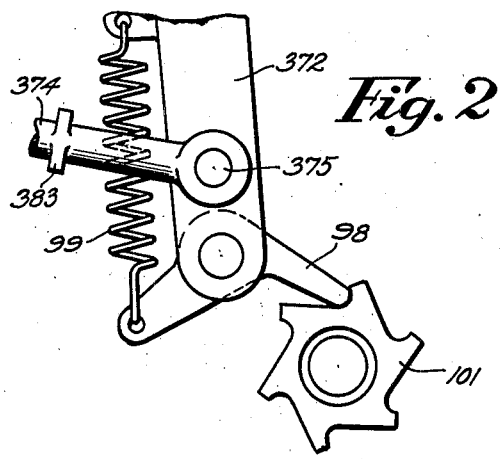
Fig. 27.
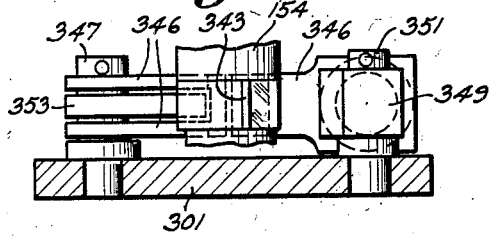
Fig. 28.
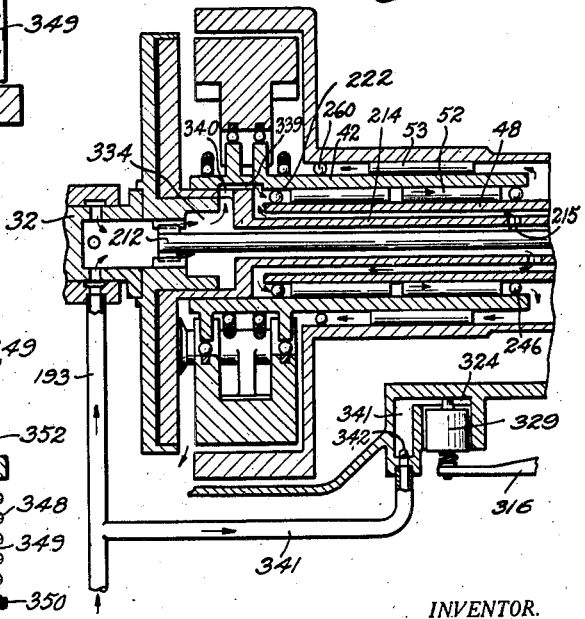
Fig. 30.
Fig. 29.

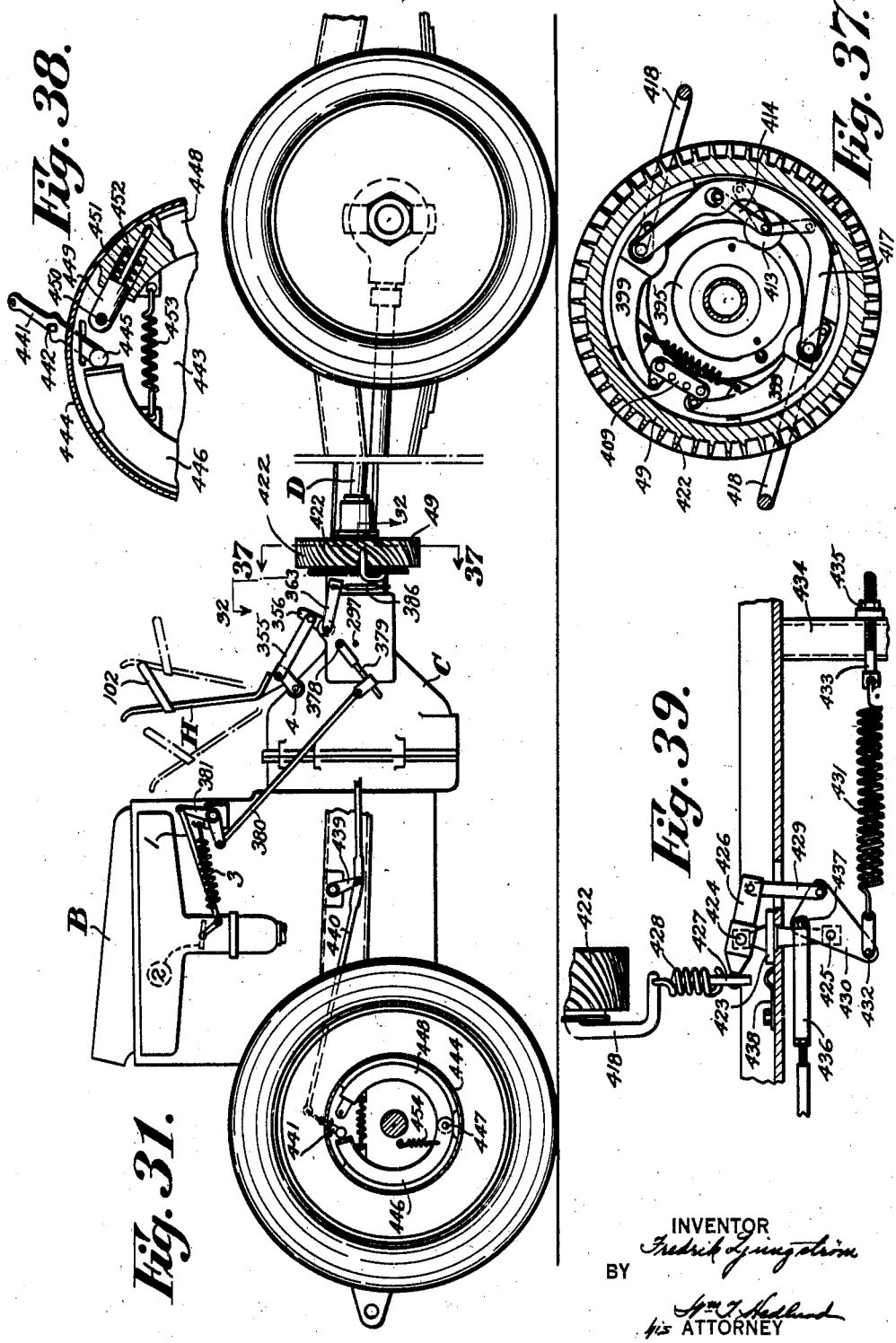

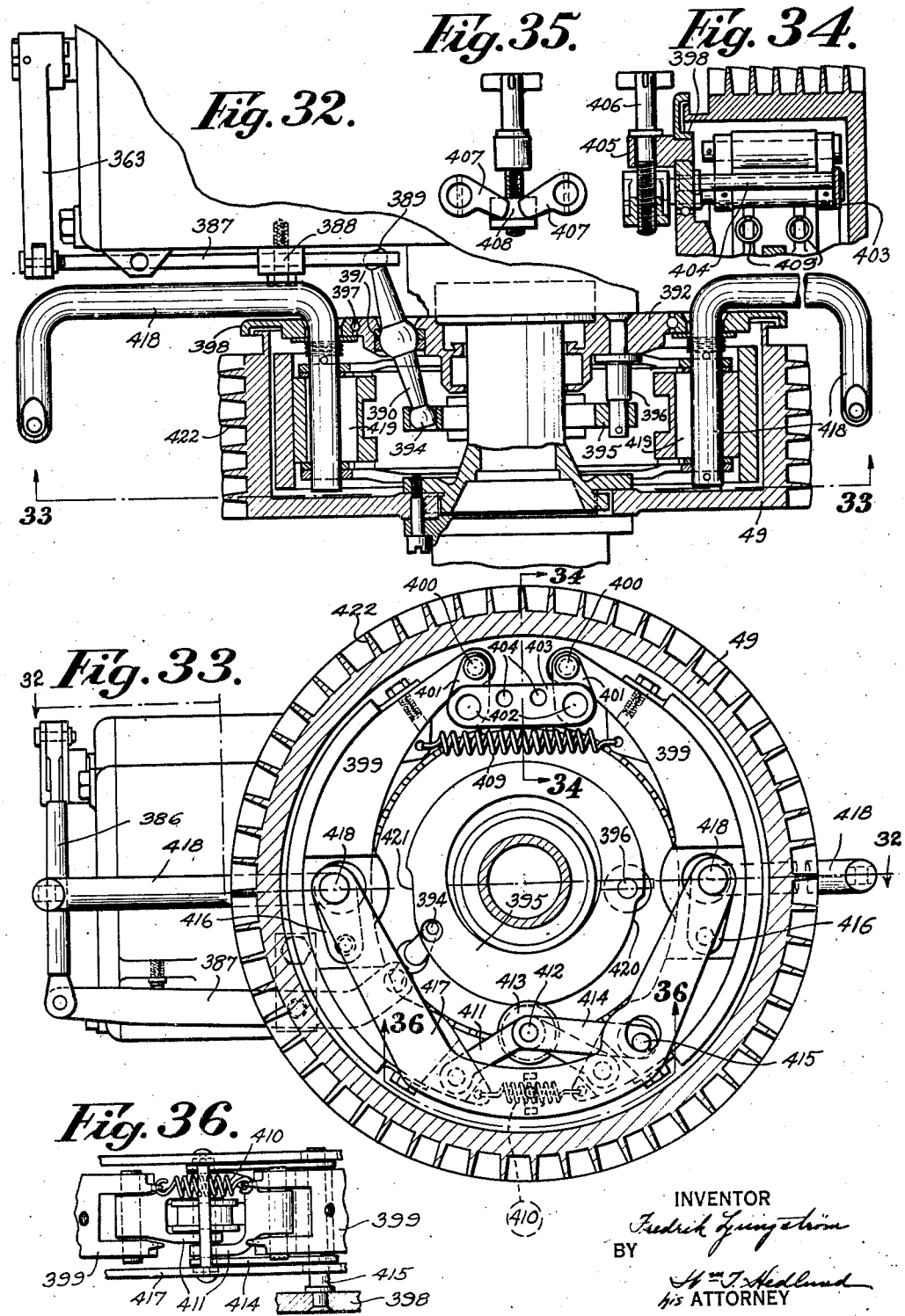

Patented June 16, 1931

1,810,283

UNITED STATES PATENT OFFICE

FREDRIK LJUNGSTRÖM, OF LIDINGO, SWEDEN, ASSIGNOR, BY MESNE ASSIGNMENTS, TO PED, INCORPORATED, A CORPORATION OF DELAWARE

POWER TRANSMISSION

Continuation of application Serial No. 218,293, filed September 8, 1927. This application filed April 28, 1930, Serial No. 447,896, and in Sweden February 16, 1927.

This application is a continuing application with respect to my copending application Ser. No. 218,293, filed September 8, 1927, and replaces said application Ser. No. 218,293 as to the subject matter of various major transmission features therein originally claimed; and is also a continuing application with respect to and in part replaces my copending applications Ser. No. 374,830, filed June 29, 1929, Ser. No. 375,174, filed July 1, 1929, and Ser. No. 417,622, filed December 31, 1929; and is also a continuing application with respect to my copending application Ser. No. 407,236, filed November 14, 1929. This application is to be considered as relating back to each and all of these copending applications, respectively, so far as herein continued, and to the dates and rights incident thereto, respectively, including the rights acquired by virtue of the filing of corresponding foreign applications as set forth in the oath forming a part of this application.

The present invention relates to variable-speed power transmissions. More specifically, the invention relates to variable-speed power transmissions of the type in which turning moments of opposite sense or direction are alternately produced by mechanism actuated by a rotary driving member and segregated by mechanism which transmits turning moments of one sense to a driven member and of opposite sense to an abutment. Still more specifically, the invention relates to transmissions of the above type which are reversible and which are adapted to be utilized in automobiles or like self-propelled vehicles in combination with certain control features, as will hereinafter appear, which permit the use of a simplified unit control for such vehicles.

One object of the invention is to improve transmissions of the above type. In one phase of the invention I improve the transmission by the use of reaction inertia mass for altering the characteristics of the forces produced by the turning moments which are directed toward the abutment, in order to eliminate vibration in the transmission due to the intermittent character of these forces. In another phase of the invention I improve the transmission by novel mechanism for producing the opposite turning moments which eliminates backlash, and consequently noise and vibration, in the mechanism due to the change in the sense of the forces produced when the rotary driving motion is converted to turning moments of opposite sense.

In the specific form of transmission to which the invention is directed, clutch mechanism comprising reversible overrunning one-way clutches including gripping detents is employed to transmit the produced turning moments to the driven member and to the abutment, respectively, and a further object of the invention is to improve upon prior forms of clutch construction of this type by providing means for applying equalized engaging forces to the clutch detents, by providing means for applying engaging forces to the clutch detents which vary under different operating conditions within the transmission, and by providing improved means for relieving the clutches from stresses due to forces acting and reacting between the driven member and the abutment, in order to free the clutches in case they become jammed because of forces preventing the driven member from moving in the selected direction of rotation.

My invention also relates to overrunning clutch mechanism per se of general application to the transmission of power. In this phase of my invention, I aim to provide improved clutch mechanism which is particularly adapted to transmit power under widely varying conditions such as would, in the absence of my improvements to the clutch mechanism, disadvantageously affect the operating characteristics and the durability of the parts. In this connection I provide means for varying the engaging pressure applied to the clutch detents for different conditions of drive, as will hereinafter more fully appear.

Amongst other objects of the invention are: To provide a compact form of transmission in which one of the one-way clutches is placed within another of the clutches; to provide novel and improved means for mounting certain parts of the mechanism which produces the opposite turning moments; to provide novel means for resiliently mounting the reaction inertia mass whereby a single set of springs may be utilized to secure the effect, under different operating conditions of the transmission, of both weak and strong springs; to provide an improved transmission of the character described having an intermediate member upon which inertia masses producing opposite turning moments are mounted in an improved manner in order to produce forces which are balanced in a plane transverse to the axis of the transmission; to provide means for applying equalized engaging forces to detents of a plurality of cooperating clutches; to provide means in a transmission having a plurality of reversible clutches comprising gripping detents for applying equalized engaging forces to the detents through the mechanism which effects reversal of the clutches; to provide a novel form of torsionally resilient drive for absorbing and equalizing the intermittent reactions which would otherwise be transmitted from the transmission to the driving mechanism; to provide means for insuring quick reversal of the clutches; to provide means for freeing the reaction inertia mass before reversal of the clutches can be effected; to provide means responsive to pressure conditions within the transmission lubricating system to alter the engaging force applied to the clutch detents; to provide means acting through the lubricating system for altering the engaging force applied to the clutch detents when the transmission changes from synchronous drive to asynchronous drive, and vice versa; and, in general, to provide improved transmission structure of the variable speed type and to provide improved clutch mechanism of the overrunning or free-wheeling type applicable generally to the transmission of power.

The above and further objects of the invention, together with the advantages to be derived from its use, may best be understood from the following description of the transmissions embodying the invention which are illustrated in the accompanying drawings forming a part of this specification.

In the drawings:

Fig. 1 is a vertical central longitudinal section of one form of transmission embodying the invention;

Fig. 2 is a side elevation of parts of the structure shown in Fig. 1;

Fig. 3 is a fragmentary horizontal longitudinal central section showing part of the mechanism of the transmission illustrated in Fig. 1;

Fig. 4 is a section taken on the line 4—4 of Fig. 3;

Figs. 5 and 6 (a) are transverse sections taken on the respectively numbered section lines of Fig. 1, parts of each of these sections being broken away for clearness;

Fig. 6 (b) is a transverse sectional view taken on the line 6 (b)—6 (b) of Fig. 1;

Fig. 7 (a) is a quarter section on an enlarged scale taken transversely through the clutch mechanism shown in Fig. 1 taken on the line 7—7 of Fig. 1 and illustrating this mechanism in one position of adjustment;

Fig. 7 (b) is a view similar to Fig. 7 (a) taken on the line 7—7 of Fig. 1 showing the clutch mechanism in another position of adjustment;

Fig. 8 is a central longitudinal section of a second form of transmission embodying the invention and adapted to be used in an automobile with a motor capable of delivering about fifty horse power;

Fig. 10 is a fragmentary side elevation, partly in section and on an enlarged scale, of a roller cage;

Fig. 11 is a section taken on the line 11—11 of Fig. 10;

Fig 12 is a section taken on the line 12—12 of Fig. 11;

Fig. 13 is a fragmentary section similar to Fig. 12 and on a still further enlarged scale, illustrating in exaggerated form the clearance obtaining in parts of the structure;

Fig. 14 (a) is a transverse half section on an enlarged scale, taken on the line 14—14 of Fig. 8 and showing the roller clutches in one position of adjustment;

Fig. 14 (b) is a view similar to Fig. 14 (a) showing the roller clutches in the opposite position of adjustment;

Fig. 18 is a fragmentary elevation of the clutch shifting mechanism shown in Fig. 15, parts being broken away for clearness;

Figs. 26 to 29 are enlarged fragmentary views illustrating parts of the mechanism shown in Figs. 23 to 25;

Fig. 30 is a diagrammatic sectional representation of the transmission illustrating the lubricating system thereof;

Fig. 31 is a diagrammatic side elevation of an automobile chassis equipped with the transmission shown in Fig. 8 and illustrating the control system, parts of the vehicle being broken away for clearness;

Fig. 32 is a fragmentary horizontal section on an enlarged scale taken on the line 32—32 of Fig. 31;

Fig. 33 is a vertical section on an enlarged scale taken on the line 33—33 of Fig. 32 and showing the brake mechanism in released position;

Fig. 34 is a fragmentary section taken on the line 34—34 of Fig. 33;

Fig. 35 is a detail of Fig. 34 looking from the left of the latter figure;

Fig. 36 is a fragmentary section of Fig. 33 taken on the line 36—36, parts being omitted for clearness;

Fig. 37 is a view similar to Fig. 33, but showing the brake mechanism in engaged position;

Fig. 38 is a fragmentary section on an enlarged scale of a part of the front wheel brake shown in Fig. 31; and Fig. 39 is a fragmentary plan view, partly in section, and on an enlarged scale, of a portion of the brake mechanism.

Figure 6B:
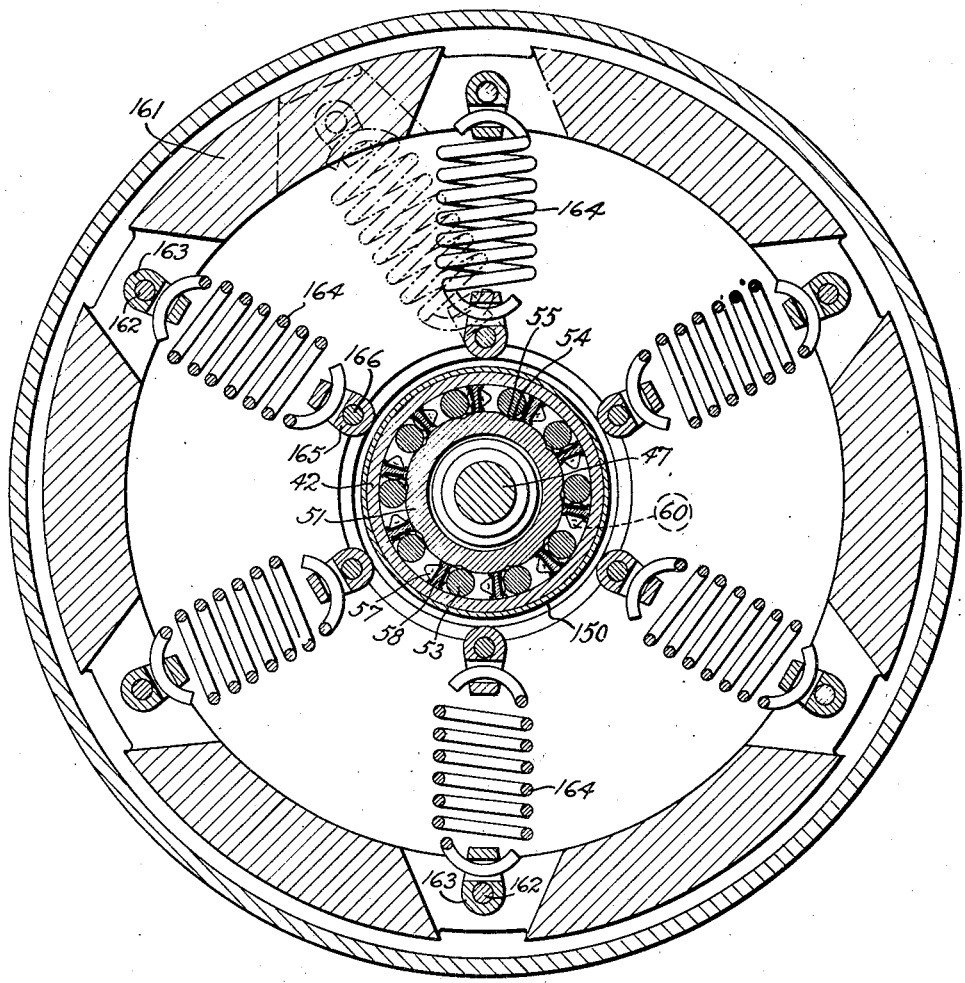
Figure 9:
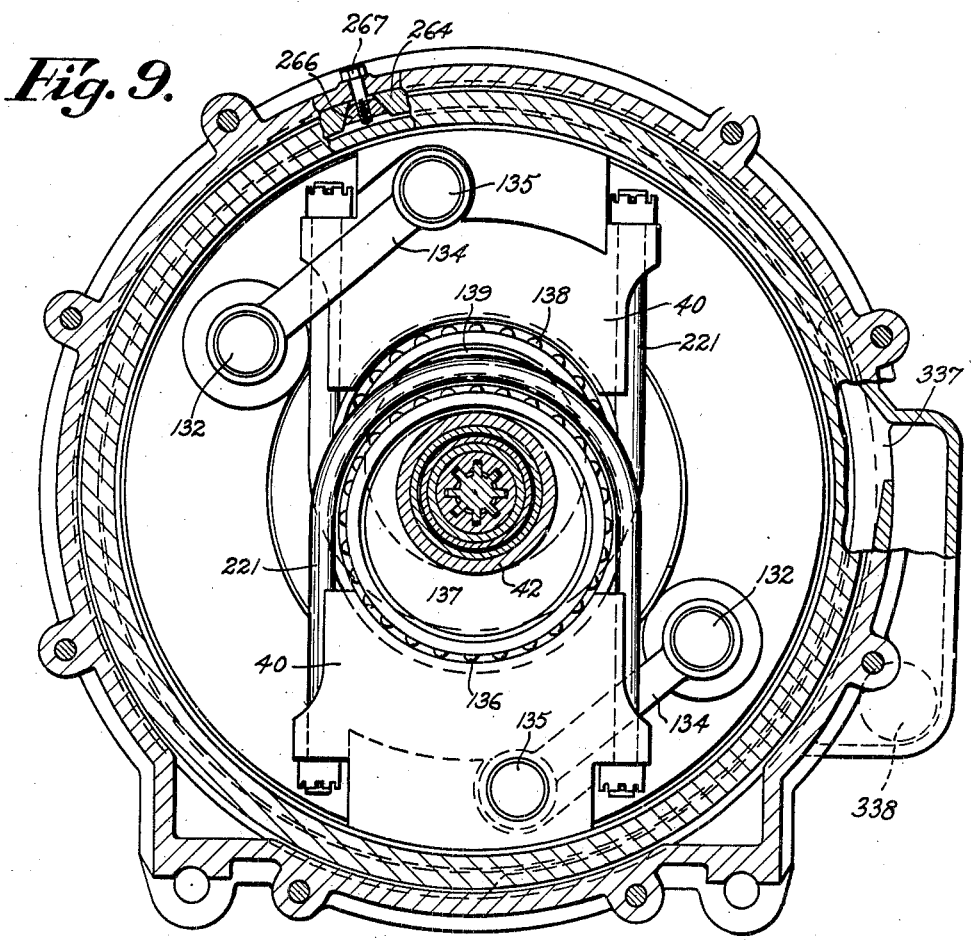
Fig. 9 is a transverse section taken on the line 9—9 of Fig. 8.
Figure 19:
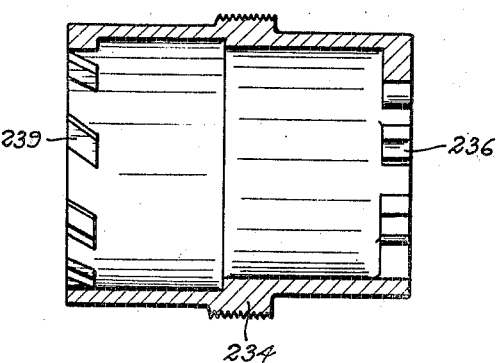
Fig. 19 is a longitudinal section of one of the clutch shifting elements.
Figure 20:
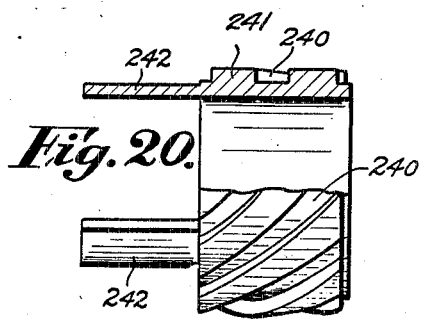
Fig. 20 is a side elevation partly in section of another of the clutch shifting elements.
Figure 15:
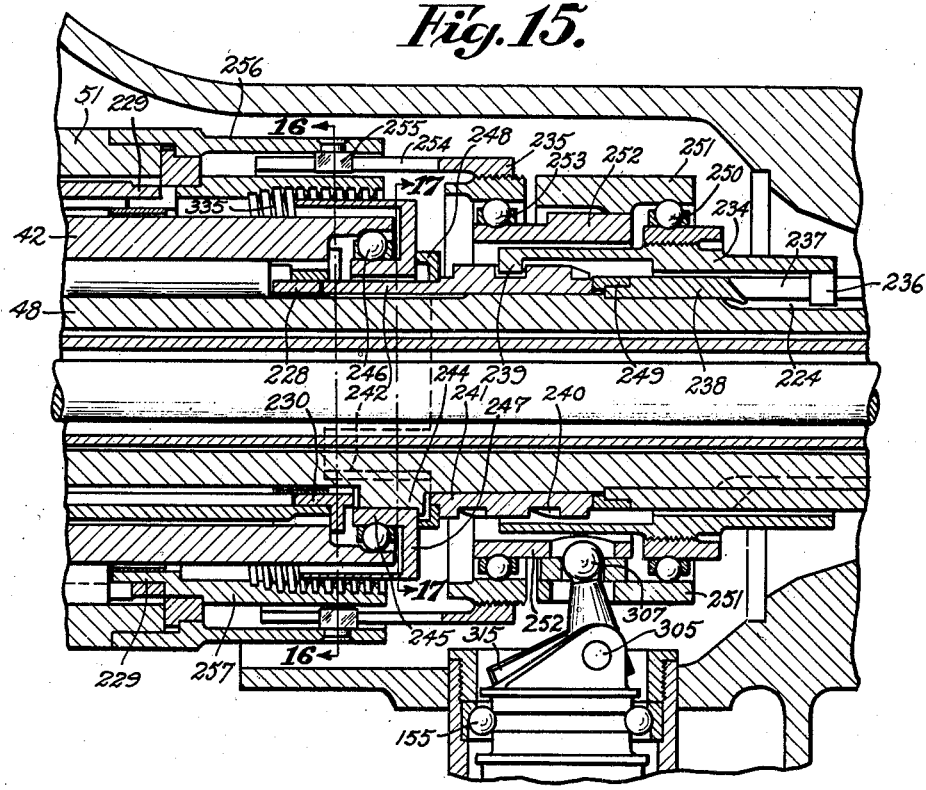
Fig. 15 is a fragmentary longitudinal section on an enlarged scale showing a part of the clutch shifting mechanism, this section being taken generally normal to the plane of Fig. 8 along the lines 15—15 of Figs. 16, 17 and 18.
Figure 16:
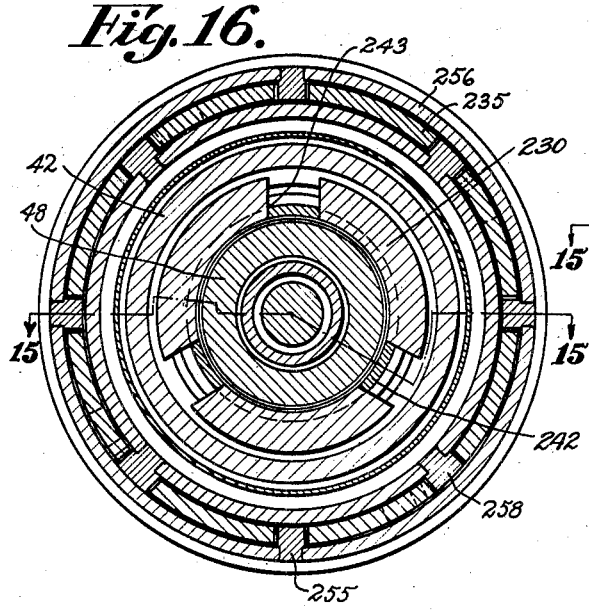
Figs. 16 and 17 are transverse sections taken along the respectively numbered section lines of Figs. 8 and 15.
Figure 17:
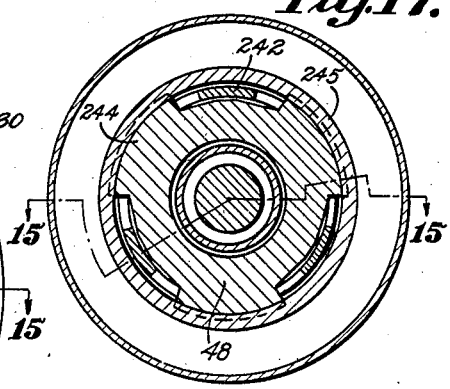
Figure 21:
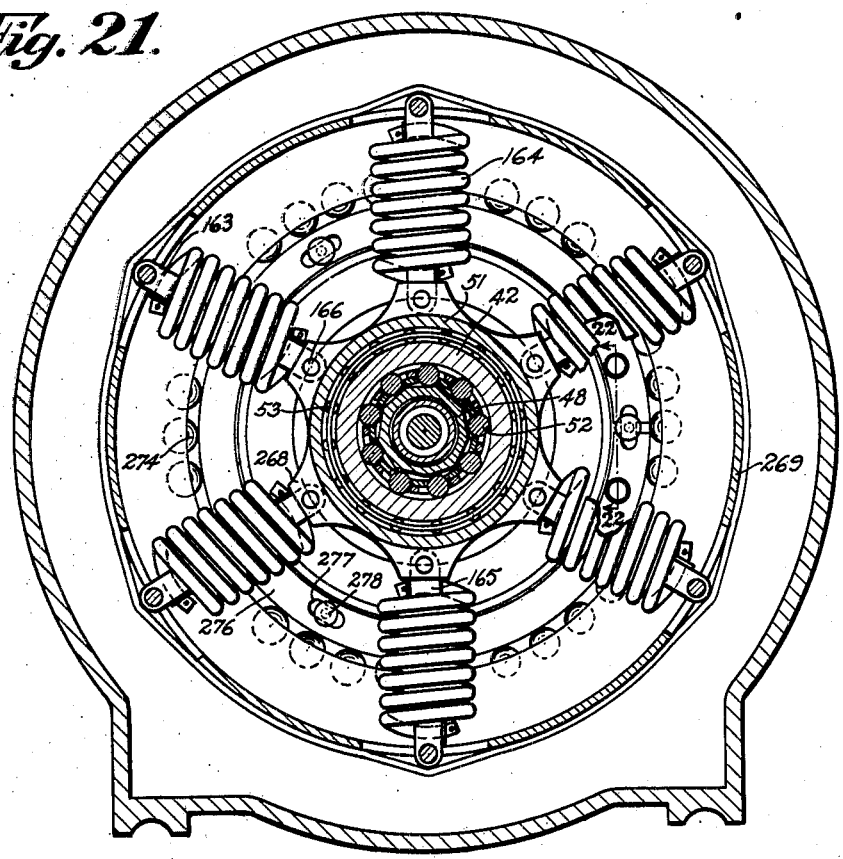
Fig. 21 is a transverse section taken on the line 21—21 of Fig. 8.

Referring now to the embodiment shown in Figs. 1 to 7 (b), and with particular reference to Fig. 1, 32 indicates an engine driving shaft to which is secured a fly-wheel 33. Fly-wheel 33 is provided near its periphery with two diametrically opposed driving studs 132 (Fig. 5) carried by plates secured to the face of the fly-wheel. Each stud 132 is connected by means of link 134 to a pin 135 mounted adjacent to the periphery of an inertia mass 40. As may be seen from Fig. 1, one inertia mass is of T-shaped cross-section, while the other mass is of U-shaped cross-section. The T-shaped mass is carried on a double row ball bearing 136, the inner race of which is mounted on an eccentric 137. The other inertia mass is carried by spaced single row ball bearings 138, the inner races of which are mounted on two spaced eccentrics 139, between which the eccentric 137 is located. Eccentrics 137 and 139 form part of a sleeve member 140 rigidly secured to a common clutch sleeve 42, and the center of eccentric 137 is diametrically opposite the center of eccentrics 139.

Positioned within sleeve 42 is the driven shaft 47, which has secured to its forward end the rotatable clutch sleeve 48. A stationary clutch sleeve 51 is positioned between the driven shaft 47 and the rear end of sleeve 42, sleeve 51 being in axial alignment with sleeve 48. The manner of supporting the driven shaft and the several sleeves will be described later.

Between the common clutch sleeve 42 and the rotatable clutch sleeve 48 is a set of cylindrical roller detents 52, and between the common clutch sleeve 42 and the stationary sleeve 51 is a second set of cylindrical roller detents 53. Each of sleeves 48 and 51 is provided with oppositely inclined gripping or wedging surfaces 54 and 55, as shown in Figs. 7 (a) and 7 (b), which figures are transverse cross-sectional views through either the rotatable clutch sleeve 48 or the stationary clutch sleeve 51. Roller detents 52 and 53 are placed in cages 56, which are turnable with respect to sleeves 42, 48 and 51. Movement of the roller detents is constrained by leaf springs 57 situated adjacent to intermediate ribs or partitions 58 of the roller cages 56. Inasmuch as centrifugal force tends to displace springs 57 radially upon rotary movement of the cages, flanges 59 are provided on ribs 58 in order to prevent such radial displacement. Springs 57 are wide at the middle and taper toward each end as indicated by dotted lines in Fig. 1 at the position of one of the right-hand detents 53. The ends of springs 57 are situated in apertures 60 in the annular end portions or walls of the cage, as shown in Figs. 7 (a) and 7 (b). The apertures are so situated and formed as to restrict the movement of the springs so that they only bear against the roller detents, in the middle position thereof, with sufficient force to hold the detents in position in order to facilitate assembly of the mechanism.

The springs 57 acting on the rollers 53 may be made somewhat weaker than the corresponding springs acting on rollers 52.

As stated above, the roller cages 56 are turnable with respect to clutch sleeves 48 and 51, and by reference to Figs. 7 (a) and 7 (b) it will be seen that as these cages are turned with respect to said sleeves, the roller detents will be caused to contact with the inner surface of sleeve 42 and either the gripping surfaces 54 or gripping surfaces 55 on sleeves 48 and 51, depending upon the direction in which the cages are rotated with respect to the latter sleeves.

In order to effect proper operation of the transmission, it is necessary for the roller cage 56, holding roller detents 52, to be positioned so that these roller detents contact one series of inclined gripping surfaces (for example, surfaces 54) of sleeve 48, while the cage holding the roller detents 53 is positioned so that these latter detents contact oppositely inclined gripping surfaces (in this case surfaces 55) of sleeve 51. With the sets of roller detents 52 and 53 contacting oppositely inclined wedging surfaces on the clutch sleeves 48 and 51, respectively, drive through the transmission will be effected in one direction in a manner presently to be described. Reversal of direction of drive through the transmission is accomplished by turning the roller clutches so that the sets of roller detents are moved away from contact with the wedging surfaces previously engaged and into contact with the oppositely inclined wedging surfaces on the respective clutch sleeves. This requires turning of the roller cages in opposite directions.

Mechanism for effecting this opposite turning movement of the roller cages comprises a plurality of inwardly extending teeth 141 on each of the cages 56. The teeth of one cage engage oblique slots 142 in an adjusting sleeve 143, while the teeth of the other cage engage oppositely oblique grooves 144 in a second adjusting sleeve 145. Sleeves 143 and 145 are provided with axial grooves 146 and 147, respectively. Inwardly directed teeth 148 on sleeve 48 engage grooves 146, and a similar set of teeth 149 on sleeve 51 engage grooves 147.

By reference to Fig. 2 it will be seen that axial movement of sleeves 143 and 145 in the same direction will cause simultaneous rotational movement of cages 56 in opposite directions with respect to the clutch sleeves 48 and 51 with which they are associated.

Sleeves 143 and 145 are concurrently shifted in axial direction by axial movement of the ring member 67, which is grooved to form the outer race for two sets of bearing balls 70, one set running in a groove formed in sleeve 143, and the other set running in a groove formed in sleeve 145. It will be seen that by means of this ball bearing connection, the ring member 67 can rotate with respect to the sleeves 143 and 145. Member 67 is secured by means of the shouldered pins 68 to a shift sleeve 150 slidably mounted on the clutch sleeve 42 and rotatable therewith. Member 67 is provided with oppositely disposed, radially extending arms which carry pins 68, these arms passing through longitudinal slots in the clutch sleeve 42. Slots in sleeve 42 are lined by members 34 forming flanges 35 (Figs. 1 and 6) which project radially inwardly from the sleeve for a purpose which will hereinafter appear. It will be seen that clutch sleeve 42, shift sleeve 150 and the ring member 67 rotate as a unit, sleeve 150 and member 67 being axially movable with respect to sleeve 42.

Sleeve 150 forms the inner race of a ball bearing 151, the outer race of which is formed by a shift ring 152 having an external groove 153.

Referring to Figs. 3 and 4, the reversing mechanism for axially shifting sleeve 150 is shown. This mechanism comprises a reversing shaft 154 carried at its ends by ball bearings 155 mounted in a suitable carrier bolted to the transmission casing. Shaft 154 lies in the central horizontal plane of the transmission and is at right angles to the axis of sleeve 150. At its inner end, shaft 154 is provided with an inwardly projecting pin 156 eccentrically mounted with respect to the axis of the shaft, pin 156 being located in groove 153 of the shift ring 152. The shaft 154 is provided with a spur gear 157, which meshes with gear 158. Gear 158 is preferably provided with three times the number of teeth on gear 157 so that one-sixth of a revolution of gear 158 will cause one-half of a revolution of gear 157 and the reversing shaft. Gear 158 is secured to the inner end of a short stub shaft 159, which is rotatably mounted in the transmission casing and projects therethrough. The projecting end of shaft 159 has formed integrally therewith the reversing ratchet wheel 101.

Turning now to Fig. 1, it will be seen that the clutch sleeve 51 is secured to a sleeve-like member 160, the latter being in turn secured to a relatively heavy inertia weight 161 in the form of a fly-wheel, which will hereinafter be referred to as a reaction inertia weight or mass. Passing through the reaction mass 161 adjacent to its periphery are a plurality of pins 162 serving as pivots for spring hangers 163, which in turn hold the outer ends of a plurality of radially arranged coil springs 164. The inner ends of these springs are held by hangers 165, which are pivoted about pins 166 secured in an annular ring 167 the outer circumference of which forms an inner race for a set of bearing balls 168. The outer race for these bearing balls is formed on the inner periphery of a second annular ring which is centered within the transmission casing and held against rotation by means of the radially positioned studs 169 Fig. 6 (a). The annular ring member 167 is provided with a plurality of radially projecting teeth 170.

As shown in Fig. 3, the teeth 170 are adapted to mesh with teeth 171 on one end of a bell crank lever 172, said lever being pivoted about the fixed pin 173 and having mounted on its other end a ball bearing 174. The outer race of bearing 174 is adapted to be engaged by a cam 175 on the reversing shaft 154. Reversing shaft 154 is further provided with a second cam 176 adapted to engage a cam surface on one end of a second bell crank 177, which is also pivoted around pin 173.

Means are provided for holding bell cranks 172 and 177 in contact with their respective cams, this means being more clearly shown in Fig. 4. The arms of the bell cranks 172 and 177, situated transversely of the axis of shaft 154, are urged inwardly toward the center of the transmission by rods 178 and 179, respectively, these rods being in turn urged inwardly by the action of coil springs 180 and 181 which are held in compression between the transmission casing and collars formed on said rods.

The contour of cam 175 is such that with the reversing shaft in the position shown in Figs. 3 and 4, or turned 180 degrees from this position, spring 180 is permitted to force the teeth 171 of bell crank 172 into mesh with teeth 170 on member 167. In the position shown in these figures, shift sleeve 150 is at one end of its path of axial movement, and when shaft 154 is turned a half revolution from the position shown, sleeve 150 is moved axially to the opposite end of its path of travel by the eccentric pin 156 engaging member 152. It will thus be seen that when sleeve 150 is in either of the end positions of its path of travel, member 167 is locked against rotation by the meshing of teeth 170 and 171. The projecting parts of cam 175, as seen in Fig. 4, force ball bearing 174 to the left (Fig. 3) whenever shaft 154 is turned from the position shown in Fig. 4 or from a position 180 degrees from the position shown in this figure. This action causes teeth 170 and 171 to be disengaged to permit member 167 to rotate on ball bearing 168 during the period when shaft 154 is being turned from either one of its normally stationary positions to the other.

The contour of cam 176 is such that the pressure of bell crank 177 thereon (due to the action of spring 181) tends to hold the shaft 154 firmly in the position shown in Fig. 4 or in a diametrically opposite position. Cam 176, bell crank 177 and spring 181 act to insure reversing movement of shaft 154. Cam 176 has two oppositely projecting cam points, as will be seen by a comparison of Figs. 3 and 4, and in the normal position of rest of shaft 154 one of the cam points abuts against the projecting cam surface on the arm of bell crank 177, as seen in Fig. 4. The form of this cam surface is such that rotation of cam 176 from the position shown in Fig. 3 can be effected only by moving the bell crank 177 to the left, as seen in this figure, and this movement is resisted by spring 181. This results in an initial resistance to turning movement of shaft 154 from the position shown, which resistance ceases as soon as the cam point has passed the projecting surface on the bell crank. Further turning movement of shaft 154, after the cam point passes the resisting projection, is not resisted until the opposite cam point on cam 176 strikes the cam surface at the end of 180 degrees of turning movement of the reversing shaft. It will thus be seen that this mechanism provides a means for initially resisting and then suddenly relieving the resistance to turning movement of the reversing shaft. The reason for this mechanism will be explained later.

Referring again to Fig. 1, it will be seen that the driven shaft 47 is supported at its rearward end by ball bearing 182, the outer race of which is held in a spider 183 secured in the transmission casing. Spider 183 has a limited amount of flexibility, to provide a resilient mounting, and may advantageously have fixed thereon a band of non-metallic material 184 such, for example, as oil proof compressed fiber adapted to absorb or deaden vibration in the spider.

A sleeve 185 is fixed on an octagonal portion 186 of shaft 47 and rotates with the shaft. Formed integral with sleeve 185 is a dished flange 187 to which is secured the driven shaft fly-wheel 49, the latter being annular in form. The inner periphery forms a support for the outer race of ball bearing 188, the inner race of which is secured to and support member 160 fastened to the clutch sleeve 51. The rearward end of the common clutch sleeve 42 is in turn supported from clutch sleeve 51 by the ball bearing 189.

Each of roller cages 56 is centered at one end, and is prevented from moving axially, by ball bearings 190, the inner race of one bearing being formed by a groove in sleeve 48, and the inner race of the other by a groove in sleeve 51.

At its forward end, sleeve 42 is supported by a bearing member 191 interposed between the sleeve and the cylindrically headed stud 192, which serves to secure the fly-wheel 33 to the driving shaft.

Rigidly secured to the rear end of the driven shaft 47, as by means of the splined and threaded member 198 and retaining nut 199, is the hub 200, which is connected to a propeller shaft (assuming the transmission to be installed in an automobile) indicated generally at D, by means of a known form of coupling comprising bolts 201 and a connecting flexible ring 202.

In some instances, shaft D may advantageously be of a form providing more than the usual amount of torsional flexibility. One such form is shown, consisting of a plurality of axially parallel rods 203 spaced equidistant from a common central axis. Rods 203 are bent radially outward at their ends, as at 204, and are anchored in recesses in an annular member 205 having a flanged portion through which alternate coupling bolts 201 pass.

Rods 203 are spread radially by means of ring 206 carried on a pin forming part of the plate member 207 bolted to member 205. An outer protecting tube 208 slidably mounted in member 205 may advantageously be employed. The construction at the opposite end of the propeller shaft D is similar to that just described, providing means whereby the individual rods 203 may be connected to the driving axle through a single coupling.

Lubrication is effected by introducing oil through passage 193, whence it flows through holes 194 in member 191 and axially through the clutch mechanism between the common clutch sleeve 42 and the inner sleeves 48 and 51. Escape of the oil through the slots in sleeve 42 and between sleeves 42 and 150 is prevented by the inwardly projecting flanges 35, since during its axial flow the oil is continuously thrown radially outward against the inner surface of sleeve 42, due to centrifugal force caused by rotation of the clutch parts. After passing through bearing 189 the oil flows between sleeve 42 and member 160, and is thrown outwardly from the sleeve 42 due to centrifugal force caused by rotation of the sleeve. Holes 195 are also provided to catch oil which may leak from between members 192 and 191, and direct this oil within sleeve 42. The entire casing is normally filled with an oil mist, which serves to lubricate the parts to which oil is not directly fed. The oil finally finds its way to the lower art 196 of the casing, from which it is removed through a suitable conduit (not shown) opening into the casing at a point somewhat above the bottom thereof, so that a shallow pool of oil may collect in the bottom of the casing, into which the starter gear teeth 197 may dip.

Operation of the transmission is as follows: If sleeve 42 and the eccentrics thereon are held stationary, and the driving shaft is rotated, the inertia masses will be caused to rotate, by the driving links 134, about their respective eccentric centers. This action will cause each of the masses to be drawn radially inwardly from the extreme outer position shown in Fig. 5 to an extreme inner position, during one-half a revolution. During the succeeding half revolution the weights will each move from their extreme inner positions to their extreme outer positions. During the first half of this cycle of movement the centrifugal force generated by the masses will apply turning moments to sleeve 42 tending to turn it in one direction of rotation, while during the latter half of the cycle a turning moment of opposite sense or direction will be applied to the sleeve. Under the conditions assumed, the cycle of movement will be completed in one revolution of the driving shaft.

If, now, the eccentrics on sleeve 42 move in the direction of rotation of the driving shaft at half driving shaft speed, the masses will require a full revolution of the driving shaft to move from their outermost to their innermost positions, and with increasing speed of sleeve 42 the number of revolutions of the driving shaft required to complete the cycle increases until finally, direct or synchronous drive between the driving member and the sleeve 42 is obtained. Under the condition of synchronous drive the inertia masses travel in a circular path of rotation about the axis of the transmission (which is coaxial with the axis of the driving shaft) as a center rather than about the centers of their respective eccentrics.

The inertia masses 40 constitute the principal members of a planetating mechanism, and since the generation of alternate opposite turning moments by planetating mechanism actuated by a rotary driving member, and the application of such moments to an intermediate transmission member is known per se, further detailed exposition of the manner in which the turning moments are generated is not deemed necessary in this specification. For a more detailed discussion of this phase of the transmission operation reference may be held to my copending application Serial No. 407,236.

The specific construction which I employ is, however, novel and productive of important advantages over prior mechanisms, as will now be pointed out. In accordance with my invention, the masses 40 may be said to be mounted centrifugally on the clutch sleeve 42, so that the forces due to movement of the masses and acting through bearings 136 and 138, are always of the same character, i. e., forces acting radially outwardly from the center of rotation of the sleeve and mass assembly. This eliminates any possibility of backlash between the inertia masses and the clutch sleeve either in direct drive, or in indirect drive when the sense of the produced turning moments applied to the clutch sleeve changes.

When the transmission is operating in indirect drive, that is, with the masses 40 rotating about their respective eccentric centers, the driving links 134 are subjected to alternate tension and compression stresses, which might be expected to produce noisy operation due to backlash between the links and the pins 132 and 135. Such action is, however, avoided by positioning links 134 so that when the transmission is in operation, centrifugal force tends to throw the links outwardly in radial direction, thereby causing them to exert continuous side pressure directed toward the inner semi-circumferences of pins 132 and 135. Therefore, if any looseness exists between the pins and the link bearings, the radially acting force developed by centrifugal force acting on the links prevents play of the pins, when the sense of the stress in the links changes from compression to tension, or vice versa, by direct movement across the bores in the links which form the pin bearings. Instead, play is prevented because the pins will, in effect, roll on the radially inner portions of the link bearings, with which they are maintained in contact by the tendency of the links to fly radially outwardly from the axis of rotation.

It will thus be seen that, in the present construction, continuous torque derived from the driving member is converted into turning moments of opposite sense by mechanism free from backlash, even when such mechanism due to wear or other cause has looseness between the parts thereof. This I regard as an important feature of the invention, since it results in a mechanism the operation of which is quiet not only when the mechanism is new, but also after it has been subjected to long use and consequent unavoidable wear of parts.

The alternate opposite turning moments applied to clutch sleeve 42 when the transmission is in indirect drive, are segregated by means of the clutch mechanism comprising sleeves 42, 48, 51 and the parts associated therewith, the turning moments of one sense or direction being transmitted to the driven member, and the turning moments of the opposite direction being directed toward an abutment in a manner to be described. For purposes of convenience I will hereinafter refer to the turning moments acting in the selected direction of rotation of the driving shaft as positive moments, and the turning moments acting in the opposite direction as negative moments. I will further assume the direction of rotation of the driven shaft giving forward drive to be clockwise as viewed in Figs 6 (b), 7 (a) and 7 (b).

Let it be assumed that the roller detents 52 are held by their cages and springs 57 in the position shown in Fig. 7 (b), so that these detents contact with the inner surface of sleeve 42 and the wedging surfaces 55 of sleeve 48, and so that the detents 53 are held by their cages and springs in a position opposite that shown in Fig. 7 (b), that is, so that they contact the inner surface of sleeve 42 and the oppositely inclined wedging surfaces 54 of sleeve 51. During the periods when positive turning moments are applied to sleeve 42, the detents 52 will transmit the force due to these moments to the sleeve 48 connected to the driven shaft to rotate the latter in positive or clockwise direction. Immediately, however, upon the application of a negative turning moment to sleeve 42, the tendency of the latter to rotate in counter-clockwise direction under the influence of such moment, will cause the detents 53 to grip between the inner surface of sleeve 42 and the wedging surfaces 54 on sleeve 51. Since sleeve 51 is connected to the abutment formed by the transmission frame or casing by way of the inertia mass 161, springs 164, member 167 and bell crank 172, the tendency of the negative turning moment to rotate sleeve 42 in counter-clockwise direction is overcome and movement of the clutch sleeve in this direction is arrested. During the period when a negative turning moment is being applied to sleeve 42 and clockwise rotation of the sleeve ceases, the driven shaft continues rotation in clockwise direction due to the kinetic energy stored in the fly-wheel 49, and this rotation is permitted because of the fact that the sleeve 48 and the roller detents 52 will automatically overrun or free-wheel, in the assumed position of adjustment, whenever the clutch sleeve 48 tends to rotate in clockwise direction with respect to the clutch sleeve 42.

Reversal of the direction of drive of the driven shaft is effected by altering the position of the roller detents 52 and 53 with respect to their respective clutch sleeves 48 and 51, so that detents 52 contact the inner surface of sleeve 42 and the surfaces 54 of sleeve 48, while detents 53 contact the inner surface of sleeve 42 and the surfaces 55 of sleeve 51. With the roller detents adjusted in this manner it will be apparent from a consideration of Fig. 7 (b) that clockwise movement of the sleeve 42, under the influence of clockwise turning moments, will be arrested by detents 53 engaging to transmit the force exerted by these moments to the sleeve 51 connected to the abutment. Likewise, it will be apparent that counter-clockwise rotation of sleeve 42 under the influence of counter-clockwise turning moments will cause detents 52 to transmit such counter-clockwise movement to the driven shaft 47 by their gripping action between the inner surface of sleeve 42 and the surfaces 54 of sleeve 48. Under these conditions the counter-clockwise moments may be said to be the positive moments, since they are in the selected direction of movement of the driven shaft.

From the foregoing it will be seen that the clutch mechanism comprises two reversible, overrunning, one-way clutches, one of them comprising part of the common clutch sleeve 42, detents 52 and sleeve 48, and the other comprising another part of the common clutch sleeve 42, detents 53 and sleeve 51. The former, which transmits turning moments in either selected direction to the driven shaft, I will term an action clutch, and the latter, which directs forces in either selected direction toward the abutment, I will term a reaction clutch. The forces transmitted by the action clutch will be termed action forces, and those transmitted by the reaction clutch will be termed reaction forces.

In the forms of transmission of the type under consideration heretofore developed, the reaction forces have been transmitted from the intermediate member which receives the alternating turning moments to the abutment through a direct connection which in some cases has been rigid and in other cases has been resilient. This has resulted in the transmission of a certain amount of vibration to the abutment formed by the transmission casing, which vibration is undesirable in mechanism of this character.

According to my present invention, the reaction forces are treated in a new and improved manner which eliminates vibration in the transmission due to transmitting the reaction forces to the abutment formed by the casing. The improved result is obtained by the mechanism comprising the reaction inertia mass 161 interposed between the reaction clutch sleeve 51 and the abutment, and the particular manner in which this mass is mounted.

The manner in which the desired object, that is, neutralization of the reaction forces to a degree eliminating perceptible vibration due to these forces, is accomplished, may best be understood by reference to Fig. 6 (b). It will be seen that springs 164, arranged radially, will offer but slight resistance to initial rotational movement of the reaction sleeve 51 and the reaction mass 161 in either direction from the position shown in the figure, since the reaction sleeve can rotate through an appreciable angle to either side of this position without appreciably stretching the springs. However, as the springs are all carried from their radial positions by rotation of sleeve 51 from its position of rest, given increments of angular displacement of the reaction sleeve result in progressively greater increments of linear stretch of the springs, which consequently resist such movement with rapidity increasing force as the angular displacement increases. The dash-and-dot lines in Fig. 6 (b) show a stretched position of one of the springs. The net result is that the radially arranged springs act as light springs when the displacement of sleeve 51 from its position of rest is relatively small, and as springs of progressively increasing strength as the displacement of sleeve 51 from its position of rest increases.

Now let it be assumed that the transmission is adjusted for clockwise drive and that alternate opposite turning moments are applied to sleeve 42, the counter-clockwise moments being transmitted to sleeve 51 by the reaction clutch rollers 53. While the following discussion applies equally well whether the direction of view is that of Fig. 6 (a) or Fig. 6 (b), it is probably clearer to consider Fig. 6 (b) since clockwise movement of the driven shaft as viewed in this direction gives forward drive for an automobile. The first turning moment transmitted to sleeve 51 will be applied with the mass 161 in the position shown in Figure 6 (b) and with the springs 164 in radial position and exerting very little force tending to hold the mass against rotation. The energy represented by the turning moment will be largely absorbed in overcoming the inertia of the mass 161, and the energy so absorbed by the mass will act to rotate it also in counter-clockwise direction against the progressively increasing resistance of the anchored radial springs, which quickly stop rotation of the wheel in this direction as their tension is increased by movement of the mass. The radial springs absorb the energy of momentum in the mass by reducing this momentum to zero, and immediately return this energy in the form of force tending to move the mass in clockwise direction toward its position of rest. If the mass were permitted to rotate in clockwise direction under the influence of the springs, from its displaced position to its position of rest, all of the energy imparted to it by the turning moment (disregarding friction losses) would again be present in the mass in the form of kinetic energy of momentum.

It must be borne in mind, however, that the turning moments applied to sleeve 42 cause it to tend to oscillate with considerable rapidity. Rotation of sleeve 42 in counter-clockwise direction is, however, practically instantly stopped by the engagement of the reaction clutch which connects sleeve 42 to the reaction inertia mass. This instant engagement of the reaction clutch prevents an impact connection between sleeve 42 and the mass, and while the forces transmitted through the clutch are of a high value and act only for very short periods of time, the functioning of the reaction clutch is smooth due to the fact that it engages at the instant when there is no differential rotational speed between clutch sleeves 42 and 51. Stopping of the motion of sleeve 42 in counter-clockwise direction is accomplished by the inertia of the reaction mass and not by the springs, since at the instant of engagement of the reaction clutch, the springs holding the reaction mass offer substantially no resistance to rotational movement of the mass. As the reaction mass begins to move in counter-clockwise direction due to the force transmitted thereto from sleeve 42 by the reaction clutch, sleeve 42 will begin to move in the opposite or clockwise direction under the influence of the succeeding clockwise turning moment applied to it by the inertia masses 40. It will thus be seen that immediately after engagement of the reaction clutch, sleeves 42 and 51 will rotate in opposite directions and the reaction clutch will overrun.

The reaction clutch will continue to overrun as long as sleeve 51 moves in counter-clockwise direction with respect to sleeve 42, regardless of the absolute direction of rotation of either of these sleeves.

Springs 164 will stop the counter-clockwise rotation of the reaction mass and sleeve 51 and tend to reverse their direction of movement from counter-clockwise to clockwise. Since this action takes place when sleeve 42 is moving in clockwise direction under the influence of the masses 40, it is not resisted at its inception and the reaction mass gathers momentum in clockwise direction. The speed of sleeve 42 in clockwise direction decreases rapidly, due to the action of masses 40 imparting to it the succeeding counter-clockwise turning moment, and the instant that sleeves 42 and 51 reach the same relative speed with respect to each other, with sleeve 51 tending to continue in clockwise direction under the influence of the moving mass 161, and sleeve 42 tending to reverse its direction of rotation under the influence of masses 40, the reaction clutch engages. Thus the counter-clockwise moment applied to sleeve 42 is largely neutralized in overcoming the momentum of the mass 161 moving in clockwise direction and again reversing the direction of rotation of this mass.

In this connection, it is important to note that even though the reaction mass may be moving in a direction opposite to that in which the clutch sleeve 42 is tending to rotate, the engagement of the reaction clutch produces no impact, due to the fact that the clutch always engages at an instant when there is no relative rotational speed between sleeves 42 and 51.

The magnitude of the forces due to the counter-clockwise turning moments applied to sleeve 42 will vary in magnitude with variations in conditions of drive, and the amount of average displacement of the reaction mass from its position of rest will vary accordingly, but under conditions of drive producing counter-clockwise or reaction turning moments, this mass will oscillate, once it is set in motion, in out-of-phase relation to such turning moments and will produce, due to momentum of the mass, intermittent forces synchronized with and opposing the force produced by the counter clockwise or reaction turning moments. These synchronized forces derived from kinetic energy of momentum of the mass largely neutralize the forces produced by the reaction turning moments. It may be said that in effect the reaction mass absorbs the major part of the energy from each reaction turning moment and transforms this energy into a dynamic force for counteracting the force produced by the succeeding reaction turning moment.

The above described action is not to be confused with the action taking place in transmissions of the same general type in which cushioning of the action of the reaction clutch or its functional equivalent is attempted to be effected by the interposition of springs alone between the reaction clutch and the abutment.

The difference between the above two forms of construction may be illustrated by the following example: Assume first, that the transfer of a given reaction force directly to a fixed abutment results in the imposition of an engagement stress X on the clutch parts. Now suppose a spring is placed between the clutch parts and the abutment, and a reaction force of the same value is transmitted. The stress on the parts as the clutch is engaged will be less than X due to the fact that one of the clutch parts can give because of the resiliency of the spring. If now, the action described in connection with my present invention is recalled, it will be plain that the stresses imposed on the reaction clutch parts at the time of engagement of the clutch will, assuming again that a reaction force of the same value is transmitted, be greater than, instead of less than, X, due to the fact that the reaction force is met by an opposite and nearly equal force derived from the moving reaction mass, and these forces are joined by non-yielding mechanism.

From this it would appear at first that my invention, involving higher clutch stresses, is a step backward, but I have found that by the means I employ I eliminate undesirable vibration of the fixed abutment, which occurs when the reaction clutch is rigidly connected thereto, which vibration cannot be eliminated merely by the use of a spring connection between these parts.

The springs 164 must, of course, exert a variable force on the abutment as they alternately stretch and contract, but the force so transmitted by them is in the nature of a relatively even force which varies as the average displacement of the springs varies under different load conditions. Furthermore, the opposed radial position of the springs causes the radial component of the force transmitted to the abutment by each spring to be balanced by the radial component of the force transmitted by the opposite spring. The net result is that the only unbalanced force transmitted to the abutment is the sum of the tangential components of the forces transmitted by the springs when they are drawn from their radial positions by movement of the reaction mass, and this force reaches its greatest magnitude when the reaction clutch is out of engagement. The reduction in the magnitude of the force transmitted to the abutment by the springs to a value materially lower than the force of the reaction turning moments is of material value in connection with reversing the transmission, as will presently appear.

Shifting of the roller detents in the action and reaction clutches to effect reversal of the driven shaft should not take place when the driven parts of the transmission including this shaft and the driven shaft fly-wheel are turning, since if this shift were made with these parts in motion, the parts of the clutch mechanism would be subjected to excessive stresses which might damage the transmission. The driven shaft is therefore stopped before reversal takes place in a manner which will be described later. However, in connection with reversing of the transmission, another factor must be taken into consideration. Suppose, with the transmission adjusted for one direction of drive, the driven shaft is stopped under conditions imposing a turning moment thereon in a sense opposite the sense of the selected direction of drive. Under such conditions reverse rotation of the driven shaft is prevented by the action and reaction clutches gripping to rigidly connect the driven shaft and the abutment. The roller detents of the clutches are, under such conditions, tightly gripped between the wedging surfaces of the clutch sleeves, and in order to effect reversal without the necessity of applying a tremendous disengaging force to the rollers, the stress thereon must be relieved. This stress release is accomplished by disengagement of the teeth 170 and 171 (see Figs. 1 and 3) upon turning movement of shaft 154, thus permitting the annular member 167 to rotate on bearing 168. This action, it will be seen, releases the clutch rollers from stress by freeing the reaction sleeve 51.

From Fig. 3 it will be seen that movement of shaft 154 through one-half a revolution from the position shown in the figure, by turning the ratchet wheel one-sixth of a revolution, will move shift sleeve 150 from one end of its axial path of travel to the other end and will concurrently, through the action of cam 175 and bell crank 172, disengage teeth 171 from teeth 170 at the beginning of the movement and reengage them as the movement is completed. Movement of shift sleeve 150 through its axial path of travel causes the adjusting sleeves 143 and 145 to rotate the clutch cages and rollers simultaneously in opposite directions with respect to their associated clutch sleeves, this movement acting to adjust the transmission for drive in reverse direction. It will thus be seen that during the period when reversing adjustment is taking place by shifting movement of sleeve 150, the stress on the clutches is relieved by actuation of the releasable coupling formed between the member 167 and the abutment.

Since reversal can take place during periods when the driving mechanism is transmitting turning moments to the sleeve 42, it is essential that the reversing movement take place with relatively great rapidity, so that during the time when the mass 161 is free to rotate because of disengagement of teeth 171, it will not be possible for this mass to gather momentum due to impulses received through the reaction clutch while it is free to rotate. The teeth 171 must be brought out of engagement before the clutch rollers are moved out of engagement, since the stress release must precede the reversing movement of the rollers. Suppose, for example, that the shaft 154 were moved just sufficiently to disengage the teeth forming the releasable coupling, without being moved sufficiently to disengage the clutch rollers. Under these conditions the driving mechanism would cause reaction forces to be applied to the mass 161, and the latter, being free to rotate, would very quickly reach a high speed of rotation, causing the development of a large force of momentum in the mass. If with the mass rotating at high speed, the clutch rollers were reversed, the clutch parts upon reengagement would have to practically instantly absorb all of the energy of momentum in the rotating mass, which would obviously impose upon these parts a stress of destructive proportions. It is for this reason that reversal must be effected with great rapidity. The manner in which rapid reversal is effected, by means of cam 176 and bell crank 177, has already been described.

In Figs. 8 to 39 I have illustrated another embodiment of my invention representing a highly efficient commercial form of apparatus which has been successfully operated in the United States over a distance of many thousand miles. This embodiment comprises a number of specific improvements which are disclosed and claimed in the co-pending applications which will be hereinafter referred to, and is furthermore illustrated in conjunction with a unitary control system governing the operation of the transmission and the braking means for the driven shaft which, as will presently appear, is suitable for use in conjunction not only with this form of the transmission, but also with the form disclosed in Fig. 1.

Turning now to Fig. 8, reference character 32 designates the engine driving shaft and 33 the fly-wheel, which is secured to the flanged end of shaft 32 by screws 210. Fly-wheel 33 is formed with a central annular hub 211 in driving engagement with the splined end of shaft 212, the opposite end of which is also splined as at 213. The splined end 213 of the shaft is rigidly secured in driving engagement with one end of a tubular member 214, which surrounds shaft 212 for the major portion of its length. An annular clearance space is provided between shaft 212 and the surrounding member 214, and the latter member is provided with a number of holes 215 distributed along its length for a purpose to be set forth later. Member 214, at the end adjacent to the fly-wheel 33, is rigidly secured to the annular hub 216 of a secondary fly-wheel 217, which is journalled on a bearing sleeve 218 fitted over the hub 211 of fly-wheel 33. The secondary fly-wheel 217 has mounted thereon the driving pins 135 (see Fig. 9), and it will be seen that shaft 212 and tubular member 214 provide a relatively long and torsionally resilient driving connection between the shaft 32 and the fly-wheel carrying the driving pins. Frictional damping means is provided to prevent torsional vibration between fly-wheels 33 and 217. This means comprises a circumferential flange 219 forming part of fly-wheel 33 and encircling fly-wheel 217, the rim of the latter being in the form of a shallow V-groove. A pair of friction rings 220 of triangular section engage the inner face of flange 219 and the sides of the groove, under the influence of a number of small springs interposed between the rings. These rings provide only sufficient resistance to relative rotational movement of the fly-wheels to damped periodic vibrations, without in any way interfering with the relative, displacement of the fly-wheels due to torsional resiliency in the driving members connecting them.

The inertia masses 40 are carried on the common clutch sleeve 42, which is provided with two pairs of eccentrics 137 and 139 diametrically opposite with respect to each other as in the form of transmission shown in Fig. 1. In this embodiment the masses 40 are secured to their respective eccentrics by means of U-shaped straps 221 between which and the eccentrics are located the ball bearings 136 and 138. As in the previously described modification, one mass 40 is of T section and the other is of forked or U section to provide clearance enabling the two masses to approach each other in telescoping relation when the position of the eccentrics is opposite that shown in Fig. 9.

Straps 221 are preferably made flexible and yielding to a limited degree to evenly distribute the stresses transferred to the bearings 136 and 138.

Masses 40 are rotated at fly-wheel speed by driving links 134 pivotally secured to pins 135 and driving pins 132.

In this form of transmission, compactness is secured by arranging the action and reaction clutch mechanisms concentrically, one inside and the other outside of the common clutch sleeve 42. Sleeve 42, which with sleeve 48 and roller detents 52 forms the action clutch, is supported at its forward end by a ball bearing 222 located inside sleeve 42, and at its rearward end is supported by the annular member 223 to which it is secured in driving engagement by splines 224. Member 223 is in turn supported by ball bearing 225, the outer race of which is secured in the transmission frame or casing. A speedometer gear 209 is conveniently driven from threads at the forward end of member 223.

Drive is transmitted from the splined end of sleeve 48 to the hub 226 of the driven shaft fly-wheel 49, and from this member to the propeller shaft indicated at D. A cap 227, screwed on the end of sleeve 48, secures hub 226 against axial movement.

The sets of action clutch roller detents 52 are provided, these rollers being held in an inner roller cage 228 in engagement with the inner cylindrical surface of sleeve 42 and either the inclined wedging surfaces 54 or 55 on sleeve 48 (Figs. 14 (a) and 14 (b), depending on the position of the cage. Two sets of detents are employed in this clutch instead of one, in order to obtain the desired area of gripping contact without having to resort to the use of detents of undue length. The action of each set of detents is identical with that of the other. The stationary or reaction clutch sleeve 51 encircles the portion of the common clutch sleeve 42 within which is located the action clutch, sleeve 51 being provided with internal longitudinal grooves forming oppositely inclined wedging surfaces 54 and 55. A single set of reaction roller detents 53, held in an outer roller cage 229, is arranged to engage the cylindrical outer surface of sleeve 42 and either of the series of wedging surfaces on sleeve 51. As in the form of apparatus shown in Fig. 1, rotational movement of the roller cages with respect to the clutch sleeves with which they respectively co-act, determines which series of surfaces are engaged by the roller detents.

Due to the greater diameter of the reaction clutch in this embodiment, a larger number of roller detents can be employed in a single set than in the action clutch, and I have found that a single set of detents of moderate length is sufficient to transmit the reaction forces. In the present embodiment, the ratio of clutch diameters is such that while each set of action detents comprises but nine, giving a total of eighteen in the action clutch, sixteen detents of the same diameter can be placed in a single set in the reaction clutch.

The inner or action clutch cage 228, the left-hand half of which is shown in Fig. 10, comprises a slotted cage member formed with ribs or partitions 58. End rings 230 and an intermediate ring 231 are riveted inside the cage member, and are notched as at 232 to receive the roller ends of leaf springs 57 adapted to engage rollers 52 midway of their length and, if not otherwise biased, to center the rollers in their slots. In this embodiment the springs 57 receive no backing by a non-yielding member intermediate their end supports, since ribs 58 are radially outside springs 57 and notches 232 and serve merely to form the cage. It is important for the springs to be held against play in the cages, and this is accomplished by interposing between each pair of springs located in the ring notches 232, a very light, normally curved auxiliary spring 233 which acts to take up all play and tends to keep the outer faces of the spring ends in light contact with the faces of the ring notches.

The action of spring 233 is clearly shown in Fig. 13, in which the clearance or play between the ends of springs 57 is shown greatly exaggerated. Spring 233 also serves the important purpose of providing a very light starting pressure on the roller detents.

The construction of the roller cage and spring assembly of the reaction clutch is essentially the same as that just described, except that in the reaction clutch cage the intermediate ring 231 is omitted.

In Fig. 14 (a) the relative positions of the clutch roller detents and cages, with respect to the several clutch sleeves, are shown with the mechanism adjusted for drive in clockwise direction, which has been assumed as positive direction. In this position of adjustment, the action clutch detents 52 are in contact with the inner surface of clutch sleeve 42 and with surfaces 55 of the driven clutch sleeve 48, while the reaction clutch detents 53 are in contact with the outer surface of the common clutch sleeve 42 and surfaces 54 of the stationary or reaction clutch sleeve 51. The manner in which this adjustment of the roller cages causes drive in clockwise or positive direction will be understood from the explanation already given in connection with the description of the preceding embodiment of the invention.

In Fig. 14 (b) the clutch cages are shown adjusted for drive in counter-clockwise or negative direction, each set of roller detents being in contact with surfaces oppositely inclined to the surfaces with which they are shown in contact in the upper half of the figure.

From an inspection of Figs. 14 (a) and 14 (b) it will be seen that adjustment of the roller cages to effect change in the direction of drive from clockwise to counter-clockwise is secured by turning the inner or action clutch roller cage 228 in counter-clockwise direction with respect to sleeve 48, and by turning the outer or reaction clutch cage 229 in clockwise direction with respect to sleeve 51.

Figs. 14 (a) and 14 (b) illustrate very clearly the action of the roller clutches in preventing the driven shaft from rotating in a direction opposite that for which the clutches are adjusted. For example, if the driven clutch sleeve 48 tends to rotate in counter-clockwise direction with the clutches adjusted in the manner shown in Fig. 14 (a), it will be clear that such rotation will be prevented due to the gripping of detents 52 between surfaces 55 on sleeve 48 and the inner surface of 42, and the gripping of detents 53 between surfaces 54 on sleeve 51 and the outer surface of sleeve 42. This action prevents counter-clockwise rotation of sleeve 48 with respect to sleeve 51, and since the latter sleeve is secured to an abutment, sleeve 48 is held against counter-clockwise movement.

It will be noted that the contours of the gripping surfaces 54 and 55 on sleeves 48 and 51 in Figs. 14 (a) and 14 (b) differ in form from the contours of the corresponding surfaces shown in Figs. 7 (a) and 7 (b). In the latter figures, the angle between tangents to the surfaces at the point where they are contacted by the detents does not increase as the detents move toward engaging position. On the other hand, the contour of the surfaces in Figs. 14 (a) and 14 (b) is such that the angle between the two corresponding tangents, which angle may be conveniently termed the angle of approach of the surfaces, does increase as the detents are moved toward engaging position. The latter arrangement of the surfaces is in the nature of an improvement over the former since it results in an automatic tendency on the part of the roller detents to center themselves in the cage slots and prevents their being forced so far from their proper positions in the cages as to strike the ribs or partitions thereof and deform them.

In order to effect reversal of the positions of the cages holding the roller detents, I employ mechanism shown in Figs. 15 to 20. This mechanism comprises axially displaceable adjusting sleeves 234 and 235 corresponding in function to sleeves 143 and 145 shown in Fig. 2. Sleeve 234 surrounds sleeve 48 to the right (Fig. 15) of the action clutch, and the right-hand end of sleeve 234 is provided with a number of internal teeth 236 passing through slots 237 in a spacing sleeve 238 and engaging the splines 224 in the driven clutch sleeve 48. The left-hand end of sleeve 234 is formed with a number of oblique internal teeth 239 engaging corresponding oblique external grooves 240 in a rotatable shift sleeve 241. Sleeve 241 is mounted on sleeve 48. It can rotate with and also relatively to sleeve 48, but does not have axial movement. Three fingers 242 (Figs. 15, 16, 17 and particularly 20) project from the left end of sleeve 241 to engage suitable slots 243 in the flanged right-hand ring 230 of the inner roller cage 228. Splines 224 on sleeve 48 prevent rotation of sleeve 234 with respect to sleeve 48 but permit axial movement thereof. Axial movement of sleeve 234 causes rotation of sleeve 241 through the action of teeth 239 in grooves 240. Rotation of sleeve 241 is transferred by means of fingers 242 to the cage 228 to shift the latter rotationally with respect to sleeve 48.

Sleeve 48 is formed with arcuate shoulders 244 (Figs. 15 and 17) between which fingers 242 extend and upon which is mounted the inner race ring 245 of ball bearing 246 forming the support of the rearward end of sleeve 42. Ring 245 has an annular cup-shaped extension 247 enclosing the end of sleeve 42 for a purpose which will be explained later. Bearing rings 248 and 249 act as spacers to prevent axial movement of shift sleeve 241 due to end thrust caused by axial movement of sleeve 234.

Near its center, sleeve 234 is exteriorly threaded to receive the inner race ring of ball bearing 250, the outer race of which is formed by the ring 251. Bearing 250 permits sleeve 234, which rotates with sleeve 48, to be shifted axially by thrust from the rotationally stationary ring 251. A second ring 252 is mounted in sliding engagement within ring 251, the left end of ring 252 projecting to form the inner race of ball bearing 253, the outer race ring of which is secured, as by threads, to the right-hand end of shift sleeve 235. Bearing 253 acts to transmit axial thrust from ring 252 to sleeve 235, while permitting relative rotation of these parts.

Shift sleeve 235 acts by axial movement to rotate the outer or reaction clutch cage 229 with respect to sleeve 51, and to this end is provided with a plurality of longitudinal slots 254 in which are situated square pins 255 extending inwardly from an extension member 256 rigidly secured to the end of sleeve 51. This slotted sleeve and pin arrangement permits axial movement, and prevents rotational movement, of sleeve 235 with respect to sleeve 51.

The right-hand end ring of cage 229 is extended as at 257 and carries a plurality of external pins 258 (see Fig. 18). Pins 258 are in sliding engagement with oblique slots 259 in sleeve 235. Slots 254 and 259 are preferably arranged alternately around the circumference of sleeve 235, and it will be seen from a consideration of Fig. 18 that axial movement of sleeve 235 will cause the roller cage 229 to move rotationally with respect to the sleeve 51.

Grooves 240 in the sleeve 241, and the slots 259 in sleeve 235, are oppositely oblique so that axial movement in the same direction of rings 251 and 252, causing axial movement in the same direction of sleeves 234 and 235 and will cause opposite rotational movements of roller cages 228 and 229 with respect to their respective clutch sleeves 48 and 51. This opposite rotational movement of the clutch roller cages effects reversal in the direction of drive in the same manner as has been previously described.

Referring again to Fig. 8, it will be seen that the reaction clutch sleeve 51 is mounted at its forward or left-hand end on a ball bearing 260 fixed to the common clutch sleeve 42. At its right-hand end, sleeve 51 carries a bearing 261, which engages the extension 257 forming part of the roller cage 229.

The left-hand end of sleeve 51 is flanged and has riveted thereto the reaction inertia mass 262 which is in the form of a cup-shaped wheel encompassing the inertia masses 40. The rim of this wheel is grooved at 263 to receive a split guide ring 264 extending into a groove 265 in the transmission casing. Ring 264 normally contracts into groove 263 to permit assembly, and after assembly of mass 262 within the casing, is expanded into groove 265 by means of the threaded wedge 266 (Fig. 9), which is moved by screwing stud 267 thereinto from the exterior of the casing. The split guide ring 264 acts to take up end thrust imposed on sleeve 51 and also, with bearing 260, serves to keep sleeve 51 concentrically centered with respect to clutch sleeve 42.

Adjacent to its left-hand end, sleeve 51 is provided with a plurality of pairs of ears 268 (see also Fig. 21), the pairs of ears 268 serving to secure pins 166 upon which are pivotally mounted the spring hangers 165 anchoring the inner ends of the radial coil springs 164. The outer ends of springs 164 are secured through anchor members 163 to a dished retaining member 269, which is in turn releasably secured to the frame or casing of the transmission in a manner to be described. It will be seen that the inertia mass and spring arrangement is similar to that shown in Fig. 6 (a) and 6 (b), and while the number of springs employed may vary, I have found that six is a suitable number.

The transmission casing is recessed at 270 to receive an annular member 271, which is rigidly secured to the casing by bolts 272. The inner surface of the outer web of member 271 is grooved to provide angularly disposed surfaces 273 adapted to be engaged by a series of balls 274 passing through suitably spaced holes in the flange 275 of the retaining member 269. Balls 274 are held in position by a split ring 276 lying within the annular recess formed by member 271. Ring 276 is provided with a series of arcuate slots 277 (Fig. 21), through which pins 278 pass, these pins being riveted to member 271 and slidably engaging the slots to center the ring while permitting a limited rotational movement thereof. The split ring may therefore be said to be substantially fixed with respect to the abutment.

It will be seen that if ring 276 is expanded or spread sufficiently, the force exerted thereby on balls 274 will act to frictionally lock them between the ring 276 and the surfaces 273, thereby holding the retaining member 269 against rotation. If the ring 276 is collapsed sufficiently to relieve the stress on balls 274, the assembly comprising member 271, balls 274 and ring 276 will become in effect a ball bearing permitting the retaining member 269 to rotate freely under the influence of any rotational forces which may be transmitted to it through the springs 164.

From the above description it will be evident that this assembly is functionally a counterpart of the locking device comprising teeth 170 and 171 shown in Fig. 3. The present form is, however, to be preferred, since the coupling is held by friction and avoids any difficulty which may arise in radially meshing a set of locking teeth. Furthermore, this specific type of friction coupling is an improvement over the types of friction couplings heretofore employed, since by the use of circular elements such as balls it avoids large areas of contact between friction surfaces by providing substantially point contact therebetween. If these elements are extended so that they are circular in section in a plurality of spaced parallel planes, the point contact provided by the spherical form of circular elements will be extended to provide line contact, but either point contact or line contact will effect the desired avoidance of substantial areas of surface in frictional contact with each other. By the use of circular elements a coupling is provided in which the friction coefficient remains substantially constant under all conditions, which is not the case in the ordinary plate form of friction coupling where the coefficient of friction will vary over wide limits with variations in the character of the friction surfaces and variations in the character and viscosity of the lubricant. This latter consideration is of major importance, since the coupling must operate within a transmission which at all times contains a quantity of lubricant some of which reaches the coupling.

It is to be noted that in conjunction with the releasable coupling both in this form of the transmission and in the form illustrated in Fig. 1, another important practical advantage is obtained from the use of the reaction inertia mass. As has previously been explained, this mass acts to materially reduce the magnitude of the reaction forces which reach the abutment, and since these forces reach the abutment by way of the releasable coupling, it will be evident that this coupling can be made much more readily and of much lighter construction in both of the forms of transmission herein illustrated than would be possible if the reaction inertia mass were omitted.

I have found from experience that the magnitude of the reaction forces transmitted to the abutment when the reaction inertia mass is employed, is only about one-third the magnitude of these forces when this mass is not employed.

Figure 22:
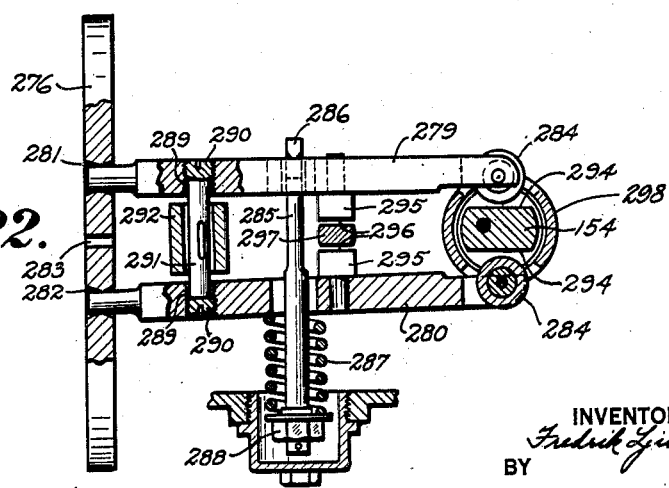
Fig. 22 is a section taken on the line 22—22 of Fig. 21.
Figure 24:
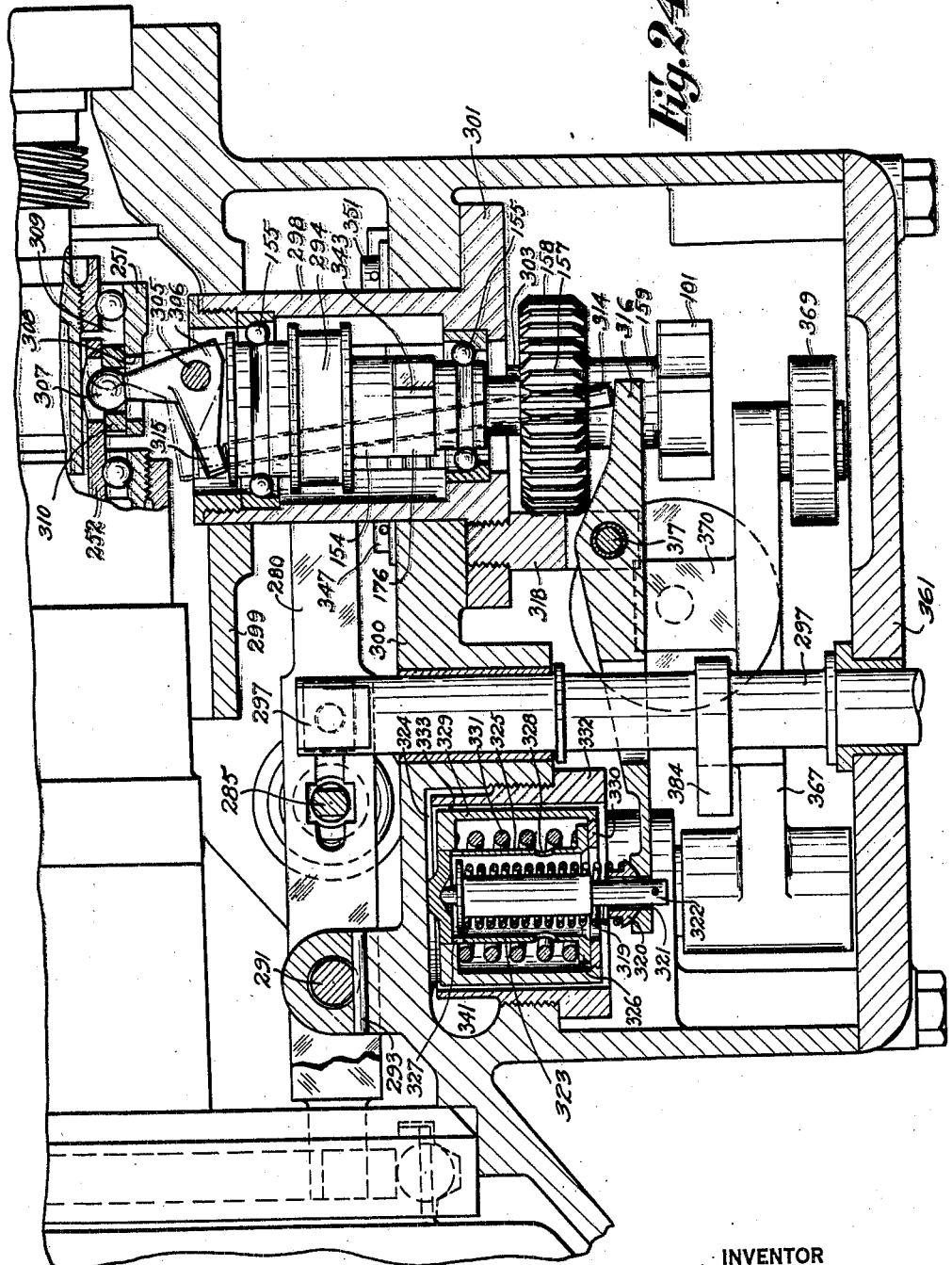
Fig. 24 is a section on an enlarged scale taken on the line 24—24 of Fig. 23, certain parts being omitted for clearness.

The mechanism for collapsing and expanding ring 276 is shown in Figs. 22 and 24. This mechanism closely resembles a pair of scissors and will hereinafter be referred to as scissor mechanism or scissors. It comprises a pair of floating levers 279 and 280 lying in a plane at right angles to the plane of ring 276. The forward ends of these levers engage holes 281 and 282 passing through ring 276 adjacent to the point 283 where the ring is parted. The opposite ends of the levers are forked and have mounted thereon rollers 284, between which is situated the reversing shaft 154. About midway of their ends the levers are pierced to permit the passage therethrough of the rod 285, the upper end of the rod being formed with a head 286 having a knife edge bearing on the upper face of lever 279. The lower end of rod 285 extends below lever 280 and is surrounded by the coil spring 287, which is compressed between the lower face of lever 280 and the retaining nut 288 screwed on the lower end of the rod. Between the holes through which rod 285 passes and the ends of the levers engaging ring 276, the levers are provided with threaded holes 289 into which are screwed adjusting nuts 290, the latter engaging the ends of a distance pin 291. Pin 291 passes loosely through an annular boss 292 forming part of the transmission casing, and is held in position by the retaining pin 293 (Fig. 24). With the scissors as shown in Fig. 22 it will be seen that the spring 287 tends to move the right-hand ends of the levers 279 and 280 together about the distance pin 291 as a fulcrum, thus spreading the left ends of the levers and expanding ring 276 to lock the balls 274 in position. It is to be noted that the adjusting nuts 290 are set so that with ring 276 fully expanded, a clearance is left between rollers 284 and the parallel cam faces 294 formed on shaft 154, where it passes between the rollers.

Levers 279 and 280 are provided with inwardly extending bosses 295 adapted to be engaged by flat cam faces 296 upon rotation of a release shaft 297. The function of this release shaft will be explained later.

Figure 23:
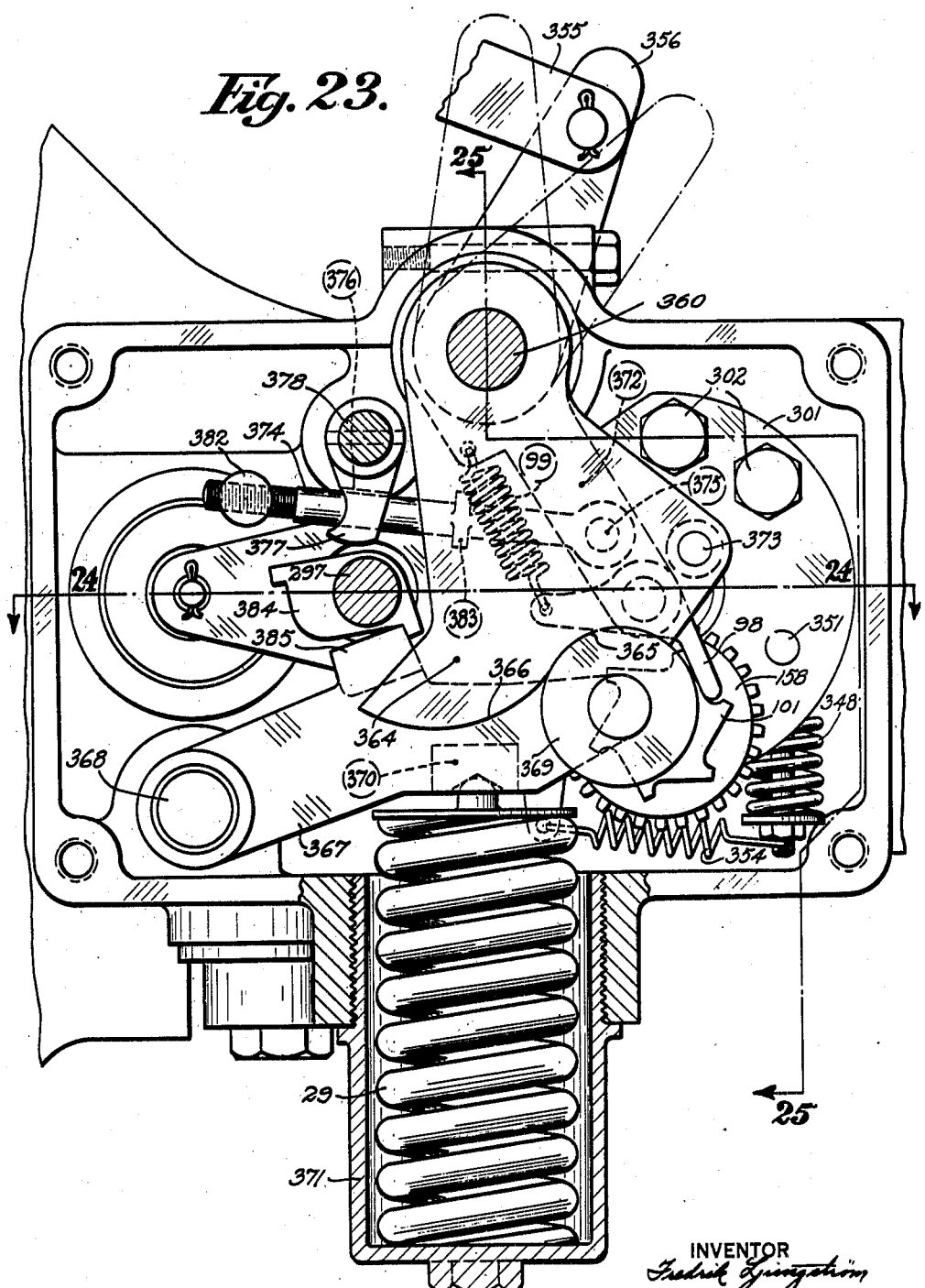
Fig. 23 is an elevation on an enlarged scale of the transmission control mechanism as seen in Fig. 31, with the housing cover plate removed.
Figure 25:
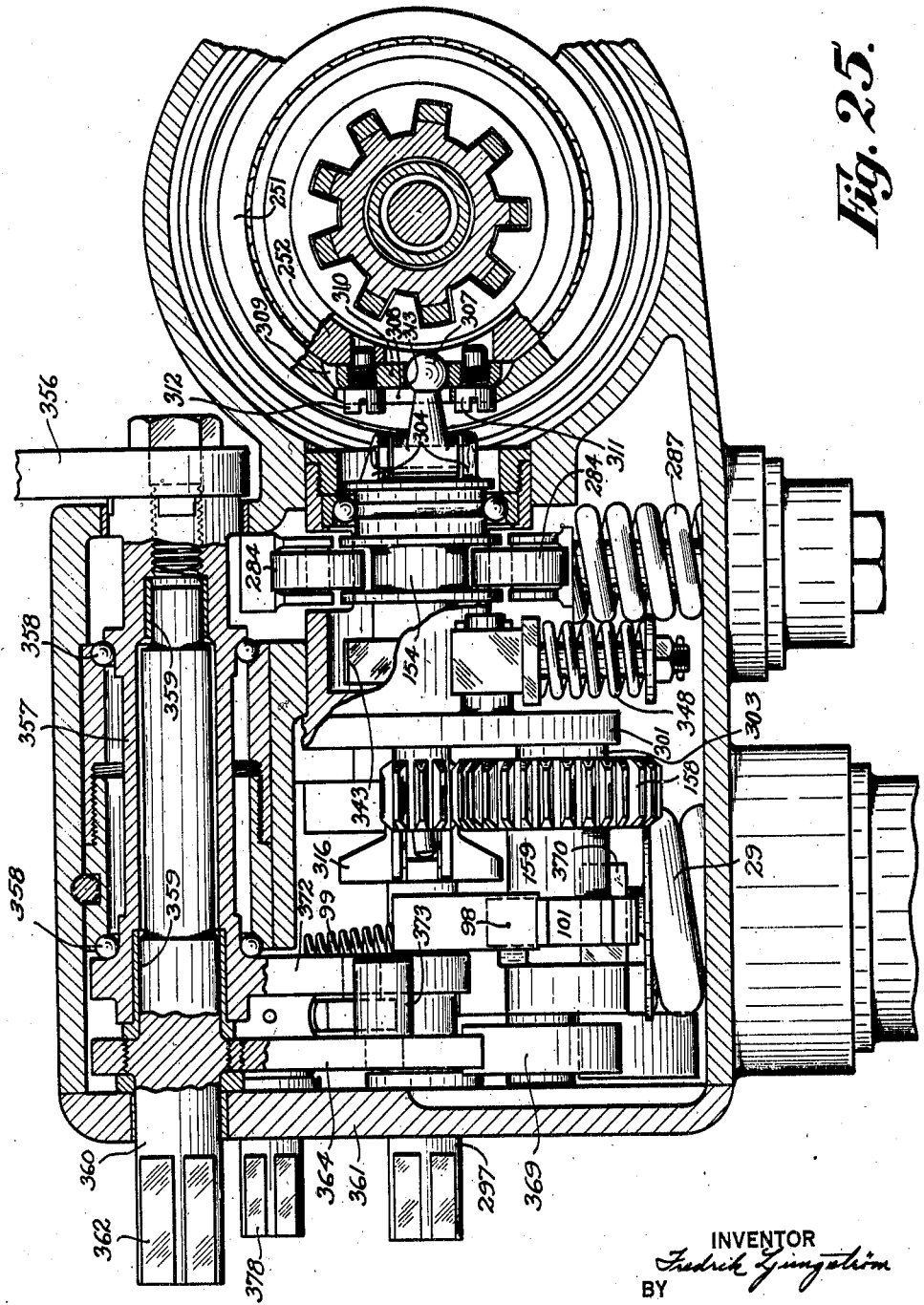
Fig. 25 is a section on an enlarged scale taken on the line 25—25 of Fig. 23, with certain parts broken away.

Turning now to Figs. 23 to 25, it will be seen that the reversing shaft 154 is rotatably mounted on ball bearings 155 within a removable cylindrical housing 298 supported by webs 299 and 300 forming part of the transmission casing and passing through said webs. The outer end of housing 298 is flanged at 301 and is secured to web 300 by studs 302. The outer end of shaft 154 is provided with the spur gear 157 meshing with gear 158 forming part of the reversing member 159 rotatably mounted on a stud 303 extending outwardly from flange 301 at a point below the reversing shaft 154. The reversing member 159 carries at its outer end the reversing ratchet wheel 101 which, as in the modification previously described, is provided with six ratchet teeth. Also, the ratio of the numbers of teeth on gears 158 and 157 is three to one, so that one-sixth of a revolution of the wheel 101 effects a half revolution of the reversing shaft 154.

The inner end of shaft 154 is provided with a pair of spaced axially extending ears 304 (Fig. 25) through which a transverse pin 305 (Fig. 24), offset with respect to the axis of shaft 154, passes. Pin 305 serves as a pivot for the bell crank 306, one arm of which extends inwardly from the end of shaft 154 in generally axial direction. The end of this arm is in the form of a ball 307.

As will be seen most clearly in Fig. 25, the outer reversing ring 251 is apertured (see also Fig. 18) at 308, and the inside of the ring adjacent to the aperture is milled to a plane surface. The outer surface of ring 252 is also milled to a plane surface spaced from the inner surface of ring 251 to form a recess 309 in which is located an equalizing lever 310. One end of lever 310 is pivoted to ring 251 by means of stud 311, and the other end is pivoted to ring 252 by stud 312.

Lever 310 is moved by ball 307, which engages the periphery of a hole 313 passing through the lever at a point somewhat nearer stud 311 than stud 312.

Hole 313 is offset from the center of lever 310 in order to transmit equal unit engaging forces to the roller detents 52 and 53 through the mechanism which adjusts the position of these detents. Since the number of detents is different in the two clutches and since the diameters of the parts forming the two clutch assemblies are different, a different total adjusting force is required on the two clutch assemblies if the same unit pressures are to be obtained on the detents, and this difference in the total forces is secured by the above described lever arrangement connecting ball 307 with the rings 251 and 252.

The amount of axial displacement of rings 251 and 252 from their center position is determined by the amount of eccentricity of ball 307 with respect to the axis of shaft 154, and this eccentricity may be varied by mechanism which I will now describe. A rod 314 (Fig. 24) passes loosely through a hole drilled obliquely through shaft 154 so that the inner end of this rod engages the arm 315 of the bell crank lever 306. The outer end of rod 314 projects beyond the end of shaft 154 and it will be seen from Fig. 24 that if this end of the rod is pressed inwardly it will, from the action of the bell crank lever 306 and ball 307, tend to increase the movement of rings 251 and 252 from their center position. Inwardly directed pressure is applied to rod 314 by means of the lever 316, pivoted intermediate its ends about pin 317, the latter pin being mounted in the forked stud 318 screwed into the flange 301 of the reversing shaft housing. One end of lever 316 engages rod 314 while the opposite end is forced outwardly by a coil spring 319. Spring 319 bears at one end against a retainer 320 which in turn seats against lever 316 around an aperture 321 in the latter, through which the shouldered pin 322 loosely passes. The opposite end of spring 319 bears against a flange adjacent to one end of pin 322. Pin 322 bears against the head of a piston 323, which in turn abuts against the bottom of a cylindrical recess 324 formed in the web 300. Piston 323 has a cylindrical skirt 325 with an outwardly extending bottom flange 326. Skirt 325 is provided with two series of holes 327 and 328. An annular piston 329 surrounds piston 323, the head of the latter piston extending through an aperture in the head of the former. An inwardly extending flange 330 is screwed to the bottom of the skirt of piston 329 and is adapted to abut against the flange 326 on piston 323. A heavy coil spring 331 is disposed in the annular space between pistons 323 and 329, bearing at one end against the under side of the head of piston 329 and at the other end against the flange 326 on piston 325. Piston 329 is loosely mounted in a cylindrical sleeve 332 screwed into the recess 324, there being an appreciable clearance space 333 between the piston and the sleeve. The function of the mechanism just described will be explained later.

Turning now to Fig. 30, the lubricating system which in this embodiment has an important function in addition to that of lubrication, is diagrammatically illustrated. As in the form of apparatus previously described, an oil circulating lubricating system is employed, but in the present instance pressure feed is used, the oil pump (not shown) preferably varying its rate of feed in accordance with variations in the speed of the driving shaft. Oil from the pressure source is supplied through the inlet conduit 193 of which conduit 341 is a branch. Oil is fed to the transmission from conduit 193 through the hollow drive shaft 32. From the interior of shaft 32, it passes between the splines at the forward end of shaft 212 to a pocket 334 formed within hub 211. From this pocket it flows through the long annular space between shaft 212 and member 214 to the holes 215, and flows through the latter to the space between member 214 and the driven clutch sleeve 48. From the forward end of this latter sleeve the oil flows through bearing 222 and between clutch sleeves 48 and 42 to lubricate the action roller detents 52. When it reaches the end of sleeve 42 the oil flows through bearing 246 (see Fig. 15) and is then forced to flow to the inside of the member 257 by the extension 247 forming part of the bearing race 245. A number of thread-like flanges 335 on the inner surface of member 257 tend to cause the oil to flow forwardly between sleeves 42 and 51 to lubricate the reaction clutch detents 53. The oil finally flows through bearing 260 and is thrown outwardly by centrifugal force to lubricate the ball bearings upon which the inertia masses are mounted. The remaining parts of the transmission are lubricated by the mist of oil which fills the transmission casing during periods of operation.

Oil fed to the transmission finally collects in the bottom of the casing at 196 (Fig. 8) and is picked up by the starter teeth 197 in a trough formed by ribs 336. It is lifted in this trough to the port 337 (Fig. 9) in the side of the transmission casing through which and the outlet 338 it passes to the supply reservoir, which may conveniently be the crank case of the engine.

A by-pass is provided permitting oil to flow directly from the pocket 334 to the bearing 222 under certain operating conditions. This by-pass is formed by a channel 339 (Fig.

30) cut in the inner face of the sleeve 42, the inlet of this channel being adapted to register with a port 340 cut through the fly-wheel hub 216 and the bearing sleeve surrounding the same.

The branch conduit 341 leads from the inlet pipe 193 to the chamber formed by the recess 324 (see also Fig. 24), this conduit having therein a ball check valve 342 opening away from the pipe 193.

As seen most clearly from Figs. 24, 28 and 29, the reversing shaft is held in its proper position of rotation by means of cam 176 of generally diamond shape having two opposite cam points 343 and 344. When the reversing shaft is at rest, one of these cam points is held in contact against a lug or boss 345 on a lever 346. This lever is pivoted on a fixed pin 347 and is resiliently held in contact with the cam 176 by the action of spring 348. Spring 348 is held in compression around stud 349 between the free end of lever 346 and an adjustable collar 350 on the stud. Stud 349 is fixed to pin 351 secured in flange 301 and is formed with a head 352 forming a stop for the end of lever 346. Shaft 154 can be turned in counter-clockwise direction to effect reversal of the direction of drive through the transmission only by applying sufficient turning force to the shaft to cause the cam point (344, as shown in Fig. 29) to force lever 346 downwardly against the action of spring 348 so that the cam point can pass the boss 345. It will be plain from the figure that a considerable turning force will be required to effect movement of the lever 346, and that when such movement is effected, the resistance to turning of shaft 154 suddenly ceases. The end of one arm of a bell crank lever 353, which is pivoted about pin 347, is held in contact with the trailing face of the cam point in contact with boss 345 by the action of the spring 354. This prevents reverse rotation of shaft 154 and serves to hold it firmly in its proper rotational position. From Fig. 29 it will be clear that when shaft 154 is turned a half revolution to effect reversal, the cam point coming into position against the boss 345 will depress the free end of the bell crank lever 353, which will snap into place as soon as the cam point passes the end of the lever. This mechanism insures quick actuation of the reversing mechanism, the necessity for which has already been pointed out in connection with the description of Fig. 1.

The control mechanism for this form of apparatus is most clearly shown in Figs. 23 to 25 and Fig. 31. Referring first to Fig. 31, it will be seen that the control pedal H, provided with a stirrup 102 adjacent to its upper end, is pivoted at 4 to the transmission casing. Pedal H is pivotally connected by means of a link 355 to lever 356, which is in turn rigidly secured to a sleeve member 357 rotatably mounted in the transmission casing by means of ball bearings 358. Member 357 is internally bushed at 359 to provide journals for the support of a brake shaft 360, the outer end of which is journalled in the casing cover plate 361 and projects therethrough. The projecting end of shaft 360 is squared as at 362 to receive the brake-operating lever 363 (Fig. 31).

Shaft 360 has rigidly secured thereto a cam plate 364, said plate having a cam surface comprising an arcuate recess 365 and a convex surface 366 to the left of recess 365 as viewed in Fig. 23. A lever 367 is pivoted at one end about the fixed pin 368, and the free end of this lever is provided with a roller 369 adapted to contact with the cam face of plate 364. Lever 367 is further provided with an offset boss 370, and the brake spring 29 is held in compression between this boss and the bottom of a retaining cap 371 screwed into the bottom of the transmission casing.

The sleeve member 357, to which lever 356 is secured, has formed integrally therewith the depending arm 372 and at the lower end of this lever the pawl lever 98, pivoted thereto, is held in contact with the ratchet wheel 101 by spring 99. A pin 373 projects inwardly from cam plate 364 and is adapted to be contacted by the lower portion of the arm 372. A throttle-actuating rod 374 is pivotally secured at one end to the pin 375 secured in arm 372, the free end of this rod passing loosely through a hole 376 in the lower end of a lever 377. Lever 377 is pinned to a shaft 378 passing through the cover plate 361, and having secured to its projecting end the lever 379 (Fig. 31). Lever 379 is in turn connected by means of the link 380 and bell crank 381 to the throttle-actuating rod 1.

The free end of rod 374 is threaded to receive a cylindrical adjusting nut 382 adapted to seat in a recess in lever 377 when rod 374 is moved to the right from the position shown in Fig. 23. Rod 374 is also provided with a collar 383 adapted to strike the end of lever 377 when rod 374 is moved to the left from the position shown in Fig. 23.

Shaft 297, as will be seen most clearly from Fig. 24, is rotatably mounted in the casing web 300 and the cover plate 361, projecting through the latter, the projecting end preferably being squared.

As shown in Fig. 23, shaft 297 is provided with a cam 384 adapted to engage a boss 385 formed on the lever 367.

The operation of the present form of the transmission is as follows: Drive is transmitted from shaft 32 through shaft 212 and member 214 to the secondary fly-wheel 217. Members 212 and 214 provide a relatively long and torsionally resilient drive between the engine and the driving pins actuating the inertia masses. This I have found gives improved quietness of operation by absorbing reaction impulses of an intermittent nature which tend to travel from the transmission back to the driving shaft of the engine. Such impulses, if not damped, tend to cause variation in the angular velocity of the engine drive shaft, and in the case of the ordinary internal combustion engine, such change in angular velocity of the main shaft of the engine causes noise due to backlash in the several drives operating the engine auxiliaries, such as the fan, water pump, etc. The torsionally resilient drive which I provide effectively eliminates noise in the engine due to reaction forces transmitted thereto from the transmission.

In the present embodiment, the production of turning moments by the inertia masses and their transmission to the driven shaft on the one hand, and to the abutment formed by the casing through the reaction mass on the other hand, is the same as has been described in connection with the transmission shown in Fig. 1.

The application of the forces necessary to keep the clutch roller detents 52 and 53 in contact with their respective engaging surfaces, is accomplished in an improved manner resulting in better action in the clutches and minimizing wear on the clutch parts. Instead of applying a fixed engaging force to the clutch rollers by means of springs in the roller cages, the engaging force in this form of the transmission is varied with variations in operating conditions. I have discovered that the necessary forces can be transmitted through the clutches without breaking the oil film between the roller detents and the sleeves, thus avoiding destructive metal-to-metal contact, provided the engaging force exerted on the detents is not too great or applied for too long a period of time. On the other hand, an insufficient engaging force will allow an oil film of sufficient thickness to remain between the sleeves and detents to cause slippage therebetween. Moreover, the value of the force required to effect reduction of the oil film to the proper thickness without breaking it, varies widely under different operating conditions. For example, at one time the oil may be heavy and viscous, as when starting in cold weather, while at other times it may be very light and fluid. Under the first condition a greater engaging force is required to bring the detents into proper engaging position than in the latter case. Again, if the transmission is operating at high speed in indirect drive, the alternate grip and release of the roller detents is very rapid, so that the oil accumulating between them and the sleeves during release periods must be squeezed out to the proper film thickness in an extremely small time interval. In order to do this a relatively heavy engaging force is necessary, but it will also be seen that as the time intervals of engagement increase, the engaging force must be decreased or there is likelihood of breaking the oil film.

A relatively light engaging force on the clutch rollers is particularly desirable under conditions of direct or synchronous drive when the action clutch detents are in unrelieved engagement for long periods of time and the reaction clutch detents are continuously overrunning. Under these conditions the action clutch detents are not in motion with respect to their cooperating gripping surfaces, but the reaction clutch detents are continuously overrunning, and if a heavy engaging pressure were applied thereto, there would not only be an unnecessary loss due to friction, but eventually wear on these detents would be accelerated. Furthermore, when the transmission is operating under direct drive conditions, it may frequently overrun or freewheel due to the fact that the vehicle in which the transmission is placed is coasting down an incline. Under these conditions the action clutch detents overrun and a relatively light engaging pressure thereon is desirable in order to minimize friction and possible wear.

In order to meet these varying conditions and to provide at all times as nearly as possible just the required amount of engaging force and no more, the roller detents are held against their cooperating surfaces by the action of springs 57 in the roller cages and the force transmitted through these springs to the rollers is varied by varying the force tending to rotate the roller cages with respect to their cooperating clutch sleeves. From a consideration of Figs. 14 (a) and 14 (b), it will be apparent that the engaging force applied to the roller detents will be varied by varying the forces tending to rotate the roller cages. It will further be evident from Figs. 15 and 18 that the forces tending to rotate the roller cages will be varied by variations in the force tending to move the shift rings 251 and 252 away from their center positions. The force tending to move these shift rings away from their center positions is determined by the force tending to increase the eccentricity of the actuating ball 307 on the bell crank 306 (Fig. 24). As shown in this figure, the force tending to increase the eccentricity of ball 307 and maintaining the engaging force on the roller detents, is derived from spring 319, acting through lever 316 and rod 314. In the position of the parts shown in this figure, spring 319 exerts the minimum force required to secure proper operation of the clutches. If the force due to spring 319 is increased, it will be evident that the force supplied to the roller detents will be increased, and this increase is obtained by causing piston 323 to move outwardly from the position shown in Fig. 24 to compress spring 319 and increase the force derived therefrom acting on lever 316.

Piston 323 is moved to compress spring 319 by variation in the pressure of the oil supplied through conduit 341. When the oil supplied through conduit 341 is heavy and viscous, the pressure on piston 323 will be relatively high since the only outlet for such oil is by way of the restricted annular clearance space 333. This will cause piston 323 to move outwardly and increase the pressure exerted by spring 319. This results in the increase in engaging pressure on the roller detents necessary to secure the most efficient operation thereof with heavy oil. If and when the viscosity of the oil decreases so that it flows more freely, the oil will flow more freely through the clearance space 333, thereby tending to decrease the pressure acting on piston 323 and consequently decreasing the pressure applied to the roller detents.

The pressure in conduit 341 and consequently on piston 323 is also varied by varying the pressure at which oil is supplied to this conduit. This variation in pressure is controlled, as will be seen from Fig. 30, by the by-pass comprising passage 339 and port 340. If the transmission is operating asynchronously, port 340 is in registry only a small fraction of the time with passage 339, due to the differential speed existing between the member through which the port passes and the clutch sleeve 42 in which is located the passage 339. Consequently, oil must flow through the relatively long and restricted path formed by the annular space between shaft 212 and member 214, ports 215 and the annular space between member 214 and the clutch sleeve 48. This restricted path causes a resistance to flow which is reflected in maximum pressure being built up in the inlet pipe 193. In turn, this increases the inlet pressure to conduit 341 and causes the piston 323 to be moved outwardly. Under such conditions an increased force is applied to the roller detents.

When the transmission is operating synchronously, the pressure at which oil is supplied to conduit 341 is decreased, since when the transmission operates synchronously, port 340 registers with passages 339 to open the by-pass formed thereby. Opening of this by-pass eliminates the restricted annular passages between members 212, 214 and 48 from the path of oil flow, and by thus reducing the resistance to the flow of the oil, causes the pressure in the supply pipe 193 and conduit 341 to be reduced. This in turn causes a reduction in the pressure applied to the roller detents by relieving the pressure acting on piston 323.

Under certain operating conditions, the intermittent registry of port 340 with passage 339 may cause fluctuations in the pressure in conduit 341, and in order to maintain a relatively steady pressure on piston 323, the ball check valve 342 is provided. Because of this valve, intermittent decreases of pressure in conduit 341 will not affect piston 323, but if the pressure in conduit 341 drops for an appreciable period of time, the pressure on piston 323 will be reduced because of the leakage through the clearance space 333.

In order to prevent the application to the roller detents of an excessive force due to an abnormal pressure in conduit 341, piston 329 is provided, which piston under normal conditions acts in conjunction with piston 323 to compress spring 319.

Under abnormal pressure conditions, the shoulder on pin 322 will abut against the retainer 320 to form a stop resisting movement of piston 323, and under these conditions piston 329 will continue to move under the influence of oil pressure, compressing spring 331. A relatively slight movement of piston 329 with respect to piston 323 will uncover the ports 327 to relieve the pressure in conduit 341. Ports 328 are provided to prevent the possibility of oil being trapped in the annular space between the two pistons.

From the foregoing it will be seen that the pressure exerted on the clutch detents will be varied automatically to secure the most efficient operation of the clutches under varying driving conditions. With respect to this feature of variation of the engaging pressure on the clutch detents, it will be understood from the above description that the time when the engaging pressure of the detents is decreased because of the overrunning of a clutch, is the time during that condition of overrunning or free-wheeling which may be said to be more or less continuous as distinguished from the very short intermittent overruning intervals incident to the operation of the clutches in the type of transmission herein disclosed, when the clutches are operating to segregate the alternate opposite turning moments produced under conditions of asynchronous drive.

It will also be understood that in this specification the clutch parts are considered as being in contact or in engagement when force is transmitted through them, though there is an oil film between the parts.

Reversal of direction of drive through the transmission is accomplished, as in the transmission shown in Fig. 1, by turning the reversing ratchet wheel 101 one-sixth of a revolution to turn the reversing shaft 154 a half revolution. Movement of shaft 154 is in counter-clockwise direction as viewed from the left or outer end of the shaft in Fig. 25. It is to be noted that when shaft 154 is in the position of rest, shown in Fig. 24, the pivot pin 305 is not quite normal to the plane passing through the axes of shafts 154 and 212, but is instead inclined about 15 degrees in a direction such that the first fifteen degrees of rotation of shaft 154 in effecting reversal is required to move pin 305 to a position normal to said plane. During this initial movement of shaft 154, the movement of ball 307 is extremely slight, but such movement as does occur is to the right (Figs. 24 and 15), which tends to tighten rather than to free the clutch detents from engagement with the clutch sleeves. The next fifteen degrees of rotation of shaft 154 serves to move ball 307 to the left just sufficiently to return it to the same position it occupied before the reversing shaft was moved. This permits shaft 154 to be rotated 30 degrees before any reversing action on the shift rings 251 and 252 takes place. During this 30 degrees of rotation of shaft 154, before actual reversal is commenced, the clearance between the rollers 284 (Fig. 22) and cam faces 294 in the scissor mechanism is taken up. The next 120 degrees of rotation of shaft 154 operates to shift rings 251 and 252 to their left-hand position (Fig. 15) to effect reversal of the roller cages. At the beginning of this 120 degree rotation, cam faces 294 spread rollers 284 and the right-hand ends (Fig. 22) of levers 279 and 280. These levers move about the ends of the distance pin 291 as fulcrum points to collapse ring 276 and release the coupling comprising balls 274. A very slight movement of ring 276 is sufficient to free the coupling, and this action serves to release the reaction mass 262. While rings 251 and 252 are moved in the direction for reversal during this freeing operation, this movement is very slight and has no effect, the net result being that release of the clutch mechanism is effected before reversal takes place. The scissor mechanism maintains the coupling in freed position during the actual reversing period. During the last thirty degrees of the half revolution of reversing shaft 154, the cam faces 294 move to permit the scissor mechanism to expand ring 276 to reengage the coupling just as reversal of the clutches is being completed. It will be seen that this scissor mechanism corresponds to the releasing mechanism comprising teeth 170 and 171 in the form of transmission illustrated in Fig. 3.

A second half revolution of reversing shaft 154 will evidently act to again reverse the clutches and return the entire shifting mechanism to the position shown in the figures, in the same manner and sequence as above described.

Quick reversal is insured by means of the mechanism illustrated in Figs. 28 and 29, the cam 176 being held against rotation until a predetermined turning force is applied thereto by the operator through the pedal H (Fig. 31). This pedal is so arranged that muscular tension on the part of the operator is required before the requisite amount of force can be developed, and the sudden release of the resisting force due to movement of the cam point past lever 346 results in an involuntary, quick movement on the part of the operator due to such muscular tension. This quick movement results in rapid actuation of the reversing mechanism.

In both of the forms of transmission which I have illustrated it is highly desirable, as previously pointed out, that the driven shaft be brought to a stop before reversing of the transmission is effected. This I prefer to insure by means of a unitary control system in which the reversing mechanism is made to co-act with the braking mechanism of the vehicle. By so unifying the control I impose on the operator the necessity of stopping the driven shaft, and consequently the vehicle, before reversing of the transmission can be effected.

I have shown such a system in conjunction with the form of transmission shown in Fig. 8, in Figs. 31 to 39, which figures also illustrate a preferred form of vehicle braking system particularly adapted to be employed with a freewheeling or overrunning transmission, since it is capable of continuous braking under heavy load without overheating or undue wear, and further provides an extremely powerful and well balanced braking action.

Referring more particularly to Figs. 31 and 32, it will be seen that the brake lever 363 is pivotally connected to the adjustable link 386, which is in turn pivotally connected to lever 387. Lever 387 is pivoted intermediate its ends to a stud 388 secured in the transmission casing, and the end of this lever opposite the one connected to lever 363 is joined by a ball-and-socket connection 389 to a third lever 390. Lever 390 is mounted intermediate its ends in a socket 391 formed in an annular plate-like member 392 secured to the end of the transmission casing by means of studs 393 (Fig. 8). The end of lever 390 opposite that which is connected to lever 387 is connected by means of a second ball and socket 394 to a brake-actuating ring 395 surrounding the hub of fly-wheel 49, and pivoted to the pin 396 riveted to member 392.

The periphery of member 392 is grooved to form the inner race for a plurality of bearing balls 397 the outer race for which is formed in a ring 398 closing the annular space between the circumference of member 392 and the rim of the driven shaft fly-wheel 49, which is in the form of a brake drum.

Mounted within the fly-wheel or drum 49 is a pair of internal expanding brake shoes 399, these shoes being pivoted at their upper ends by pins 400 to links 401, which are in turn secured to pins 402 journalled in ring 398. As will be seen from Fig. 34, the ends of pins 402, remote from plate 398, are held in spaced relation by the plate 403, which in turn is carried by pins 404 riveted to ring 398.

Ring 398 has riveted thereto a pin 405, through which an adjusting screw 406 passes. The ends of pins 402, which are journalled in ring 398, project through this ring, and the projecting ends have pinned thereto the levers 407 (Fig. 35), these levers being adapted to be simultaneously turned in opposite directions by movement of an adjusting block 408 threaded on the lower end of the adjusting screw 406.

The upper ends of the brake shoes 399 are drawn toward each other by the coil springs 409, and the lower ends of these shoes are drawn toward each other by the coil springs 410.

Adjacent to their lower ends, each of the brake shoes 399 is connected by means of pivoted forked links 411 to a pin 412, upon which is mounted the roller 413. Roller 413 is flanged as shown in Fig. 36 and is engaged by the circumference of the ring 395. Pin 412, upon which roller 413 is mounted, is connected by means of forked link 414 to pin 415 riveted to the ring 398.

Intermediate their ends the brake shoes 399 are connected by pivoted links 416 to the ends of a pair of U-shaped spacing members 417. The ends of members 416 are pivoted about the inner ends of a pair of brake draw rods 418, which pass through diametrically opposite holes in ring 398 and through holes 419 in the brake shoes. As will be seen from Figs. 32 and 33, holes 419 provide considerable clearance space around the inner ends of the draw rods 418.

Holes are also formed through the members 417 and through the right-hand brake shoe 399, through which pin 415 passes, these holes being considerably larger than the diameter of the pin to provide a clearance around the pin.

The outer circumference of ring 395 is irregular in outline, the contour of the lower half of its circumference being such that as roller 413 moves to either side of the position shown in Fig. 33, it will also, in following the circumference of the ring, move radially toward the central axis of the brake drum. The actual contour of the ring 395 is very nearly circular, so that the inward movement of roller 413 is relatively slight. In order, however, to make the action of this part of the apparatus clear, the curvature of the circumference of ring 395 away from a true circle has been exaggerated, and near the portions of the ring at 90 degrees from the bottom thereof, as shown in Fig. 33, depressions 420 and 421 of an exaggerated depth are shown.

The flange of the drum formed by flywheel 49 is provided on its exterior surface with a plurality of axially oblique radiating fins or ribs 422, which as shown in Fig. 31 are arranged so that the leading edges thereof, with respect to rotation of the drum, are also leading edges with respect to the direction of motion of the vehicle.

Referring now to Figs. 31 and 39, the connection from the brake shoes 399 to the front wheel brakes of the vehicle, are shown. On each side of the vehicle frame, approximately opposite the drum 49, is mounted a hanger 423 providing two fixed vertical pivots 424 and 425. A lever arm 426 is pivoted intermediate its ends about the pivot 424, and one end of this lever is connected by means of a spherically mounted link 427 and coil spring 428 to the end of one of the draw rods 418.

The opposite end of lever 426 is connected by the pivoted link 429, passing through a suitable aperture in the frame, to one corner of a triangular plate 430. Plate 430 is pivoted adjacent to its center about the pivot 425. A coil spring 431 is connected between pivot 432, located at another corner of plate 430, and bolt 433, passing through a suitable hanger 434 fixed to the frame. A nut 435 on the threaded end of bolt 433 provides means for adjusting the tension on spring 431. One end of a brake rod 436 is pivoted about a pin 437 at the third corner of plate 430. A resilient spring abutment 438 is secured to the inner face of the frame opposite the link 427. Brake rod 436 is pivotally connected to an intermediate supporting arm 439 and a link 440. The forward end of link 440 is connected to an operating lever 441 (Fig. 38) pivoted about pin 442 and passing through the fixed plate 443 serving as a closure for the front wheel brake drum 444. The end of lever 441 within the drum is provided with a cam 445 adapted to engage the upper end of the brake shoe 446 forming part of a two-shoe internal expanding brake located within the drum 444. The lower end of shoe 446 is connected by means of the floating pivot 447 (Fig. 31) to the second shoe 448. Shoe 448 is secured at its upper end by means of a yielding connection comprising a plunger 449 (Fig. 38) pivotally mounted to the pin 450 fixed to the plate 443. Plunger 449 slides in a recess 451 formed in the end of shoe 448, and a spring 452 located in said recess serves to urge the upper end of shoe 448 away from a pivot 450. A coil spring 453 acts to draw the upper ends of brake shoes 446 and 448 together.

The lower ends of shoes 446 and 448 may be prevented from dragging in the released position of the brake by means of a spring 454.

The front wheel brake has been illustrated in somewhat diagrammatic form, since this brake may be any known form of Servo brake in which contact of one shoe with the brake drum tends to force a second or third shoe into braking contact with the drum. The difference between the brake shown and the ordinary form lies in the yielding support of the upper end of shoe 448.

Only one front wheel brake and the mechanism for actuating it has been shown, but it will be understood that the front wheel braking mechanism on the opposite side of the vehicle is identical with that which has been shown.

The operation of the braking mechanism is as follows: If the brake lever 363 is depressed, this motion will be transferred through link 386 and lever 387 to depress the end 394 of lever 390, thereby lowering ring 395 about its pivot 396. This action depresses roller 413, which swings in an arc about pin 415, to spread the lower ends of brake shoes 399 to bring them into contact with the rotating drum 49.

Since the shoes are mounted on pins 402 fixed to the rotatable plate 398, the entire brake assembly tends to rotate with the drum to a position such as is shown in Fig. 37. The motion of shoes 399 is transferred to the draw rods 418 through links 416, so that rotation of the brake assembly is resisted by springs 428 secured to the levers 426 mounted on each side of the ear. In Fig. 39 the position of the mechanism shown corresponds to the position of the brake assembly shown in Fig. 37, that is, with the brakes applied. When the brakes are in released position, as shown in Fig. 33, springs 431 (Fig. 39) are held under a predetermined tension and serve to hold the ends of links 427 against the spring abutments 438 with a predetermined force, which must be overcome before movement of the draw rods 418 upon application of the drive shaft brake can move levers 426 to actuate the front wheel brakes.

It will be seen from Figs. 33 and 37 that the braking action of the drive shaft brake is resisted by a force couple acting through draw rods 418, the action being such that no unbalanced forces are produced acting on the drive shaft or its bearings.

Furthermore, due to the resistance imposed by springs 431, an initial braking action, sufficient to develop a predetermined force, must be applied to the drive shaft brake before actuation of the front wheel brakes can take place. During this initial brake application, movement of the brake assembly from the position shown in Fig. 33 toward the position shown in Fig. 37 is permitted by the resiliency of springs 428.

As the brake assembly moves toward the position shown in Fig. 37, roller 413 travels about the ring 395 toward the depression 420 therein, and since the outer face of ring 395 is not concentric with the axis of rotation, but permits roller 413 to move radially inward, the pressure exerted by the roller on shoes 399 will decrease as the latter move until a point of braking equilibrium is established. Additional braking effort can then be secured only by further actuation of the brake rods serving to further depress the ring 395. It will thus be seen that a definite braking force will be applied for each position of ring 395, which force will not be exceeded, regardless of variations in friction coefficients.

When sufficient force is transmitted through the draw rods 418 to overcome the tension of springs 431, the front wheel brake rods 436 and 440 are actuated, and the primary front wheel brake shoes 446 are applied. These shoes in turn apply shoes 448. As in the case of the drive shaft brake, a given position of levers 441 will result in a given braking force being applied through the shoes 446 and 448, which force will not be exceeded. This is due to the fact that if the braking force corresponding to a given position of levers 441 is exceeded, the reaction therefrom will cause spring 452 to yield, permitting shoes 448 and 446 to move rotationally, thereby reducing the brake-applying force. Both in the case of the drive shaft brake and the front wheel brakes, the construction is such that increase in braking force can be secured only by following up the movement of the brake shoes with movement of the brake-actuating mechanism.

Due to the rear axle gearing, the driven shaft drum 49 rotates at a much higher speed than would a wheel brake drum, and the spiral ribs or fins 422 thereon serve to dissipate at an extremely rapid rate the heat generated in the brake. Because of this high rate of heat dissipation, this brake may be applied continuously without overheating, a requirement which is necessary in a brake used in conjunction with a freewheeling transmission.

It is further to be noted that the drive shaft brake, applying braking force to the rear wheels, is applied before actuation of the front wheel brakes is begun. This initial braking application on the rear wheels tends to shift the center of gravity of the vehicle toward the front wheels, due to deceleration of the vehicle and the reaction forces set up by the braking. This change in the center of gravity increases the adhesion of the front wheels and therefore permits a very heavy braking effort to be applied to these wheels without causing them to lose adhesion.

In practice, I adjust the mechanism so that a braking force equal to 7 to 8 percent of the vehicle weight is applied to the rear wheels before actuation of the front wheel brakes is commenced. Braking force on the front wheels is then built up very rapidly, so that when the maximum braking force is applied to the brakes, the drive shaft brake exerts a retarding force equal to about 25 percent of the vehicle weight, and the front wheel brakes exert a retarding force equal to about 50 percent of the vehicle weight, so that a total retarding force of 75 percent of the vehicle weight is secured. This force is secured with the brake-actuating mechanism in its furthest applied position, and since the braking force in any given position of the brake-actuating mechanism cannot be exceeded, this represents the maximum braking force which can be obtained. A force of this magnitude is sufficient to stop the vehicle with extreme suddenness, but due to the manner of its application avoids locking the vehicle wheels.

Operation of the control system in the form just described is as follows: In Fig. 31 the operating pedal H is shown in its position of rest with the brakes applied. This position corresponds to the full line position shown in Fig. 23, and it will be seen that depression of the pedal will cause the cam plate 364 to be rotated in counter-clockwise direction due to the abutment of arm 372 against pin 373. This rotation of the plate 364 causes similar rotation of the brake arm 363, thereby releasing the brakes against the action of spring 29, which is compressed by the action of the cam plate on roller 369.

During this range of movement, the rod 374 is moved to the right, but actuation of the throttle does not take place because of the lost motion between the member 382 and the lever arm 377. When rod 374 has been moved so far to the right (as shown in Fig. 23) that member 382 is in contact with arm 377, further movement of rod 374 to the right due to depression of the operating pedal causes actuation of the throttle to increase the supply of gasoline or other motive fluid to the engine. It will further be seen from Fig. 23 that depression of the pedal causes the arm 372 to move the pawl 98 away from the reversing ratchet 101.

Upon release of pressure from pedal H, roller 369, under the influence of spring 29, acts to move the cam plate 364 in clockwise direction (as viewed in Fig. 23) to depress arm 363 and apply the brakes. This movement is continued until roller 369 moves into the recess 365 in the cam plate, in which position the brakes are fully applied.

When the operating pedal is lifted by means of stirrup 102, arm 372 is moved in clockwise direction away from pin 373, so that the braking mechanism is undisturbed. This movement causes the pawl 98 to engage the next succeeding depression in ratchet wheel 101, the position of these parts with the pedal fully lifted being shown in Fig. 27. Depression of the pedal from its fully lifted position to its position of rest, moves the ratchet wheel through a sixth of a revolution, and causes reversal in the manner already described.

In order to prevent reversal being attempted with the throttle held open by means other than the throttle-actuating means shown (such, for example, as a second throttle control mounted on the vehicle steering wheel), the collar 383 is adapted to strike lever 377 to close the throttle, when the operating pedal is lifted in order to prepare the mechanism for the actual reversing movement.

While I have shown only the form of transmission illustrated in Fig. 8 and related figures in conjunction with the braking and unit control system, it will be seen that the form of transmission illustrated in Fig. 1 and related figures may be readily substituted for the form of transmission shown in Fig. 8, in such a unit control system. Both forms of transmission are reversed in the same manner, that is, by effecting one-sixth of a revolution of the ratchet wheel 101, and the interconnection of the reversing member acting on the ratchet wheel with the vehicle braking system may be effected in a number of different and largely obvious ways. A specific example of the manner in which the form of transmission shown in Fig. 1 may be embodied in a unitary control system, is illustrated in my copending application Serial No. 411,709, hereinafter referred to.

Means for releasing the brake so that the vehicle can be moved without actuation of the operating pedal, is provided in conjunction with the form of transmission shown in Fig. 8 by the shaft 297 extending through the transmission housing.

From Figs. 22 and 23 it will be seen that rotation of this shaft will act to release the brake through the abutment of cam 384 against the boss 385 on lever 367, and will likewise free the transmission by the action of the cam faces 296 against the lugs 295 to spread the scissor mechanism and collapse the coupling ring 276. Shaft 297 may be actuated from the exterior of the vehicle by any suitable form of mechanism (not shown) or by a removable crank similar to the ordinary engine starting crank. This arrangement is desirable in order to enable vehicles such as closed automobiles to be moved in garages and like places when they are locked so that the operating pedal is inaccessible.

It will be understood in the above description that parts are considered to be in contact or engagement when force is transmitted between them though they are actually separated by an oil film.

From the foregoing description it will be apparent that my invention is not limited to any specific form of construction, but may be embodied in a number of forms of apparatus. It will also be understood that a great variety of changes may be made in the construction and arrangement of the parts without departing from the spirit or scope of the invention as defined in the appended claims.

Features relating to the transmission and control system, and the consolidated vehicle control, and specific features of the braking mechanism per se and the clutch mechanism and ancillary mechanisms which are disclosed and not claimed in this application, are claimed in my copending applications Serial Nos. 197,430; 330,740; 375,506; 392,083; 407,236; 411,709; 441,195 and 472,531.

What I claim is:

1. A variable-speed power transmission comprising a driving member, a driven member, an abutment, means actuated by the driving member for alternately producing opposite turning moments, a one-way action clutch for transmitting turning moments of one sense to the driving member, a one-way reaction clutch for directing turning moments of the opposite sense toward the abutment, and an inertia mass between the reaction clutch and the abutment for altering the characteristics of the forces transmitted to the abutment from the reaction clutch.

2. A variable-speed power transmission comprising a driving member, a driven member, an abutment, an inertia mass associated with said driven member, a second inertia mass resiliently connected to said abutment, means actuated by the driving member for alternatly producing turning moments of opposite sense, a one-way action clutch for transmitting energy due to turning moments of one sense to said first mass, and a one-way reaction clutch for transmitting energy due to turning moments of the opposite sense to said second mass.

3. A variable-speed power transmission comprising a driving member, a driven member, an abutment, mechanism actuated by the driving member for alternately producing turning moments of opposite sense, means forming a path of force transmission for applying the produced turning moments of one sense to the driven member, and means including a reaction inertia mass forming a path of force transmission for transmitting forces due to the produced turning moments of opposite sense to the abutment, said reaction mass acting to alter the characteristics of the forces transmitted through said last named path before they reach the abutment.

4. A variable-speed power transmission comprising a driving member, a driven member, an abutment, mechanism actuated by the driving member for alternately producing turning moments of opposite sense and varying force value, means forming a path of force transmission for applying the produced turning moments of one sense to the driven member, and means including a reaction inertia mass forming a path of force transmission for transmitting forces due to the produced turning moments of opposite sense to the abutment, said mass acting to reduce the variations in the value of the forces transmitted through said last named path so as to transmit to the abutment forces of relatively constant value.

5. In a variable-speed power transmission, mechanism for producing intermittent driving forces and intermittent reaction forces, an abutment, and means for providing a path of force transmission for said reaction forces between said mechanism and said abutment, said means including inertia mass yieldably mounted in force transmitting relation to said abutment for producing in said path intermittent forces due to momentum thereof synchronized with and opposing said intermittent reaction forces.

6. In a variable-speed power transmission, mechanism for producing intermittent driving forces and intermittent reaction forces, an abutment, and means for providing a path of force transmission for said reaction forces between said mechanism and said abutment, said means including inertia mass mounted to have restricted oscillatory movement in force transmitting relation to said abutment for producing in said path intermittent forces due to such oscillatory movement synchronized with and opposing said intermittent reaction forces.

7. A variable-speed power transmission comprising a driving member, a driven member, an abutment, means actuated by the driving member for alternately producing opposite turning moments, means for transmitting turning moments of one sense to the driven member, means including a reaction clutch for directing turning moments of the opposite sense toward the abutment, and an inertia mass between the reaction clutch and the abutment for altering the characteristics of the forces transmitted to the abutment from the reaction clutch.

8. A variable-speed power transmission comprising a driving member, a driven member, an abutment, an inertia mass associated with said driven member, a second inertia mass resiliently connected to said abutment, means actuated by the driving member for alternately producing turning moments of opposite sense, a one-way action clutch for transmitting energy due to turning moments of one sense to said first mass, a one-way reaction clutch for transmitting energy due to turning moments of the opposite sense to said second mass, and means comprising a releasable coupling between said second inertia mass and said abutment for relieving force acting and reacting between the driven member and the abutment, respectively.

9. A variable-speed power transmission comprising a driving member, a driven member, an abutment, an inertia mass associated with said driven member, a second inertia mass, means for resiliently and releasably connecting said second mass to the abutment comprising a plurality of springs and a releasable coupling between the springs and the abutment, means actuated by the driving member for alternately producing turning moments of opposite sense, a reversible one-way action clutch for transmitting energy due to turning moments of one sense to said first mass, a reversible one-way reaction clutch for transmitting energy due to turning moments of the opposite sense to said second mass, means for reversing said clutches, and means operated by the actuation of said clutch-reversing means for releasing said coupling to relieve said clutches from stress so as to permit reversal thereof.

10. A variable-speed power transmission comprising a driving member, a driven shaft, an annular abutment, an inertia mass comprising a fly-wheel on said shaft, a second mass comprising an inertia wheel, radially arranged springs for connecting said inertia wheel to the abutment to permit oscillating movement of the inertia wheel with respect to the abutment, means actuated by the driving member for alternately producing turning moments of opposite sense, a one-way action clutch for transmitting energy due to turning moments of one sense to said fly-wheel and a one-way reaction clutch for transmitting energy due to turning moments of the opposite sense to said inertia wheel.

11. A variable-speed power transmission comprising a driving member, a driven member, an intermediate member, mechanism actuated by the driving member for alternately producing turning moments of opposite sense and applying the produced moments to the intermediate member, means for transmitting moments of one sense from the intermediate member to the driven member and for directing moments of the opposite sense from the intermediate member toward the abutment, and means interposed between the intermediate member and the abutment for absorbing and returning a substantial part of the energy of said last named moments to said intermediate member.

12. A variable-speed power transmission comprising a driving member, a driven member, an abutment, inertia mass resiliently connected to the abutment, mechanism actuated by the driving member for alternately producing turning moments of opposite sense and mechanism for transmitting said opposite turning moments to the driven member and to the mass respectively.

13. A variable-speed power transmission comprising a driving member, a driven member, an abutment, inertia mass in yieldable force transmitting relation to the abutment, mechanism actuated by the driving member for alternately producing turning moments of opposite sense and mechanism for transmitting said opposite turning moments to the driven member and to the mass respectively.

14. A variable-speed power transmission comprising a driving member, a driven member, an abutment, a radially extending member having a considerable portion of its weight in its radially outer part for providing inertia mass, elastic force transmitting means between said radially extending member and said abutment, mechanism actuated by the driving member for alternately producing turning moments of opposite sense and mechanism for transmitting said opposite turning moments to the driven member and to the mass respectively.

15. A variable-speed power transmission comprising a driving member, a driven member, an abutment, a radially extending annular member having a relatively heavy rim portion for providing inertia mass, elastic force transmitting means between said radially extending annular member and said abutment, mechanism actuated by the driving member for alternately producing turning moments of opposite sense and mechanism for transmitting said opposite turning moments to the driven member and to the mass respectively.

16. A variable-speed power transmission comprising a driving member, a driven member, an abutment, inertia mass including an annular radially extending member in yieldable force transmitting relation to the abutment, mechanism actuated by the driving member for alternately producing turning moments of opposite sense, means for transmitting turning moments of one sense to the driven member, and clutch mechanism comprising a driven element rigidly connected with said annular member for transmitting turning moments of opposite sense to said annular member.

17. A variable-speed power transmission comprising a driving member, a driven member, an abutment, inertia mass, mechanism actuated by the driving member for alternately producing turning moments of opposite sense under some conditions of drive and for producing a continuous turning moment of one sense under other conditions of drive, mechanism for transmitting the turning moments of opposite sense to the driven member and to the mass respectively, said mass being idle when said mechanism produces said continuous turning moment, and elastic force transmitting means between the mass and the abutment, said elastic means being substantially unstressed when said mass is idle.

18. A variable-speed power transmission comprising a driving member, a driven member, an abutment, mechanism actuated by the driving member for alternately producing turning moments of opposite sense under some conditions of drive and for producing a continuous turning moment of one sense under other conditions of drive, and mechanism for transmitting said opposite turning moments to the driven member and to the abutment respectively, said last named mechanism comprising elastic force transmitting means between the abutment and said first named means, said elastic means being substantially unstressed when said continuous turning moment is produced.

19. A variable-speed power transmission comprising a driving member, a driven member, an abutment, turnably mounted inertia mass in yieldable force transmitting relation to the abutment, mechanism actuated by the driving member for alternately producing turning moments of opposite sense, and rotatable clutch mechanism coaxially mounted with the inertia mass for transmitting said opposite turning moments to the driven member and to the mass respectively.

20. A variable-speed power transmission comprising a driving member, a driven member, an abutment, inertia mass resiliently and releasably connected to the abutment, mechanism actuated by the driving member for alternately producing turning moments of opposite sense and mechanism for transmitting said opposite turning moments to the driven member and to the mass respectively.

21. A variable-speed power transmission comprising a driving member, a driven member, an abutment, an inertia mass, means comprising a plurality of springs for connecting the mass to the abutment, mechanism actuated by the driving member for alternately producing turning moments of opposite sense and mechanism for transmitting said opposite turning moments to said driven member and to said mass respectively.

22. A variable-speed power transmission comprising a driving member, a driven member, an abutment, an inertia mass, means comprising a plurality of radially arranged springs for connecting the mass to the abutment, mechanism actuated by the driving member for alternately producing turning moments of opposite sense, and mechanism for transmitting said opposite turning moments to said driven member and to said mass respectively.

23. A variable-speed power transmission comprising a driving member, a driven member, an abutment, an inertia mass, means comprising a plurality of radially arranged springs and a releasable coupling for connecting the mass to the abutment, said coupling being interposed between the springs and the abutment, means actuated by the driving member for alternately producing turning moments of opposite sense, reversible mechanism for transmitting said opposite turning moments to said driven member and to said mass respectively, and means for concurrently reversing said mechanism and releasing said coupling.

24. A variable-speed power transmission comprising a driving member, a driven member, an abutment, an inertia mass turnably mounted with respect to the abutment, means for connecting said mass to the abutment comprising a plurality of springs arranged to limit turning movement of the mass and tending to hold the mass in one position of rotation, said springs being substantially unstressed when the mass is in said one position, mechanism actuated by the driving member for alternately producing turning moments of opposite sense, and mechanism for transmitting said opposite turning moments to said driven member and to said mass respectively.

25. A variable-speed power transmission comprising a driving member, a driven member, an abutment, inertia mass including an annular radially extending member having a relatively heavy rim portion turnably mounted with respect to the abutment, means for connecting said annular member to the abutment including a plurality of springs arranged to limit turning movement of the annular member and tending to hold said annular member in one position of rotation, said springs being substantially unstressed when said annular member is in said one position, mechanism actuated by the driving member for alternately producing turning moments of opposite sense, and mechanism for transmitting said opposite turning moments to said driven member and to said mass respectively.

26. A variable-speed power transmission comprising a driving member, a driven member, an abutment, an inertia mass turnably mounted with respect to the abutment, means for connecting said mass to the abutment comprising a plurality of radially arranged springs permitting oscillating but not rotating motion of the mass with respect to the abutment and tending to hold the mass in a normal position of rest, said springs being substantially unstressed when the mass is in its normal position of rest, mechanism actuated by the driving member for alternately producing turning moments of opposite sense, and mechanism for transmitting said opposite turning moments to said driven member and to said mass respectively.

27. A variable-speed power transmission comprising a driving member, a driven member, an abutment, mechanism actuated by the driving member for producing turning moments of opposite sense, one-way clutch mechanism for transmitting said opposite turning moments to the driven member and to the abutment respectively, and a plurality of radially arranged springs providing a yieldable connection between said abutment and the portion of said mechanism which acts to transmit turning moments to the abutment.

28. A variable-speed power transmission comprising a driving member, a driven member, an abutment, mechanism actuated by the driving member for producing turning moments of opposite sense, a one-way action clutch for transmitting turning moments of one sense to the driven member, a one-way reaction clutch for transmitting turning moments of opposite sense to the abutment, and a plurality of radially arranged springs providing a yieldable connection between the reaction clutch and the abutment.

29. A variable-speed power transmission comprising a driving member, a driven member, an abutment, mechanism actuated by the driving member for producing turning moments of opposite sense, a one-way action clutch for transmitting turning moments of one sense to the driven member, a one-way reaction clutch for transmitting turning moments of opposite sense to the abutment, and a plurality of radially arranged springs providing a yieldable connection between the reaction clutch and the abutment, said springs permitting oscillating movement of the reaction clutch parts by movement from their radial positions and being substantially unstressed when in radial position.

30. A variable-speed power transmission comprising a driving member, a driven member, an abutment, mechanism actuated by the driving member for producing turning moments of opposite sense, a reversible one-way action clutch for transmitting turning moments of selected sense to the driven member, a reversible one-way reaction clutch for transmitting turning moments of sense opposite the selected sense to the abutment, and a plurality of radially arranged springs providing a yieldable connection between the reaction clutch and the abutment.

31. A variable-speed power transmission comprising a driving member, a driven member, an abutment, an inertia mass resiliently connected to the abutment, mechanism actuated by the driving member for alternately producing turning moments of opposite sense, means for transmitting the turning moments of one sense to the driven member and mechanism forming a one-way clutch for transmitting turning moments of the opposite sense to said mass.

32. A variable-speed power transmission comprising a driving member, a driven member, an abutment, an inertia mass resiliently connected to the abutment, mechanism actuated by the driving member for alternately producing turning moments of opposite sense, and a plurality of one-way clutches for transmitting said opposite turning moments to the driven member and to the mass respectively.

33. A variable-speed power transmission comprising a driving member, a driven member, an abutment, an inertia mass, means for connecting said mass to the abutment comprising a plurality of springs and a releasable coupling between the springs and the abutment, mechanism actuated by the driving member for alternately producing turning moments of opposite sense, a plurality of reversible one-way clutches for transmitting said opposite turning moments to the driven member and to the mass respectively, and means for concurrently reversing said clutches and releasing said coupling.

34. A variable-speed power transmission comprising a driving member, a driven member, an abutment, an inertia mass rotatably mounted with respect to the abutment, means for resiliently and releasably connecting the mass to the abutment, mechanism actuated by the driving member for alternately producing turning moments of opposite sense, reversible clutch mechanism for transmitting said opposite turning moments to the driven member and to the mass respectively, means for reversing said clutch mechanism, and means operated by actuation of the reversing means to release said mass.

35. A variable-speed power transmission comprising a driving member, a driven member, an abutment, an inertia mass resiliently connected to the abutment, an intermediate member, mechanism actuated by the driving member for alternately producing turning moments of opposite sense and applying said moments to the intermediate member, mechanism forming a one-way action clutch for transmitting turning moments of one sense to said driven member, and mechanism forming a one-way reaction clutch for transmitting turning moments of the opposite sense to said mass.

36. A variable-speed power transmission comprising a driving member, a driven member, an abutment, an inertia mass resiliently and releasably connected to the abutment, an intermediate member, mechanism actuated by said driving member for alternately producing turning moments of opposite sense and applying said moments to the intermediate member, mechanism forming a reversible one-way action clutch for transmitting moments of one sense from the intermediate member to the driven member, mechanism forming a reversible one-way reaction clutch for transmitting turning moments of the opposite sense from the intermediate member to the mass, means for concurrently reversing said clutches, and mechanism operated by actuation of said reversing means to release the mass from the abutment.

37. A variable-speed power transmission comprising a driving member, a driven member, an abutment, a coupling comprising an element releasably connected to the abutment, an inertia mass resiliently connected to said element, mechanism actuated by the driving member for alternately producing turning moments of opposite sense, reversible mechanism for transmitting turning moments of one sense to the driven member and of the opposite sense to said means, and means for concurrently releasing said element and reversing said last named mechanism.

38. A variable-speed power transmission comprising a driving member, a driven member, an abutment, a coupling comprising an element releasably connected to the abutment, an inertia mass resiliently connected to said element, mechanism actuated by the driving member for alternately producing turning moments of opposite sense, reversible mechanism for transmitting turning moments of one sense to the driven member and of the opposite sense to said mass, and means comprising eccentrically mounted rotatable mechanism for reversing said last named mechanism and for concurrently releasing said element.

39. A variable-speed power transmission comprising a driving member, a driven member, an abutment, an inertia mass resiliently and releasably connected to said abutment, means actuated by the driving member for alternately producing turning moments of opposite sense, reversible mechanism for transmitting said opposite turning moments to the driven member and to the mass respectively, means for reversing said mechanism, means operating upon actuation of the reversing means for relieving said mechanism from stress by releasing said mass from the abutment, and means for insuring rapid actuation of the reversing means, whereby the period of time during which said mass is released is minimized.

40. A variable-speed power transmission comprising a driving member, a driven member, an abutment, an inertia mass resiliently and releasably connected to said abutment, means actuated by the driving member for alternately producing turning moments of opposite sense, reversible mechanism for transmitting said opposite turning moments to the driven member and to the mass respectively, manually operable means for reversing said mechanism, means operating upon actuation of the reversing means for relieving said mechanism from stress by releasing said mass from the abutment and means for insuring rapid actuation of the reversing means comprising a spring resisting the initial movement of the reversing means until a predetermined reversing force is applied thereto, whereby the period of time during which said mass is released is minimized.

41. A variable-speed power transmission comprising a driving member, a driven member, an abutment, an inertia mass resiliently and releasably connected to said abutment, means actuated by the driving member for alternately producing turning moments of opposite sense, reversible mechanism for transmitting said opposite turning moments to the driven member and to the mass respectively, manually operable means for reversing said mechanism, means operating upon actuation of the reversing means for relieving said mechanism from stress by releasing said mass from the abutment and means for insuring rapid actuation of the reversing means comprising a spring resisting the initial movement of the reversing means until a predetermined reversing force is applied thereto and thereafter acting to quickly move the reversing means whereby the period of time during which said mass is released is minimized.

42. In a variable-speed power transmission, in combination, force-producing driving mechanism, a driven member, an abutment, reversible one-way clutch mechanism for transmitting forces from the driving mechanism to the driven member and to the abutment respectively, a turnably mounted member for causing reversal of the clutch mechanism, and means actuated by turning movement of said turnably mounted member for relieving the clutch mechanism from stress to permit said reversal.

43. In a variable-speed power transmission, in combination, force producing driving mechanism, a driven member, an abutment, a reversible one-way clutch for transmitting forces from the driving mechanism to the driven member, means for relieving the clutch from stress comprising a coupling interposed between the clutch and the abutment, a turnably mounted member for reversing the clutch and means actuated by turning movement of said turnably mounted member for releasing said coupling.

44. In a variable-speed power transmission, in combination, force-producing mechanism, a driven member, a reversible one-way clutch for transmitting forces from the driving mechanism to the driven member, means for reversing the clutch comprising an axially movable element, a turnably mounted shaft, means for relieving the clutch from stress, means associated with said shaft for effecting axial movement of said element to reverse the clutch as said shaft is turned, and means operated by the turning movement of said shaft for actuating said stress-relieving means.

45. A variable-speed power transmission comprising driving mechanism alternately producing turning moments of opposite sense, a driven member, an abutment, a clutch assembly comprising reversible parts adapted to transmit said turning moments in selected direction from the driving mechanism to the driven member and to the abutment respectively, means for reversing said clutch parts comprising an axially movable element, a turnably mounted shaft, and means associated with said shaft and mounted eccentrically with respect to the axis thereof for causing turning movement of said shaft to effect axial movement of said element to reverse said parts.

46. In apparatus of the character described, the combination with a reversible variable-speed power transmission comprising reversing means including an element turnable in one and the same direction to effect reversal of drive through the transmission from forward to backward and from backward to forward, of a pivoted operating member, and means operatively connecting said element and said operating member for causing successive movements of the operating member in the same direction to turn said element in said one and the same direction.

47. In apparatus of the character described, the combination with a reversible variable-speed power transmission including an element turnable in one and the same direction to effect reversal of drive through the transmission from forward to backward and from backward to forward, of a pivoted operating member and ratchet mechanism between said element and said member for causing successive movement of said member in one direction only to turn said element in said one and the same direction.

48. In a variable-speed power transmission, in combination, force-producing driving mechanism, a driven member, an abutment, a reversible one-way clutch for transmitting forces from the driving mechanism to the driven member, means for reversing the clutch comprising an axially movable element, means for relieving the clutch from stress comprising a coupling between the clutch and the abutment, a turnably mounted shaft, eccentric means associated with said shaft for effecting axial movement of said element as the shaft is turned, and means operated by turning movement of said shaft for releasing said coupling concurrently with the axial movement of said element.

49. In a variable-speed power transmission, in combination, force-producing driving mechanism, a driven member, an abutment, a reversible one-way clutch for transmitting forces from the driving mechanism to the driven member, means for reversing the clutch comprising an axially movable element, a turnably mounted shaft, means associated with said shaft for effecting axial movement of said member as the shaft is turned, means for relieving the clutch from stress comprising a coupling between the clutch and the abutment, means associated with said shaft for releasing said coupling upon turning movement of the shaft, manually operable means for turning said shaft, and means for initially resisting the turning movement of said shaft.

50. A variable-speed power transmission comprising a driving member, a driven member, an abutment, mechanism actuated by the driving member for alternately producing turning moments of opposite sense, mechanism including a releasable coupling for transmitting said turning moments to the driven member and to the abutment respectively, said coupling comprising parts having coupling teeth thereon, said parts being relatively movable to engage and disengage said teeth, whereby to engage and release the coupling, and means for moving one of said parts.

51. In a variable-speed power transmission, in combination, a force producing driving mechanism, a driven member, an abutment, a reversible one-way clutch for transmitting forces from the driving mechanism to the driven member, means for reversing said clutch comprising an axially movable member, means for relieving the clutch from stress comprising a releasable coupling between the clutch and the abutment comprising members having meshing teeth, a reversing shaft adapted to effect axial movement of said axially movable member upon turning movement of the shaft, and mechanism operated by the turning movement of said shaft for releasing said coupling by disengaging said teeth.

52. In a variable-speed power transmission, in combination, force-producing driving mechanism, a driven member, an abutment, a reversible one-way clutch for transmitting forces from the driving mechanism to the driven member, means for reversing the clutch comprising an axially movable element, means for relieving the clutch from stress comprising a coupling between the clutch and the abutment, a turnably mounted shaft, means associated with said shaft for effecting axial movement of said element as the shaft is turned, means for releasing said coupling, and a cam formed on said shaft for actuating said releasing means as the shaft is turned to move said element.

53. A variable-speed power transmission comprising a driving member, a driven member, an abutment, a rotatably mounted intermediate member, means for alternately producing turning moments of opposite sense and applying said moments to the intermediate member comprising an eccentrically mounted inertia mass rotatably carried by the intermediate member and rotatable with the driving member for exerting a continuous radial force on the intermediate member and articulated means connected to the driving member for rotating said mass, said last named means transmitting force to said mass in generally tangential direction and being subjected to continuous radial pressure due to centrifugal force when said mass is rotated, whereby backlash at the points of articulation is prevented, and mechanism for transmitting turning moments of one sense from the intermediate member to the driven member and of the opposite sense from the intermediate member to the abutment.

54. A variable-speed power transmission comprising a driving member, a driven member, an abutment, a rotatably mounted intermediate member, means for alternately producing turning moments of opposite sense and applying said moments to the intermediate member comprising an eccentrically mounted inertia mass rotatably carried by the intermediate member and rotatable with the driving member for exerting a continuous radial force on the intermediate member and means for rotating said mass comprising a link and bearings pivotally connecting said link to the driving member and to the mass, said link being positioned substantially tangentially so that centrifugal force acting thereon when the driving member is rotated causes continuous radial pressure to be exerted on said bearings, and mechanism for transmitting turning moments of one sense from the intermediate member to the driven member and of opposite sense from the intermediate member to the abutment.

55. A variable-speed power transmission comprising a driving member, a driven member, an abutment, a rotatably mounted intermediate member; means for alternately producing turning moments of opposite sense and applying said moments to the intermediate member comprising an eccentrically mounted inertia mass rotatably carried by the intermediate member and rotatable with the driving member for exerting a continuous radial force on the intermediate member and means connected to said driving member for rotating said mass by substantially tangential force applied thereto at a point radially more remote from the axis of the intermediate member than is the axis of rotation of the mass; and mechanism for selectively transmitting turning moments of one sense to the driven member and of the opposite sense to the abutment.

56. A variable-speed power transmission comprising a driving member, a driven member, an abutment, a rotatably mounted intermediate member; means for alternately producing turning moments of opposite sense and applying said moments to the intermediate member comprising eccentrically mounted inertia masses rotatably carried by the intermediate member and rotatable with the driving member for exerting a continuous radial force on the intermediate member, and articulated members connected to the driving member for rotating said masses by substantially tangential forces applied thereto at points radially more remote from the axis of the intermediate member than are the axes of rotation of the masses; and mechanism for transmitting turning moments of one sense to the driving member and of the opposite sense to the abutment.

57. A variable-speed power transmission comprising a driving member, a driven member, an abutment, a rotatably mounted intermediate member, inertia masses carried by said intermediate member and mounted to rotate about axes parallel to and oppositely offset from the axis of rotation of the intermediate member, means actuated by the driving member for rotating said masses about their respective axes and maintaining them in diametrically opposed relation whereby said masses move simultaneously and radially in and out with respect to the axis of rotation of the intermediate member, said masses being arranged to telescope with respect to each other at the inner ends of their radial paths of travel; and mechanism for selectively transmitting forces applied to said intermediate member by the rotation of the masses to the driven member and to the abutment respectively.

58. A variable-speed power transmission comprising a driving member, a driven member, an abutment, a rotatably mounted intermediate member, inertia masses carried by said intermediate member and mounted to rotate about axes parallel to and oppositely offset from the axis of rotation of the intermediate member, means actuated by the driving member for rotating said masses about their respective axes and maintaining them in diametrically opposed relation whereby said masses move simultaneously and radially in and out with respect to the axis of rotation of the intermediate member, one of said masses being forked to partially telescope the other mass as the masses move radially inward; and mechanism for selectively transmitting forces applied to said intermediate member by the rotation of the masses to the driven member and to the abutment respectively.

59. A variable-speed power transmission comprising a driving member, a driven member, an abutment, a rotatably mounted sleeve provided with wedging surfaces and having an eccentric mounted thereon, means for alternately producing turning moments of opposite sense and applying said moments to said sleeve comprising an inertia mass rotatably mounted on said eccentric and a member actuated by the driving member for rotating said mass, and clutch mechanism including detents adapted to engage said surfaces to selectively transmit the turning moments of one sense to the driven member and of the opposite sense to the abutment.

60. A variable-speed power transmission comprising a driving member, a driven member, an abutment, a rotatably mounted sleeve provided with wedging surfaces and having diametrically opposed eccentrics mounted thereon, means for alternately producing turning moments of opposite sense and applying said moments to said sleeve comprising inertia masses rotatably mounted on said eccentrics, the masses and eccentrics being symmetrically arranged with respect to a plane normal to the axis of the sleeve and passing through the center of gravity of one of the masses and members actuated by the driving member for rotating said masses, and clutch mechanism including detents adapted to engage said surfaces to selectively transmit the turning moments of one sense to the driven member and of the opposite sense to the abutment.

61. A variable-speed power transmission comprising a driving member, a driven member, an abutment, a rotatably mounted member provided with wedging surfaces and having an eccentric mounted thereon, a bearing on the eccentric, an inertia mass, a U-shaped strap for securing said mass radially to one side of said bearing, means actuated by the driving member for rotating said mass about said bearing to produce turning moments of opposite sense and apply said moments to said rotatably mounted member, and clutch mechanism including detents adapted to engage said surfaces to selectively transmit turning moments of one sense to the driven member and of the opposite sense to the abutment.

62. A variable-speed power transmission comprising a driving member, a driven member, an abutment, a rotatably mounted member provided with wedging surfaces and having an eccentric mounted thereon, a ball bearing comprising inner and outer race members and having the inner race member secured around said eccentric, an inertia mass, a U-shaped strap for securing the mass radially to one side of said outer race member, said strap being channeled to fit over said outer race member, means actuated by the driving member for rotating said mass about said bearing to produce turning moments of opposite sense and apply said moments to said rotatably mounted member, and clutch mechanism including detents adapted to engage said surfaces to selectively transmit turning moments of one sense to the driven member and of the opposite sense to the abutment.

63. In a variable-speed power transmission, in combination, a rotatably mounted intermediate power-transmitting member having an eccentric thereon, a ball bearing comprising inner and outer race members, said inner race member being secured around said eccentric, a U-shaped strap curved to fit around said outer race member and channeled to receive the same, an inertia mass between the legs of said strap, means cooperating with the strap and the mass for holding the latter against said outer race member, means for rotating said mass about said bearing to produce forces acting on the intermediate member, a driven member, and means for transmitting the produced forces from the intermediate member to the driven member.

64. In a variable-speed power transmission, in combination, a rotatably mounted intermediate power-transmitting member having an eccentric thereon, a ball bearing comprising inner and outer race members, said inner race member being secured around said eccentric, a U-shaped strap curved to fit around said outer race member, an inertia mass between the legs of said strap, means cooperating with the strap and the mass for holding the latter against said outer race member, said strap being yielding, whereby radial pressures exerted on said bearing by the strap and the mass are equalized, means for rotating said mass about said bearing to produce forces acting on the intermediate member, a driven member, and means for transmitting the produced forces from the intermediate member to the driven member.

65. A variable-speed power transmission comprising a driving member, a driven member, an abutment, mechanism actuated by the driving member for alternately producing turning moments of opposite sense, an action clutch comprising gripping detents for transmitting turning moments of one sense to the driven member, a reaction clutch comprising gripping detents for transmitting turning moments of the opposite sense to the abutment, and means for applying equalized engaging forces to the detents of both of said clutches.

66. A variable-speed power transmission comprising a driving member, a driven member, an abutment, mechanism actuated by the driving member for alternately producing turning moments of opposite sense, an action clutch comprising gripping detents for transmitting turning moments of one sense to the driven member, a reaction clutch comprising gripping detents for transmitting turning moments of the opposite sense to the abutment, and means for applying equalized engaging forces to the detents of both of said clutches comprising a common member for transmitting engaging force and an equalizing lever engaged by said common member for transmitting force from the common member to the detents.

67. A variable-speed power transmission comprising a driving member, a driven member, an abutment, mechanism actuated by the driving member for alternately producing turning moments of opposite sense, a reversible action clutch comprising adjustable gripping detents for transmitting turning moments of one sense to the driven member, a reversible reaction clutch comprising adjustable gripping detents for transmitting turning moments of the opposite sense to the abutment, and common means for effecting adjustment of said detents to reverse the clutches and for applying equalized engaging forces to said detents in both positions of adjustment of the detents.

68. A variable-speed power transmission comprising a driving member, a driven member, means for producing synchronous and asynchronous driving relations between the driving member and the driven member comprising a plurality of clutches each comprising a group of gripping detents, separate means each comprising relatively movable parts for applying forces separately to the respective detent groups to cause clutch engagement, and means for equalizing the forces separately applied to the respective detent groups.

69. A variable-speed power transmission comprising a driving member, a driven member, means for producing synchronous and asynchronous driving relations between the driving member and the driven member comprising a plurality of clutches each comprising a group of gripping detents, separate means each comprising relatively movable parts for applying forces separately to the respective detent groups to cause clutch engagement, an equalizing lever connecting said separate means and a single member connected to said equalizing lever for actuating said separate means.

70. A variable-speed power transmission comprising a driving member, a driven member, means for producing synchronous and asynchronous driving relations between the driving member and the driven member comprising a plurality of reversible clutches each comprising a group of gripping detents, and separate means each comprising relatively movable parts for effecting reversal of the clutches and for applying engaging forces to the respective detent groups, an equalizing lever connecting said separate means and a single member connected to said equalizing lever for actuating said separate means.

71. A variable-speed power transmission comprising a driving member, a driven member, an abutment, mechanism actuated by the driving member for alternately producing turning moments of opposite sense, a reversible action clutch comprising adjustable gripping detents for transmitting turning moments of one sense to the driven member, a reversible reaction clutch comprising adjustable gripping detents for transmitting turning moments of the opposite sense to the abutment, and means for effecting concurrent adjusting movement of said detents to reverse the clutches and for applying equalized engaging forces to said detents in both positions of adjustment of the detents, said means comprising a reversing shaft, axially movable adjusting members for transmitting reversing movement and engaging force to the detents of each clutch, and an equalizing lever for transmitting both reversing movement and engaging force from the reversing shaft to said adjusting members.

72. A variable-speed power transmission comprising a driving member, a driven member, an abutment, mechanism actuated by the driving member for alternately producing turning moments of opposite sense, mechanism including a releasable coupling for transmitting said turning moments to the driven member and to the abutment respectively, said coupling comprising a bearing including races and circular elements between said races, a split member forming one of said races, and means for selectively altering the spread of said split member to cause said coupling to grip or release.

73. A variable-speed power transmission comprising a driving member, a driven member, an abutment, mechanism actuated by said driving member for alternately producing turning moments of opposite sense, clutch mechanism for transmitting said turning moments to the driven member and to the abutment respectively, and a releasable coupling between the clutch mechanism and the abutment, said coupling comprising inner and outer members forming bearing races, a plurality of circular elements between said race members, one of said members being split, and mechanism for selectively altering the spread of said split member to cause said bearing balls to be gripped between said races or to permit them to rotate therebetween.

74. A variable-speed power transmission comprising a driving member, a driven member, an abutment, mechanism actuated by the driving member for alternately producing turning moments of opposite sense, reversible clutch mechanism for transmitting said turning moments to the driven member and to the abutment respectively, a releasable friction coupling between said clutch mechanism and said abutment, said coupling comprising a split ring alterable to release the coupling, a reversing member for reversing said clutch mechanism, and scissor mechanism actuated by movement of said reversing member for altering said split ring to release said coupling.

75. A variable-speed power transmission comprising a driving member, a driven member, an abutment, mechanism actuated by the driving member for alternately producing turning moments of opposite sense, reversible clutch mechanism for transmitting said turning moments to the driven member and to the abutment respectively, a reversing member for reversing said clutch mechanism, said member including cam surfaces, a releasable coupling between said clutch mechanism and said abutment, said coupling comprising a split ring alterable to release or to engage said coupling, and scissor mechanism for altering said split ring, said scissor mechanism being actuated by the cam surfaces on the reversing member to cause the coupling to be released upon reversing movement of said reversing member.

76. A variable-speed power transmission comprising a driving member, a driven member, an abutment, mechanism actuated by the driving member for alternately producing turning moments of opposite sense, mechanism for transmitting turning moments of one sense to the driven member and of the opposite sense to the abutment, a releasable friction coupling between said mechanism and said abutment, said coupling comprising frictionally engaging parts having surfaces of different curvature whereby said parts engage in substantially point contact, and means for selectively releasing said frictionally engaged parts.

77. A variable-speed power transmission comprising a driving member, a driven member, an abutment, mechanism actuated by the driving member for alternately producing turning moments of opposite sense, means for transmitting turning moments of one sense to the driven member, clutch mechanism for transmitting turning moments of the opposite sense to the abutment, a releasable coupling between the clutch mechainsm and the abutment comprising a member forming a race fixed with respect to the abutment, a split member forming a second race substantially fixed with respect to the abutment, a plurality of circular elements between said races, a retaining member for said circular elements connected to said clutch mechanism and rotatable with respect to said race forming members and means for altering the spread of said split member to cause said circular elements to be gripped between said races or to be released to permit rotation thereof.

78. A variable-speed power transmission comprising a driving member, a driven member, an abutment, and means for transmitting power in synchronous and asychronous drive relations between the driving member and the driven member comprising reversible clutch mechanism and a releasable friction coupling between said clutch mechanism and said abutment, said coupling comprising a split ring alterable to release the coupling, a reversing member for reversing said clutch mechanism and scissor mechanism actuated by movement of said reversing member for altering said split ring to release said coupling.

79. A variable-speed power transmission comprising a driving member, a driven member, an abutment, and means for transmitting power between the driving member and the driven member including clutch mechanism and a releasable friction coupling between said mechanism and said abutment, said coupling comprising frictionally engaging parts having surfaces of different curvature and means for releasing said frictionally engaging parts.

80. A variable-speed power transmission comprising a driving member, a driven member, an abutment, mechanism actuated by the driving member for alternately producing turning moments of opposite sense, clutch mechanism for transmitting said turning moments to the driven member and to the abutment respectively, a releasable coupling between the clutch mechanism and the abutment, said coupling comprising a ring fixed with respect to said abutment and forming an outer race, a split ring substantially fixed with respect to said abutment and forming an inner race, a plurality of circular elements between said races, a retaining member for said circular elements connected to said clutch mechanism, scissor mechanism comprising levers engaging said split ring, a spring acting on said levers for causing them to spread said split ring to frictionally hold said circular elements between said races and means operable at will for moving said levers to collapse said split ring against the action of said spring to release said circular elements.

81. A variable-speed power transmission comprising a driving member, a driven member, an abutment, mechanism actuated by the driving member for alternately producing turning moments of opposite sense, means for transmitting turning moments of selected sense to the driven member, reversible clutch mechanism for transmitting forces of opposite sense to the abutment, a releasable coupling between said clutch mechanism and the abutment comprising race forming members substantially fixed with respect to the abutment and circular elements between said members, one of said members being selectively alterable to grip or release the said circular elements, a retaining member for said circular elements rotatable with respect to said race forming members, and means for resiliently connecting said retaining member and said clutch mechanism.

82. A variable-speed power transmission comprising a driving member, a driven member, an abutment, mechanism actuated by the driving member for alternately producing turning moments of opposite sense, means for transmitting turning moments of selected sense to the driven member, reversible clutch mechanism for transmitting forces of opposite sense to the abutment, a releasable coupling between said clutch mechanism and the abutment comprising race forming members substantially fixed with respect to the abutment and circular elements between said members, one of said members being selectively alterable to grip or release the said circular elements, a retaining member for said circular elements rotatable with respect to said race forming members, and a plurality of radially arranged springs connecting said retaining member and said clutch mechanism.

83. A variable-speed power transmission comprising a driving member, a driven member, an abutment, mechanism actuated by the driving member for alternately producing turning moments of opposite sense, means for transmitting turning moments of selected sense to the driven member, reversible clutch mechanism for transmitting forces of opposite sense to the abutment, a releasable coupling between said clutch mechanism and the abutment comprising race forming members substantially fixed with respect to the abutment and circular elements between said members, one of said members being selectively alterable to grip or release said circular elements, a retaining member for said circular elements rotatable with respect to said race forming members, a plurality of radially arranged springs connecting said retaining member and said clutch mechanism, means for reversing said clutch mechanism, and means actuated by said reversing means for altering said alterable race forming member to release said circular elements upon actuation of the reversing means.

84. A variable-speed power transmission comprising a driving member, force-receiving members comprising a driven member and an abutment, mechanism actuated by the driving member for alternately producing turning moments of opposite sense, clutch mechanism for transmitting said turning moments to said driven member and to said abutment respectively, said clutch mechanism comprising a common clutch sleeve, a second clutch sleeve within said common sleeve and connected to one of said force-receiving members, a third clutch sleeve around said common sleeve and connected to the other of said force-receiving members, a plurality of gripping detents adapted to engage the common sleeve and said second sleeve, and a plurality of gripping detents adapted to engage said common sleeve and said third sleeve.

85. A variable-speed power transmission comprising a driving member, a driven member, an abutment, mechanism actuated by the driving member for alternately producing turning moments of opposite sense, and clutch mechanism for transmitting said turning moments to said driven member and to said abutment respectively, said clutch mechanism comprising a common clutch sleeve, parts within said common sleeve constituting with the common sleeve an action clutch for transmitting turning moments of one sense to the driven member, and parts around said common sleeve constituting with the common clutch sleeve a reaction clutch for transmitting moments of opposite sense to said abutment.

86. A variable-speed power transmission comprising a driving member; force-receiving members comprising a driven member and an abutment; means actuated by the driving member for alternately producing turning moments of opposite sense; clutch mechanism for transmitting turning moments of selected sense to one of said force-receiving members; means for transmitting turning moments of opposite sense to the other of said force-receiving members, said clutch mechanism comprising members forming wedging surfaces, a plurality of gripping detents between said surfaces, a movable cage for directing engaging force towards said detents, a plurality of series of springs carried by said cage for transmitting engaging force from the cage to the detents, one of said series comprising relatively weak springs and the other of said series comprising relatively strong springs, said springs being arranged between the cage and the detents so that engaging force is applied to the detents upon movement of the cage first due to one of said series of springs and then due to both of said series of springs; and means for moving said cage to apply engaging force to said detents.

87. A variable-speed power transmission comprising a driving member; force-receiving members comprising a driven member and an abutment; means actuated by the driving member for alternately producing turning moments of opposite sense; clutch mechanism for transmitting turning moments of selected sense to one of said force-receiving members; means for transmitting turning moments of opposite sense to the other of said force-receiving members, said clutch mechanism comprising members forming wedging surfaces, a plurality of gripping detents between said surfaces, a movable cage for directing engaging force towards said detents, a plurality of series of springs carried by said cage for transmitting engaging force from the cage to the detents, one of said series comprising relatively weak springs and the other of said series comprising relatively strong springs, said springs being arranged between the cage and the detents so that engaging force is applied to the detents upon movement of the cage first due to the series of weaker springs and then due to both of said series of springs; and means for moving said cage to apply engaging force to said detents.

88. A variable-speed power transmission comprising a driving member; force-receiving members comprising a driven member and an abutment; means actuated by the driving member for alternately producing turning moments of opposite sense; clutch mechanism for transmitting turning moments of selected sense to one of said force-receiving members; means for transmitting turning moments of opposite sense to the other of said force-receiving members; said clutch mechanism comprising members forming wedging surfaces, a plurality of gripping detents between said surfaces, a movable cage for directing engaging force towards said detents, a series of relatively strong springs carried by said cage, each of said springs being adapted to engage one of said detents, and a second series of relatively weak springs each forming a resilient abutment for one of the relatively strong springs; and means for moving said cage to apply engaging force to said detents.

89. A variable-speed power transmission comprising a driving member; force-receiving members comprising a driven member and an abutment; means actuated by the driving member for alternately producing turning moments of opposite sense; reversible clutch mechanism for transmitting turning moments of selected sense to one of said force-receiving members; means for transmitting turning moments of opposite sense to the other of said force-receiving members; said clutch mechanism comprising members forming wedging surfaces, a plurality of gripping detents adapted to engage said surfaces and movable to reverse said clutch mechanism, a movable cage for directing engaging force towards said detents and for causing movement of the detents to reverse the clutch mechanism, a plurality of series of springs carried by said cage for transmitting engaging force and reversing movement from the cage to the detents, one of said series comprising relatively weak springs and the other of said series comprising relatively strong springs, said springs being arranged so that engaging force is applied to the detents upon movement of the cage first due to the series of weaker springs and then due to both of said series of springs; and means for moving said cage to apply engaging force to said detents.

90. A variable-speed power transmission comprising a driving member; force receiving members comprising a driven member and an abutment; means actuated by the driving member for alternately producing turning moments of opposite sense; reversible clutch mechanism for transmitting turning moments of selected sense to one of said force-receiving members; means for transmitting turning moments of opposite sense to the other of said force-receiving members; said clutch mechanism comprising members forming wedging surfaces, a plurality of gripping detents adapted to engage said surfaces and movable to reverse said clutch mechanism, a movable cage for directing engaging force towards said detents and for causing movement of the detents to reverse the clutch mechanism, a plurality of sets of springs carried by said cage for transmitting engaging force and reversing movement from said cage to said detents, there being one set of springs between adjacent detents and each of said sets comprising a pair of relatively strong springs and a relatively weak spring forming a resilient abutment between the strong springs; and means for moving said cage to apply engaging force to said detents.

91. A variable-speed power transmission comprising a driving member, a driven member, an abutment, mechanism actuated by the driving member for alternately producing turning moments of opposite sense, clutch mechanism for transmitting said turning moments to the driven member and to the abutment respectively said clutch mechanism comprising a plurality of roller detents arranged to alternately grip and release in opposite sense, a plurality of sets of springs for transmitting engaging force to said detents, each of said sets comprising two springs of unequal strength, and means for applying engaging force to said detents first through the weaker springs and then through all of the springs.

92. A variable-speed power transmission for providing synchronous-asynchronous drive comprising a driving member, force receiving members comprising a driven member and an abutment, mechanism actuated by the driving member for producing a continuous turning moment of one sense when the transmission is operating synchronously and for alternately producing turning moments of opposite sense when the transmisison is operating asynchronously, mechanism comprising means for transmitting turning moments of one sense to one of said force receiving members and a clutch for transmitting turning moments of the opposite sense to the other of said force receiving members, said clutch comprising a plurality of gripping detents and means movable to apply a variable engaging pressure to said detents, and mechanism for automatically moving said last mentioned means to increase said engaging pressure when drive through the transmission changes from synchronous to asynchronous and to decrease said engaging pressure when drive through the transmission changes from asynchronous to synchronous.

93. A variable-speed power transmission for providing synchronous-asynchrosous drive comprising a driving member, force receiving members comprising a driven member and an abutment, mechanism actuated by the driving member for producing a continuous turning moment of one sense when the transmission is operating synchronously and for alternately producing turning moments of opposite sense when the transmission is operating asynchronously, mechanism comprising means for transmitting turning moments of one sense to one of said force receiving members and a clutch for transmitting turning moments of the opposite sense to the other of said force receiving members, said clutch comprising a plurality of gripping detents, a series of springs for applying an engaging pressure to said detents and a second series of springs for applying additional engaging pressure to said detents, and mechanism for causing said second series of springs to act when the transmission is operating asynchronously.

94. A variable-speed power transmission for providing synchronous-asynchronous drive comprising a driving member, a driven member, an abutment, mechanism actuated by the driving member for producing a continuous turning moment of one sense when the transmission is operating synchronously and for alternately producing turning moments of opposite sense when the transmission is operating asynchronously, means for transmitting turning moments of one sense to the driven member, a clutch for transmitting turning moments of the opposite sense to the abutment, said clutch comprising a plurality of gripping detents and means movable to apply a variable engaging pressure to said detents, and mechanism for automatically moving said last mentioned means to increase said engaging pressure when drive through the transmission changes from synchronous to asynchronous and to decrease said engaging pressure when drive through the transmission changes from asynchronous to synchronous.

95. A variable-speed power transmission for providing synchronous-asynchronous drive comprising a driving member, a driven member, an abutment, mechanism actuated by the driving member for producing a continuous turning moment of one sense when the transmission is operating synchronously and for alternately producing turning moments of opposite sense when the transmission is operating asynchronously, means for transmitting turning moments of one sense to the driven member, a clutch for transmitting turning moments of the opposite sense to the abutment, said clutch comprising a plurality of gripping detents, a series of springs for applying an engaging pressure to said detents and a second series of springs for applying additional engaging pressure to said detents, and mechanism for causing said second series of springs to act when the transmission is operating asynchronously.

96. In a variable-speed power transmission of the type providing synchronous-asynchronous drive, means for producing forces, an abutment, mechanism receiving forces from said means, said mechanism including an overrunning clutch for transmitting some of said forces to the abutment when the transmission is operating asynchronously, said clutch overrunning when the transmission operates synchronously and transmitting forces when the transmission operates asynchronously, said clutch comprising a plurality of gripping detents and springs for applying an engaging pressure to said detents and mechanism for automatically causing the pressure applied by said springs to be increased when the clutch transmits forces and for automatically causing the pressure applied by said springs to be decreased when the clutch overruns.

97. In a variable-speed power transmission of the type providing synchronous-asynchronous drive, means for producing forces, an abutment, mechanism receiving forces from said means, said mechanism including an overrunning clutch for transmitting some of said forces to the abutment when the transmission is operating asynchronously, said clutch overrunning when the transmission operates synchronously and transmitting forces when the transmission operates asynchronously, said clutch comprising members having gripping surfaces, a plurality of detents adapted to engage said surfaces to transmit forces through the clutch, a cage for said detents, a series of relatively weak springs in the cage for applying an engaging force to the detents when the transmission operates synchronously, a second series of springs in the cage for increasing the engaging force applied to the rollers, and means for automatically adjusting the position of the cage so that the second series of springs acts to increase the engaging pressure on the detents when the transmission operates asynchronously.

98. A variable speed power transmission comprising a driving member, a driven member and mechanism for transmitting power between the driving member and the driven member for providing synchronous and asynchronous conditions of drive, said mechanism comprising clutch members having gripping surfaces, a plurality of detents between said members adapted to engage said surfaces to transmit force therebetween in one direction when the mechanism is transmitting power and to release in opposite direction to permit the mechanism to overrun when not transmitting power, and means including springs for applying engaging pressures of different value to said detents.

99. A variable speed power transmission comprising a driving member, a driven member and mechanism for transmitting power between the driving member and the driven member for providing synchronous and asynchronous conditions of drive, said mechanism comprising clutch members having gripping surfaces, a plurality of detents between said members adapted to engage said surfaces to transmit force therebetween in one direction and to release in opposite direction to permit the mechanism to overrun, and means including springs for applying a relatively light engaging pressure on said detents when the mechanism overruns and a relatively heavy pressure on said detents when the mechanism transmits force.

100. A variable-speed power transmission comprising a driving member, a driven member and mechanism for transmitting power between the driving member and the driven member for providing synchronous and asynchronous conditions of drive, said mechanism comprising clutch members having gripping surfaces, a plurality of detents between said members adapted to engage said surfaces to transmits force therebetween in one direction and to release in opposite direction to permit the mechanism to overrun a cage for holding said detents, said cage being movable with respect to one of said members to bring said detents into engagement with said surfaces, a series of relatively weak springs in said cage for applying an initial engaging pressure to said detents upon movement of the cage to engaging position and a series of relatively strong springs in said cage for applying an additional engaging pressure to said detents upon further movement of the cage in engaging direction, and means for moving said cage.

101. A variable-speed power transmission comprising a driving member, a driven member and mechanism for transmitting power between the driving member and the driven member for providing synchronous and asynchronous conditions of drive, said mechanism comprising two clutch members having gripping surfaces, a plurality of roller detents between said members adapted to engage said surfaces to grip in one direction and to release in opposite direction to permit one of said members to overrun with respect to the other member, a cage for said detents, said cage being movable with respect to one of said members, and two series of springs in said cage for applying engaging pressure to said detents, said springs being arranged so that first one series of springs and then both series of springs act to apply engaging force to the detents upon movement of the cage in engaging direction.

102. A variable-speed power transmission comprising a driving member, a driven member and mechanism for transmitting power between the driving member and the driven member for providing synchronous and asynchronous conditions of drive, said mechanism comprising two clutch elements having gripping surfaces, a plurality of roller detents between said elements adapted to engage said surfaces to grip in one direction and to release in opposite direction to permit one of said elements to overrun with respect to the other of said elements, a cage for said detents, said cage being turnable with respect to one of said members to move said detents to engaging position, springs in the cage for resiliently applying engaging pressure to said detents when the cage is turned to engaging position, and means including a spring for resiliently holding said cage in engaging position.

103. Apparatus of the character set forth comprising a driving member, a driven member, an abutment, mechanism including inertia masses actuated by the driving member for alternately producing turning moments of opposite sense, means forming a resilient connection between the driving member and said masses for absorbing variations in the reaction forces transmitted to the driving member due to the production of said turning moments of opposite sense, and means for transmitting the produced turning moments of opposite sense to the driven member and to the abutment respectively.

104. A variable-speed power transmission comprising a driving member, an intermediate member, a driven member, an abutment, mechanism actuated by the driving member for alternately producing turning moments of opposite sense and applying said turning moments to the intermediate member, resilient means connecting said driving member to said mechanism for absorbing variation in the reaction forces transmitted to the driving member from the intermediate member due to the production of said alternately opposite turning moments, and means for transmitting the produced turning moments from the intermediate member to the driven member and to the abutment, respectively.

105. A variable-speed power transmission comprising a driving member, an intermediate member, a driven member, an abutment, mechanism actuated by the driving member for alternately producing turning moments of opposite sense and applying said turning moments to the intermediate member, a torsionally resilient shaft between said driving member and said mechanism for absorbing variations in the reaction forces transmitted to the driving member from the intermediate member due to the production of said alternately opposite turning moments, and means for transmitting the produced turning moments from the intermediate member to the driven member and to the abutment, respectively.

106. A variable-speed power transmission comprising a driving shaft, a primary fly-wheel on said shaft, a secondary fly-wheel, a torsionally resilient connection between said fly-wheels, an intermediate member, a driven member, an abutment, mechanism connected to and actuated by movement of said secondary fly-wheel for alternately producing turning moments of opposite sense and applying said moments to the intermediate member, and mechanism for transmitting the produced turning moments to the driven member and to the abutment, respectively.

107. A variable-speed power transmission comprising a driving shaft, a primary fly-wheel on said shaft, a secondary fly-wheel, a torsionally resilient connection between said fly-wheels, means associated with said fly-wheels for preventing torsional vibration therebetween, mechanism connected to and actuated by movement of said secondary fly-wheel for alternately producing turning moments of opposite sense, a driven member, an abutment, and means for transmitting turning moments of one sense to the driven member and of the opposite sense to the abutment.

108. A variable-speed power transmission comprising a driving shaft, a primary fly-wheel mounted thereon, a secondary fly-wheel, torsionally resilient means connecting said fly-wheels, means forming a friction connection between said fly-wheels for preventing torsional vibration therebetween, mechanism connected to and actuated by movement of said secondary fly-wheel for alternately producing turning moments of opposite sense, a driven member, an abutment, and means for transmitting turning moments of one sense to the driven member and of the opposite sense to the abutment.

109. A variable-speed power transmission comprising a driving member, force-receiving members comprising a driven member and an abutment, an intermediate member forming a clutch sleeve, mechanism actuated by the driving member for alternately producing opposite turning moments and applying said turning moments to said intermediate member, a driving connection between the driving member and said mechanism comprising a torsionally resilient shaft extending axially within the sleeve formed by said intermediate member, said shaft having one end secured to the driving member and the other end connected to said mechanism, clutch mechanism for transmitting the turning moments of one sense from said sleeve to one of the force-receiving members, and means for transmitting turning moments of the opposite sense to the other of the force-receiving members.

110. A variable-speed power transmission comprising a driving member, force-receiving members comprising a driven member and an abutment, an intermediate member forming a clutch sleeve, mechanism actuated by the driving member for alternately producing opposite turning moments and applying said turning moments to said intermediate member, a driving connection between the driving member and said mechanism comprising a torsionally resilient shaft extending axially within the sleeve formed by said intermediate member, a connection between one end of said shaft and said driving member, a torsionally resilient sleeve around said shaft and rigidly connected at one end to the opposite end of said shaft, a fly-wheel rigidly connected to the opposite end of said torsionally resilient sleeve, means connecting said mechanism and said fly-wheel, clutch mechanism for transmitting turning moments of one sense from said first named sleeve to one of the force-receiving members, and means for transmitting turning moments of the opposite sense to the other of the force-receiving members.

111. A variable-speed power transmission comprising a driving member, a driven member and power transmitting mechanism between the driving member and the driven member for providing synchronous and asynchronous conditions of drive, said power transmitting mechanism comprising clutch mechanism including a plurality of gripping detents, means for applying a variable engaging force to said detents, means for supplying lubricant to the clutch mechanism, and means influenced by variations in the viscosity of the lubricant supplied to the clutch mechanism for actuating said first named means.

112. A variable-speed power transmission comprising a driving member, a driven member and power transmitting mechanism between the driving member and the driven member for providing synchronous and asynchronous conditions of drive, said power transmitting mechanism comprising clutch mechanism including a plurality of gripping detents, means for applying a variable engaging force to said detents, means for creating a flow of lubricant used in the clutch mechanism, the rate of said flow varying in accordance with variations in the speed of operation of the clutch mechanism, and means influenced by the rate of flow of said lubricant for actuating said first named means.

113. A variable-speed power transmission comprising a driving member, a driven member and power transmitting mechanism between the driving member and the driven member for providing synchronous and asynchronous conditions of drive, said power transmitting mechanism comprising clutch mechanism comprising an element having a driving surface, an element having a driven surface, roller detents adapted to simultaneously engage said surfaces, springs for applying an engaging force to said detents, a cage for holding said springs, means for moving said cage to vary the engaging force applied to said detents through said springs, means for lubricating the clutch mechanism, and means influenced by variations in the viscosity of the lubricant supplied to the clutch mechanism for actuating said first named means.

114. A variable-speed power transmission comprising a driving member, a driven member and power transmitting mechanism between the driving member and the driven member for providing synchronous and asynchronous conditions of drive, said power transmitting mechanism comprising clutch mechanism comprising an element having a driving surface, an element having a driven surface, roller detents adapted to simultaneously engage said surfaces, springs for applying an engaging force to said detents, a cage for holding said springs, pressure responsive means for moving said cage to vary the engaging force applied to said detents through said springs, and means for lubricating the clutch mechanism, said pressure responsive means being influenced by the rate at which lubricant is supplied to the clutch mechanism and by the viscosity of the lubricant.

115. A variable-speed power transmission comprising a driving member, a driven member and power transmitting mechanism between the driving member and the driven member for providing synchronous and asynchronous conditions of drive, said power transmitting mechanism comprising, in combination, a clutch comprising an element having a driving surface, force-transmitting detents engaging said surface, a member movable to vary the engaging pressure applied to said detents, means for supplying a clutch lubricant under a pressure increasing upon increase in the speed of operation of the clutch, a piston movable in response to variations in the pressure at which the lubricant is supplied and means for moving said member due to movement of said piston.

116. A variable-speed power transmission comprising a driving member, a driven member and power transmitting mechanism between the driving member and the driven member for providing synchronous and asynchronous conditions of drive, said power transmitting mechanism comprising, in combination a reversible one-way clutch comprising frictionally engaging detents, means movable to vary the engaging force applied to said detents and to reverse the direction of drive through said clutch, means for supplying lubricant to the clutch and means influenced by variations in the viscosity of the lubricant for actuating said first mentioned means, with said first mentioned means adjusted for drive in either direction, to increase the engaging force applied to said detents upon increase in the viscosity of the lubricant supplied to the clutch.

117. A variable-speed power transmission comprising a driving member, a driven member and power transmitting mechanism between the driving member and the driven member for providing synchronous and asynchronous conditions of drive, said power transmitting mechanism comprising, in combination, a reversible one-way clutch comprising frictionally engaging detents, means movable to vary the engaging force applied to said detents and to reverse the direction of drive through said clutch, means for supplying lubricant to the clutch and means influenced by variations in the viscosity of the lubricant for actuating said first mentioned means, with said first mentioned means adjusted for drive in either direction, to increase the engaging force applied to said detents upon increase in the speed at which the clutch is operated.

118. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, mechanism including pressure-responsive means movable to apply a vairable engaging force to said detents and a conduit for conducting lubricant to said clutch mechanism, said conduit being in communication with said means, whereby engaging pressure applied to said detents is varied in accordance with variations in the pressure within said conduit.

119. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, mechanism including pressure-responsive means movable to apply a variable engaging force to said detents, a conduit for conducting lubricant to said clutch mechanism, said conduit being in communication with said means, whereby engaging pressure applied to said detents is varied in accordance with variations in the pressure within said conduit, and means for preventing the pressure applied to said pressure-responsive means from exceeding a predetermined value.

120. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, mechanism including a piston movable to apply a variable engaging force to said detents and a conduit for conducting lubricant to said clutch mechanism, said conduit being in communication with said piston, whereby engaging pressure applied to said detents is varied in accordance with variations in the pressure within said conduit.

121. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, mechanism including pressure-responsive means movable to apply a variable engaging force to said detents, a conduit for conducting lubricant to said clutch mechanism, a branch conduit placing said first named conduit in communication with said pressure-responsive means, means forming a restricted vent in said branch conduit and a check valve in the branch conduit between the first named conduit on the one hand and said means and said vent on the other hand, said check valve opening away from said first named conduit.

122. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, means forming an open piston chamber, mechanism including a piston loosely fitted in said chamber and movable to apply a variable engaging force to said detents, a conduit for conducting lubricant to said clutch mechanism, and means placing said conduit in communication with said piston chamber.

123. A variable speed power transmission comprising a driving member, a driven member and power transmitting mechanism between the driving member and the driven member for producing synchronous and asynchronous conditions of drive, said power transmitting mechanism comprising clutch mechanism including a plurality of gripping detents, mechanism movable to apply a variable engaging force to said detents, said mechanism including spring means for applying a minimum engaging force to said detents and pressure-responsive means for increasing the engaging force applied to said detents, and a conduit for conducting lubricant to said clutch mechanism, said conduit being in communication with said pressure-responsive means.

124. A variable-speed power transmission comprising a driving member, a driven member and power transmitting mechanism between the driving member and the driven member for producing synchronous and asynchronous conditions of drive, said power transmitting mechanism comprising a clutch including an element having a driving surface, an element having a driven surface, friction detents simultaneously engaging said surfaces, springs for applying engaging force to said detents, a cage in which said springs are mounted, means for conducting lubricant to said clutch, and means for moving said cage upon increase in the pressure of the lubricant supplied to the clutch to increase the engaging force applied to said detents.

125. A variable-speed power transmission comprising a driving member, an intermediate member, force-receiving members comprising a driven member and an abutment, mechanism actuated by said driving member for alternately producing turning moments of opposite sense and applying said turning moments to the intermediate member, clutch mechanism comprising gripping detents for transmitting turning moments of one sense to one of said force-receiving members, mechanism including pressure-responsive means for applying variable engaging force to said detents, means forming a conduit in communication with said pressure-responsive means for conducting lubricant to said clutch mechanism, means acting in response to variation in the speed of the intermediate member with respect to the driving member for causing variation in the pressure of the lubricant in said conduit, and means for transmitting turning moments of the opposite sense to the other of said force-receiving members.

126. A variable-speed power transmission comprising a driving member, an intermediate member, force-receiving members comprising a driven member and an abutment, mechanism actuated by said driving member for alternately producing turning moments of opposite sense and applying said turning moments to the intermediate member, clutch mechanism comprising gripping detents for transmitting turning moments of one sense to one of said force-receiving members, mechanism including pressure-responsive means for applying variable engaging force to said detents, means forming a conduit in communication with said pressure-responsive means for conducting lubricant to said clutch mechanism, ports forming a by-pass for reducing the pressure of lubricant in said conduit when the speeds of the driving member and the intermediate member coincide, and means for transmitting turning moments of the opposite sense to the other of said force-receiving members.

127. A variable-speed power transmission comprising a driving member, a driven member and power transmitting mechanism between the driving member and the driven member for providing synchronous and asynchronous conditions of drive, said power transmitting mechanism comprising clutch mechanism including a plurality of gripping detents, mechanism for applying a variable engaging force to said detents, said last-mentioned mechanism comprising spring means for applying a minimum engaging force to said detents and fluid-pressure responsive means for increasing the engaging force applied to said detents, and means for supplying lubricant to said clutch at a rate varying with the speed of operation of the clutch, said last-mentioned means including a conduit system communicating with said pressure responsive means and having a restricted vent, whereby the pressure applied to said pressure responsive means is varied due to changes in the speed of operation of the clutch and of the viscosity of the lubricant.

128. A variable-speed power transmission comprising a driving member, a driven member and power transmitting mechanism between the driving member and the driven member for providing synchronous and asynchronous conditions of drive, said power transmitting mechanism comprising clutch mechanism including a plurality of gripping detents, mechanism for applying a variable engaging force to said detents, said last-mentioned mechanism comprising spring means for applying a minimum engaging force to said detents and fluid-pressure responsive means for increasing the engaging force applied to said detents, and means for supplying lubricant to said clutch at a rate varying with the speed of operation of the clutch, said last-mentioned means including a conduit system communicating with said pressure responsive means, said system having a continuously open vent of restricted area and a by-pass opened automatically when synchronous drive is provided to reduce the pressure in the system, whereby the pressure applied to said pressure responsive means is varied due to changes in the speed of operation of the clutch, changes in the viscosity of the lubricant and changes from asynchronous to synchronous drive through the transmission.

129. In a variable-speed power transmission of the type providing synchronous-asynchronous drive, in combination, a clutch comprising gripping detents, means for supplying lubricant at a pressure varying in response to variations in the speed of operation of the clutch and in the viscosity of the lubricant and to changes from asynchronous to synchronous drive through the transmission, and mechanism including pressure responsive means for applying a variable engaging force to said detents, said last named means operating in response to variations in the pressure of the lubricant.

130. In a variable-speed power transmission of the type automatically providing synchronous-asynchronous drive, an overrunning friction clutch comprising gripping detents for transmitting forces through the transmission, means for applying engaging pressure to said detents and means acting automatically when the transmission operates synchronously to reduce the engaging pressure applied to the detents.

131. In a variable-speed power transmission of the type automatically providing synchronous-asynchronous drive, an overrunning friction clutch comprising gripping detents for transmitting forces through the transmission, means including a by-pass providing a lubricating system for circulating lubricant through the transmission, means utilizing pressure from said lubricating system to apply engaging pressure to said detents, said by-pass operating automatically to reduce the engaging pressure applied to the detents when the transmission operates synchronously.

132. A variable-speed power transmission comprising a driving member, a driven member and power transmitting mechanism between the driving member and the driven member for providing synchronous and asynchronous conditions of drive, said power transmitting mechanism comprising clutch mechanism including members providing gripping surfaces, detents acting between said surfaces to transmit forces from one to another of said members, fluid pressure actuated means for applying engaging pressure to said detents, means for supplying fluid under pressure to said first named means, and means forming a by-pass for said fluid, said means operating automatically to open the by-pass under predetermined conditions of clutch operation to reduce the pressure on said first named means.

133. A variable-speed power transmission comprising a driving member, an intermediate member, force-receiving members comprising a driven member and an abutment, mechanism actuated by said driving member for alternately producing turning moments of opposite sense and applying said turning moments to the intermediate member, clutch mechanism comprising gripping detents for transmitting turning moments of one sense to one of said force-receiving members, mechanism including pressure-responsive means for applying variable engaging force to said detents, means including a conduit in communication with said pressure-responsive means for supplying lubricant under pressure to the transmission, means acting in response to variations in the speed of the intermediate member with respect to the speed of the driving member for causing variation in the pressure of the lubricant in said conduit, and means for transmitting turning moments of the opposite sense to the other of said force-receiving members.

134. A variable-speed power transmission comprising a driving member, an intermediate member, force-receiving members comprising a driven member and an abutment, mechanism actuated by said driving member for alternately producing turning moments of opposite sense and applying said turning moments to the intermediate member, clutch mechanism comprising gripping detents for transmitting turning moments of one sense to one of said force-receiving members, mechanism including pressure-responsive means for applying variable engaging force to said detents, means forming a conduit in communication with said pressure-responsive means for conducting lubricant under pressure to said clutch mechanism, means forming a by-pass for reducing the pressure of lubricant in said conduit when the speeds of the driving member and the intermediate member coincide, and means for transmitting turning moments of the opposite sense to the other of said force-receiving members.

135. In a variable-speed power transmission of the type providing synchronous-asynchronous drive between a driving member and a driven member, an overrunning friction clutch comprising gripping detents for transmitting forces through the transmission, a member operating at the same speed as the driving member, an intermediate member operating at the same speed as the driving member when the transmission operates synchronously and at a different speed than that of the driving member when the transmission operates asynchronously, ports in said members adapted to register to form a by-pass when the transmission operates synchronously, means including said by-pass providing a lubricating system for circulating a lubricant under pressure, and means responsive to the pressure of said lubricant for applying engaging pressure to said detents, said by-pass operating to reduce the pressure of lubricant in said system when the transmission operates synchronously.

136. A variable-speed power transmission comprising a driving member, force-receiving members comprising a driven member and an abutment, an intermediate clutch sleeve, overrunning friction clutch mechanism comprising gripping detents for transmitting forces from said sleeve to said force-receiving members, torsionally resilient means connecting the driving member and the said sleeve comprising a shaft within said sleeve and a second sleeve annularly spaced both from the shaft and the intermediate sleeve to provide two annular channels, means responsive to fluid pressure for applying engaging pressure to said detents, means forming a lubricating system in communication with said first named means for supplying lubricant under pressure to the transmission, said system including said annular channels and a by-pass for controlling flow of lubricant through one of said channels to raise or lower the pressure of the lubricant in said system, said by-pass operating automatically to direct the lubricant through one channel when the transmission operates asynchronously and to permit the lubricant to flow through the other channel when the transmission operates synchronously.

137. A variable-speed power transmission comprising a driving member, a driven member, reversible means for driving the driven member at different speeds with respect to the speed of the driving member, said means comprising parts operable to change the relative speeds of said members without interruption of the driving relation therebetween, reversing mechanism for effecting reversal of said means, said reversing mechanism acting on some of said parts to interrupt said driving relation during the period of reversal, and means for ensuring rapid actuation of said reversing mechanism.

138. A variable-speed power transmission comprising a driving member, a driven member, reversible means for driving the driven member at different speeds with respect to the speed of the driving member, said means comprising parts operable to change the relative speeds of said members without interruption of the driving relation therebetween, reversing mechanism for effecting reversal of said means, said reversing mechanism acting on some of said parts to interrupt said driving relation during the period of reversal, and means for ensuring rapid actuation of said reversing mechanism, said last mentioned means comprising a member preventing sufficient movement of the reversing mechanism to interrupt said driving relation until a force sufficient to effect rapid reversal is applied to the reversing mechanism.

139. A variable-speed power transmission comprising a driving member, a driven member, reversible means for driving the driven member at different speeds with respect to the speed of the driving member, said means comprising parts operable to change the relative speeds of said members without interruption of the driving relation therebetween, reversing mechanism including a manually operable pedal for effecting reversal of said means upon depression of the pedal, said reversing mechanism acting on some of said parts to interrupt said driving relation during the period of reversal, and means providing sufficient resistance to depression of the pedal to prevent interruption of said driving relation until a predetermined force is applied to the pedal, said last named means being arranged to suddenly relieve said pedal from such resistance upon the application of said predetermined force.

140. A variable-speed power transmission comprising a driving member, a driven member, reversible means for driving the driven member at different speeds with respect to the speed of the driving member, said means comprising parts operable to change the relative speeds of said members without interruption of the driving relation therebetween, reversing mechanism for effecting reversal of said means, said reversing mechanism acting on some of said parts to interrupt said driving relation during the period of reversal, a manually operable member for actuating said reversing mechanism, said member being arranged to be moved in one direction by a force due to muscular tension on the part of an operator, and means arranged to resist movement of the manually operable member sufficient to interrupt said driving relation until a predetermined force is applied by the operator thereto and to suddenly cease its resistance upon application thereto of said predetermined force, whereby rapid actuation of said manually operable member is involuntarily effected by the operator due to the muscular tension required to provide said predetermined force.

141. A variable-speed power transmission comprising a driving member, a driven member, reversible means for driving the driven member at different speeds with respect to the speed of the driving member, said means comprising parts operable to change the relative speeds of said members without interruption of the driving relation therebetween, reversing mechanism for effecting reversal of said means, said reversing mechanism acting on some of said parts to interrupt said driving relation during the period of reversal, a pedal for actuating said reversing mechanism, said pedal being arranged to be depressed by a force due to muscular tension on the part of an operator, and spring means arranged to resist depression of the pedal sufficient to interrupt said driving relation until a predetermined force is applied by the operator to the pedal and to suddenly cease its resistance upon application to the pedal of said predetermined force, whereby rapid actuation of the pedal is involuntarily effected by the operator due to the muscular tension required to provide said predetermined force.

142. In a variable-speed power transmission, mechanism including an overrunning clutch for transmitting force under a first condition of drive through the transmission, said clutch overrunning under a second condition of drive through the transmission, said clutch comprising members having gripping surfaces, detents adapted to engage said surfaces to transmit force through the clutch and means for applying a variable engaging pressure on said detents, and mechanism acting automatically on said means for causing a greater engaging pressure to be applied to the detents under said first condition than is applied to the detents under said second condition.

143. In a variable-speed power transmission, mechanism including a reversible overrunning clutch for transmitting force under a first condition of drive through the transmission, said clutch overrunning under a second condition of drive through the transmission, said clutch comprising members having gripping surfaces, detents adapted to engage said surfaces to transmit force through the clutch and common means for altering the position of the detents to reverse the direction of drive through the clutch and for applying a variable engaging pressure on said detents, and mechanism acting automatically on said means for causing a greater pressure to be applied to the detents under said first condition than is applied under said second condition.

144. Overrunning clutch mechanism of the character described comprising clutch members having gripping surfaces, a plurality of detents between said members adapted to engage said surfaces to transmit force therebetween in one direction and to release in opposite direction to permit the mechanism to overrun, and means including springs for applying engaging pressures of different value to said detents.

145. Overrunning clutch mechanism of the character described comprising clutch members having gripping surfaces, a plurality of detents between said members adapted to engage said surfaces to transmit force therebetween in one direction and to release in opposite direction to permit the mechanism to overrun, and means including springs for applying a relatively light engaging pressure on said detents when the mechanism overruns and a relatively heavy pressure on said detents when the mechanism transmits force.

146. Overrunning clutch mechanism of the character described comprising clutch members having gripping surfaces, a plurality of detents between said members adapted to engage said surfaces to transmit force therebetween in one direction and to release in opposite direction to permit the mechanism to overrun, a cage for holding said detents, said cage being movable with respect to one of said members to bring said detents into engagement with said surfaces, a series of relatively weak springs in said cage for applying an initial engaging pressure to said detents upon movement of the cage to engaging position and a series of relatively strong springs in said cage for applying an additional engaging pressure to said detents upon further movement of the cage in engaging direction, and means for moving said cage.

147. An overrunning clutch comprising two clutch members having gripping surfaces, a plurality of roller detents between said members adapted to engage said surfaces to grip in one direction and to release in opposite direction to permit one of said members to overrun with respect to the other member, a cage for said detents, said cage being movable with respect to one of said members, and two series of springs in said cage for applying engaging pressure to said rollers, said springs being arranged so that first one series of springs and then both series of springs act to apply engaging force to the detents upon movement of the cage in engaging direction.

148. In a variable-speed power transmission of the type providing synchronous-asynchronous drive between a driving member and a driven member, clutch mechanism comprising gripping detents, pressure-responsive means for applying variable engaging force to said detents, means forming a conduit in communication with said pressure-responsive means for conducting lubricant to said mechanism, and means forming a bypass for reducing the pressure of the lubricant in said conduit when the transmission operates to provide synchronous drive.

149. In a variable-speed power transmission of the type providing synchronous-asynchronous drive between a driving member and a driven member, clutch mechanism comprising gripping detents, and means for applying a variable engaging force to said detents, said means operating automatically to reduce the engaging force when the transmission operates synchronously and to increase the engaging force when the transmission operates asynchronously.

150. In a variable-speed power transmission of the type providing synchronous-asynchronous drive between a driving member and a driven member, a clutch comprising gripping detents arranged to overrun continuously when the transmission is operating synchronously, pressure-responsive means for applying an engaging force to said detents, and means acting automatically to reduce the pressure on said pressure-responsive means when the transmission operates synchronously.

151. Power transmitting mechanism comprising an overrunning friction clutch having gripping detents, means for supplying lubricant under pressure to said clutch, means responsive to the pressure of said lubricant for applying engaging pressure to said detents, and means for automatically reducing the pressure of the lubricant when the clutch overruns.

152. Power transmitting mechanism comprising an overrunning friction clutch having gripping detents, means for supplying lubricant under pressure to said clutch, means responsive to the pressure of the lubricant for applying an engaging pressure to said detents, and means for automatically reducing the pressure of the lubricant when the clutch overruns and for automatically increasing the pressure of the lubricant when the clutch ceases to overrun.

153. Power transmitting mechanism comprising an overrunning friction clutch having gripping detents, means providing a circulating lubricating system for supplying lubricant to said mechanism under pressure, said system including two channels having different values of resistance to flow, means acting in response to pressure within the lubricating system for applying engaging pressure to said detents, and means forming a by-pass for directing lubricant through one or the other of said channels to lower or raise the pressure within the lubricating system, said by-pass means operating automatically to permit the lubricant to flow through the channel of lesser flow resistance when the clutch overruns and to direct the lubricant through the channel of greater flow resistance when the clutch ceases to overrun.

154. Power transmitting clutch mechanism comprising members providing gripping surfaces, detents acting between said surfaces to transmit from one to another of said members, fluid pressure actuated means for applying engaging pressure to said detents, means for supplying fluid under pressure to said first named means and means forming a by-pass for said fluid, said last named means operating automatically to open the by-pass under predetermined conditions of clutch operation to reduce the pressure on said first named means.

155. Overrunning clutch mechanism comprising a plurality of gripping detents, means for applying a variable engaging force to said detents, means for supplying lubricant to the clutch mechanism and means influenced by variations in the viscosity of the lubricant supplied to the clutch mechanism for actuating said first named means.

156. Overrunning clutch mechanism comprising a plurality of gripping detents, means for applying a variable engaging force to said detents, means for creating a flow of lubricant used in the clutch mechanism, the rate of said flow varying in accordance with variations in the speed of operation of the clutch mechanism, and means influenced by the rate of flow of said lubricant for actuating said first named means.

157. Overrunning clutch mechanism comprising a plurality of gripping detents, mechanism including pressure-responsive means movable to apply a variable engaging force to said detents and a conduit for conducting lubricant to said clutch mechanism, said conduit being in communication with said means, whereby engaging pressure applied to said detents is varied in accordance with variations in the pressure within said conduit.

158. Overrunning clutch mechanism comprising a plurality of gripping detents, mechanism including pressure-responsive means movable to apply a variable engaging force to said detents, a conduit for conducting lubricant to said clutch mechanism, said conduit being in communication with said means, whereby engaging pressure applied to said detents is varied in accordance with variations in the pressure within said conduit, and means for preventing the pressure applied to said pressure-responsive means from exceeding a predetermined value.

159. Overrunning clutch mechanism comprising a plurality of gripping detents, mechanism including a piston movable to apply a variable engaging force to said detents and a conduit for conducting lubricant to said clutch mechanism, said conduit being in communication with said piston, whereby engaging pressure applied to said detents is varied in accordance with variations in the pressure within said conduit.

160. Overrunning clutch mechanism comprising a plurality of gripping detents, mechanism including pressure-responsive means movable to apply a variable engaging force to said detents, a conduit for conducting lubricant to said clutch mechanism, a branch conduit placing said first named conduit in communication with said pressure-responsive means, means forming a restricted vent in said branch conduit and a check valve in the branch conduit between the first named conduit on the one hand and said means and said vent on the other hand, said check valve opening away from said first named conduit.

161. Overrunning clutch mechanism comprising a plurality of gripping detents, means forming an open piston chamber, mechanism including a piston loosely fitted in said chamber and movable to apply a variable engaging force to said detents, a conduit for conducting lubricant to said clutch mechanism, and means placing said conduit in communication with said piston chamber.

162. Overrunning clutch mechanism comprising a plurality of gripping detents, mechanism movable to apply a variable engaging force to said detents, said mechanism including spring means for applying a minimum engaging force to said detents and pressure-responsive means for increasing the engaging force applied to said detents, and a conduit for conducting lubricant to said clutch mechanism, said conduit being in communication with said pressure-responsive means.

163. Overrunning clutch mechanism comprising an element having a driving surface, an element having a driven surface, friction detents simultaneously engaging said surfaces, springs for applying engaging force to said detents, a cage in which said springs are mounted, means for conducting lubricant to said clutch, and means for moving said cage upon increase in the pressure of the lubricant supplied to the clutch to increase the engaging force applied to said detents.

164. Overrunning clutch mechanism comprising gripping detents, a conduit for conducting lubricant to said mechanism, and means for applying engaging force to said detents, said means acting in response to variations in pressure in said conduit to vary the engaging force applied to the detents.

165. Overrunning clutch mechanism comprising an element having a driving surface, an element having a driven surface, roller detents simultaneously engaging said surfaces, springs for applying engaging forces to said detents, a cage for said springs movable with respect to one of said elements, means for supplying lubricant to the clutch and means operable under the influence of variations in the viscosity of the lubricant for moving said cage to vary the engaging force applied to the detents through said springs.

166. Overrunning clutch mechanism comprising an element having a driving surface, an element having a driven surface, roller detents simultaneously engaging said surfaces, springs for applying engaging forces to said detents, a cage for said springs movable with respect to one of said elements, means for supplying lubricant to the clutch and pressure responsive means operable under the influence of variations in viscosity of the lubricant supplied to the clutch for moving said cage to increase the engaging force applied to said detents upon increase in viscosity of the lubricant.

167. Overrunning clutch mechanism comprising a plurality of gripping detents, means for applying a variable engaging force to said detents, means for creating a flow of lubricant used in the clutch mechanism, the rate of said flow varying in accordance with variations in the speed of operation of the clutch mechanism, a fluid pressure actuated piston for actuating said first named means and means for placing said piston in communication with the means for creating the flow of lubricant.

168. Reversible overrunning clutch mechanism comprising clutch elements providing gripping surfaces, a plurality of roller detents between said surfaces, a cage for said detents, means for turning said cage with respect to one of said elements to effect reversal of the direction of drive through the clutch comprising an axially movable shift sleeve, and a rotatable shaft having an eccentrically mounted member thereon engaging said shift sleeve for causing axial movement of the shift sleeve upon turning movement of the shaft, means for supplying lubricant to the clutch mechanism and pressure responsive means in communication with the means for supplying lubricant to the clutch for varying the eccentricity of said eccentrically mounted member with respect to the axis of rotation of said shaft whereby to vary the axial position of said shift sleeve under the influence of variations in pressure of the lubricant supplied to the clutch.

169. Overrunning clutch mechanism comprising an element having a driving surface, an element having a driven surface, a detent adapted to frictionally engage said surfaces to transmit power from one to the other of said elements, means for applying a variable engaging force to said detent, means for supplying lubricant to the clutch mechanism and means operable under the influence of variations in the viscosity of the lubricant supplied to the clutch mechanism for actuating said first named means to cause increase in said engaging force upon increase of the viscosity of said lubricant.

170. Overrunning clutch mechanism comprising an element having a driving surface, an element having a driven surface, a detent adapted to frictionally engage said surfaces to transmit power from one to the other of said elements, means for applying a variable engaging force to said detent, means for supplying lubricant to the clutch mechanism at a rate varying with variations in the speed of operation of the clutch mechanism and means operable under the influence of variations in the rate at which said lubricant is supplied for actuating said first named means to increase said engaging force upon increase in the speed of operation of the clutch mechanism.

171. Overrunning clutch mechanism comprising an element having a driving surface, an element having a driven surface, a detent adapted to frictionally engage said surfaces to transmit power from one to the other of said elements, means for applying a variable engaging force to said detent, means for supplying lubricant to the clutch mechanism and pressure-responsive means actuated by variations in the pressure at which lubricant is supplied to the clutch for actuating said first named means.

172. Overrunning clutch mechanism comprising an element having a driving surface, an element having a driven surface, a detent adapted to frictionally engage said surfaces to transmit power from one to the other of said elements, means for applying a variable engaging force to said detent, means for supplying lubricant to the clutch mechanism at a rate varying with variations in the speed of operation of the clutch mechanism and pressure-responsive means operable under the influence of both variations in the viscosity of the lubricant and variations in the rate at which lubricant is supplied to the clutch mechanism for actuating said first named means.

173. Power transmission mechanism comprising an overrunning friction clutch having gripping detents, means for applying engaging pressure to said detents, and mechanism for automatically lowering the engaging pressure applied to the detents when the clutch overrruns.

In testimony whereof I have hereunto affixed my signature.

FREDRIK LJUNGSTRÖM.